(12) United States Patent
Saito

(10) Patent No.: US 8,249,431 B2
(45) Date of Patent: Aug. 21, 2012

(54) RECORDING DEVICE, RECORDING METHOD, AND RECORDING PROGRAM

(75) Inventor: Natsumi Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1390 days.

(21) Appl. No.: 10/564,529

(22) PCT Filed: May 19, 2005

(86) PCT No.: PCT/JP2005/009585
§ 371 (c)(1),
(2), (4) Date: Jan. 13, 2006

(87) PCT Pub. No.: WO2005/112031
PCT Pub. Date: Nov. 24, 2005

(65) Prior Publication Data
US 2007/0118865 A1    May 24, 2007

(30) Foreign Application Priority Data

May 19, 2004 (JP) .................................. 2004-149493

(51) Int. Cl.
*H04N 5/92* (2006.01)
(52) U.S. Cl. ......................................................... 386/326
(58) Field of Classification Search ...................... 386/83
See application file for complete search history.

(56) References Cited

U.S. PATENT DOCUMENTS
2006/0140584 A1*   6/2006   Ellis et al. ...................... 386/83

FOREIGN PATENT DOCUMENTS

| JP | 7-212327 | 8/1995 |
| JP | 9-245467 | 9/1997 |
| JP | 11-46343 | 2/1999 |
| JP | 2001-237784 | 8/2001 |
| JP | 2002-209168 | 7/2002 |
| JP | 2003-125305 | 4/2003 |

* cited by examiner

*Primary Examiner* — William C Vaughn, Jr.
*Assistant Examiner* — Daniel Tekle
(74) *Attorney, Agent, or Firm* — Oblon, Spivak, McClelland, Maier & Neustadt, L.L.P.

(57) ABSTRACT

The recording apparatus acquires now-on-air information at a certain interval of time. The now-on-air information shows the contents of broadcast signals being received. The recording apparatus records broadcast signals when detecting a keyword in the now-on-air information. Therefore, if the recording apparatus receives the broadcast signals which represent user's desired program's picture/sound, it can record them. In this manner, the recording apparatus can record user's desired part of program's picture/sound.

12 Claims, 28 Drawing Sheets

TB1 ON-AIR PROGRAM TABLE

| STATION NAMES | PROGRAM TITLES | PRESENTERS | START TIME OF MUSIC | MUSIC TITLES | ARTISTS | GENRES |
|---|---|---|---|---|---|---|
| FM NAKAHARA | MY MY RADIO | TOTAL MASUMOTO | 12/1 20:59 | BEYOND THE STARLIT SKY | SUMASHIGAO | POP |

TB2 BROADCASTED MUSIC TABLE

| STATION NAMES | BROADCAST TIMES | MUSIC TITLES | ARTISTS | GENRES |
|---|---|---|---|---|
| ... | ... | ... | ... | ... |
| FM NAKAHARA | 12/1 20:05 | DORA DORA DORA | NAX | ROCK |
| FM NAKAHARA | 12/1 20:09 | BLUE TRIANGLES | DJC | ROCK |
| FM NAKAHARA | 12/1 20:25 | AT THE HILL WITH BLOSSOMING ROSES | Tiger Ash | ROCK |
| FM NAKAHARA | 12/1 20:33 | NO.2 | AKIHARA KAZUYUKI | POP |
| FM NAKAHARA | 12/1 20:37 | TO ME | HAMAZAKI AMI | POP |
| FM NAKAHARA | 12/1 20:41 | Led Wine'89 | CLNetwork | POP |
| FM NAKAHARA | 12/1 20:50 | MAKURA IN CHORUS | KOMIYAMA AOTARO | POP |
| FM NAKAHARA | 12/1 20:55 | WINTER'S PSYCHOSIS | WALK EN CELL | ROCK |

TB3 BROADCASTED PROGRAM TABLE

| STATION NAMES | BROADCAST PERIODS | MUSIC TITLES | PRESENTERS |
|---|---|---|---|
| ... | ... | ... | ... |
| FM NAKAHARA | 12/1 19:00~20:00 | WORLD BEAT | SOBATTO NINPARUSU |
| FM NAKAHARA | 12/1 20:00~20:30 | Rock On | CHRIS PEPPER |
| FM NAKAHARA | 12/1 20:30~20:45 | SLOW NIGHT | JOHN CAVARA |

| STATION NAMES | BROADCAST TIMES | MUSIC TITLES | ARTISTS | GENRES |
|---|---|---|---|---|
| ⋮ | ⋮ | ⋮ | ⋮ | ⋮ |
| FM NAKAHARA | 12/1 20:05 | DORA DORA DORA | NAX | ROCK |
| FM NAKAHARA | 12/1 20:09 | BLUE TRIANGLES | DJC | ROCK |
| FM NAKAHARA | 12/1 20:25 | AT THE HILL WITH BLOSSOMING ROSES | Tiger Ash | ROCK |
| FM NAKAHARA | 12/1 20:33 | NO.2 | AKIHARA KAZUYUKI | POP |
| FM NAKAHARA | 12/1 20:37 | TO ME | HAMAZAKI AMI | POP |
| FM NAKAHARA | 12/1 20:41 | Led Wine' 89 | CLNetwork | POP |
| FM NAKAHARA | 12/1 20:50 | MAKURA IN CHORUS | KOMIYAMA AOTARO | POP |
| FM NAKAHARA | 12/1 20:55 | WINTER'S PSYCHOSIS | WALK EN CELL | ROCK |
| FM NAKAHARA | 12/1 20:59 | BEYOND THE STARLIT SKY | SUMASHIGAO | POP |

— ADD ON-AIR-LIST INFORMATION A CERTAIN TIME AFTER THE BROADCAST OF THE SONG ENDS

| STATION NAMES | BROADCAST PERIODS | PROGRAM TITLES | PRESENTERS |
|---|---|---|---|
| ⋮ | ⋮ | ⋮ | ⋮ |
| FM NAKAHARA | 12/1 19:00~20:00 | WORLD BEAT | SOBATTO NINPARUSU |
| FM NAKAHARA | 12/1 20:00~20:30 | Rock On | CHRIS PEPPER |
| FM NAKAHARA | 12/1 20:30~20:45 | SLOW NIGHT | JOHN CAVARA |
| FM NAKAHARA | 12/1 20:45~21:30 | MY MY RADIO | TOTAL MASUMOTO |

— ADD ON-AIR-LIST INFORMATION A CERTAIN TIME AFTER THE BROADCAST OF THE RADIO PROGRAM ENDS

FIG.23

| STATION NAMES | BROADCAST PERIODS | PROGRAM TITLES | PRESENTERS | BROADCAST TIMES | MUSIC TITLES | ARTISTS | GENRES |
|---|---|---|---|---|---|---|---|
| ... | ... | ... | ... | ... | ... | ... | ... |
| FM NAKAHARA | 12/1 20:00~20:30 | Rock On | CHRIS PEPPER | 12/1 20:05 | DORA DORA DORA | NAX | ROCK |
| FM NAKAHARA | 12/1 20:00~20:30 | Rock On | CHRIS PEPPER | 12/1 20:09 | BLUE TRIANGLES | DJC | ROCK |
| FM NAKAHARA | 12/1 20:00~20:30 | Rock On | CHRIS PEPPER | 12/1 20:25 | AT THE HILL WITH BLOSSOMING ROSES | Tiger Ash | ROCK |
| FM NAKAHARA | 12/1 20:30~20:45 | SLOW NIGHT | JOHN CAVARA | 12/1 20:33 | NO.2 | AKIHARA KAZUYUKI | POP |
| FM NAKAHARA | 12/1 20:30~20:45 | SLOW NIGHT | JOHN CAVARA | 12/1 20:37 | TO ME | HAMAZAKI AMI | POP |
| FM NAKAHARA | 12/1 20:30~20:45 | SLOW NIGHT | JOHN CAVARA | 12/1 20:41 | Led Wine'89 | CLNetwork | POP |
| ... | ... | ... | ... | ... | ... | ... | ... |

FIG.24

300 PROGRAM GUIDE SCREEN

| | FM NAKAHARA | FM OZAKI | FM NY |
|---|---|---|---|
| 2/10 (MON) | ☐MORNING SOUND 7:00~8:00 ⋮ ☑WORLD BEAT 19:00~20:00 ☑ROCK ON 20:00~20:30 ☑SLOW NIGHT 20:30~20:45 | ⋮ ☑PAUL'S COUNTDOWN 23:00~24:00 | ⋮ ☐GETS! 14:000~14:30 ⋮ |
| 2/11 (TUE) | ⋮ ☐BOM BOM TOWN 16:00~18:00 ⋮ | ☐WAKE UP MORNIG 5:00~8:00 ⋮ | ⋮ ☑NIGHT FEELING 23:00~24:00 |
| 2/12 (WED) | ⋮ ☑COOL MIDNIGHT HOLIDAY 1:00~3:00 | ⋮ ☑DO MY SUNDAY! 15:00~18:00 ⋮ | ☑LET'S MOVE ON 10:00~13:00 ⋮ |
| | ⋮ | ⋮ | ⋮ |

CB (annotations pointing to checked items)

SET — PB

| STATION NAMES | PROGRAM TITLES | PRESENTERS | START TIME OF MUSIC | END TIME OF MUSIC | MUSIC TITLES | ARTISTS | GENRES |
|---|---|---|---|---|---|---|---|
| FM NAKAHARA | MY MY RADIO | TOTAL MASUMOTO | 12/1 20:59 | 12/1 21:04 | BEYOND THE STARLIT SKY | SUMASHIGAO | POP |

TB1

ADD ⇨

RECORDING DEVICE, RECORDING METHOD, AND RECORDING PROGRAM

TECHNICAL FIELD

The present invention relates to a recording apparatus, and is preferably applied to a sound recording apparatus which records sound of radio programs, for example.

BACKGROUND ART

In late years, recording apparatuses, such as sound recording apparatus which records sound of radio programs and picture recording apparatus which records picture of television programs, are here to stay.

With the sound recording apparatus, a user specifies a time and a broadcast station. The sound recording apparatus then tunes in on the broadcast station when the time comes to record sound of a radio program broadcast from the broadcast station.

With the picture recording apparatus, a user input keywords to specify a television program. The picture recording apparatus obtains from external servers information including the following: titles of television programs; names of people who appear in the television programs; channel; and broadcast time. This information is also referred to as "television program information". The picture recording apparatus then detects the channel and broadcast time of the specified television program based on the inputted keywords and the television program information to record picture of the program (see Patent Document 1, for example).

Patent Document 1: Japanese Patent Laid-Open No. 3-35451

In the television broadcast, the external servers provide information such as the noted-above television program information which the picture recording apparatus utilizes to record picture of television programs. In the radio broadcasts, the information which the sound recording apparatus can utilize to record sound of radio programs is not provided.

Accordingly, a user has to look up a newspaper's or magazine's program guide to confirm the broadcast station and broadcast time of the desired radio program, and set them in the sound recording apparatus to record its program's sound.

If a user wants to record only the music played in a radio program, the user has to listen to the program to perform sound recording operation at the time when the music starts to play.

By the way, the automatic recording function of the picture recording apparatus records television programs only in a program unit. Therefore, a user has to perform manual recording operation to record the desired part of a television program.

As described above, with the conventional recording apparatus, there has been a problem that a user cannot easily record the desired part of program's picture/sound being broadcast.

DISCLOSURE OF THE INVENTION

The present invention has been made in view of the above points and is intended to provide a recording apparatus, recording method and recording program in which a user can easily record the desired part of program's picture/sound being broadcast.

To solve the above problem, a recording apparatus in accordance with the present invention, comprising: setting means for setting a keyword; broadcast signal reception means for receiving a broadcast signal broadcast from a broadcast station; recording means for preliminarily and temporarily recording the broadcast signal received by the broadcast signal reception means as broadcast data on a recording medium; communication means for transmitting request information to external apparatus at a certain interval of time to request broadcast information showing contents of the broadcast signal being received, and receiving the broadcast information which the external apparatus transmits in response to the request information; detection means for detecting whether or not the broadcast information received by the communication means includes the keyword; and control means for controlling the recording means to actually record the broadcast data on the recording medium such that a part of the broadcast data preliminarily recorded on the recording medium is actually recorded as front data, when the detection means detects that the broadcast information includes the keyword.

Also, a recording method in accordance with the present invention, comprising; a setting step of setting a keyword; a broadcast signal reception step of receiving a broadcast signal broadcast from a broadcast station; a preliminary recording step of preliminarily and temporarily recording the broadcast signal received by the broadcast signal reception step as broadcast data on a recording medium; a communication step of transmitting request information to external apparatus at a certain interval of time to request broadcast information showing contents of the broadcast signal being received, and receiving the broadcast information which the external apparatus transmits in response to the request information; a detection step of detecting whether or not the broadcast information received by the communication step includes the keyword; and an actual recording step of actually recording the broadcast data on the recording medium such that a part of the broadcast data preliminarily recorded on the recording medium is actually recorded as front data, when the detection step detects that the broadcast information includes the keyword.

Further, a recording program in accordance with the present invention for causing information processing apparatus to execute: a setting step of setting a keyword; a broadcast signal reception step of receiving a broadcast signal broadcast from a broadcast station; a preliminary recording step of preliminarily and temporarily recording the broadcast signal received by the broadcast signal reception step as broadcast data on a recording medium; a communication step of transmitting request information to external apparatus at a certain interval of time to request broadcast information showing contents of the broadcast signal being received, and receiving the broadcast information which the external apparatus transmits in response to the request information; a detection step of detecting whether or not the broadcast information received by the communication step includes the keyword; and an actual recording step of actually recording the broadcast data on the recording medium such that a part of the broadcast data preliminarily recorded on the recording medium is actually recorded as front data, when the detection step detects that the broadcast information includes the keyword.

In this manner, the recording apparatus receives broadcast information showing contents of the broadcast signal being received at a certain interval of time. The recording apparatus actually records the broadcast signal when detecting a keyword in the broadcast information. Therefore, if the recording apparatus receives the broadcast signals which represent user's desired program's picture/sound, it can record them.

According to the present invention, the recording apparatus receives broadcast information showing contents of the broadcast signal being received at a certain interval of time. The recording apparatus actually records the broadcast signal when detecting a keyword in the broadcast information. Therefore, if the recording apparatus receives the broadcast signals which represent user's desired program's picture/sound, it can record them. As a result, a recording apparatus, recording method, and recording program can be provided which can easily record user's desired part of program's picture/sound being broadcast.

BRIEF DESCRIPTION OF THE DRAWINGS

FIG. 20 is a schematic diagram showing the configuration of a radio broadcast information database.

FIG. 22 is a schematic diagram illustrating update processes of on-air-list information on a broadcasted music table.

FIG. 23 is a schematic diagram illustrating update processes of on-air-list information on a broadcasted program table.

FIG. 24 is a schematic diagram illustrating associating processes between the broadcasted music table and the broadcasted program table.

FIG. 27 is a schematic diagram showing the configuration of a program guide screen.

FIG. 29 is a schematic diagram showing a on-air program table of a fourth embodiment.

BEST MODE FOR CARRYING OUT THE INVENTION

An embodiment of the present invention will be described in detail with reference to the accompanying drawings.

Figure 1:
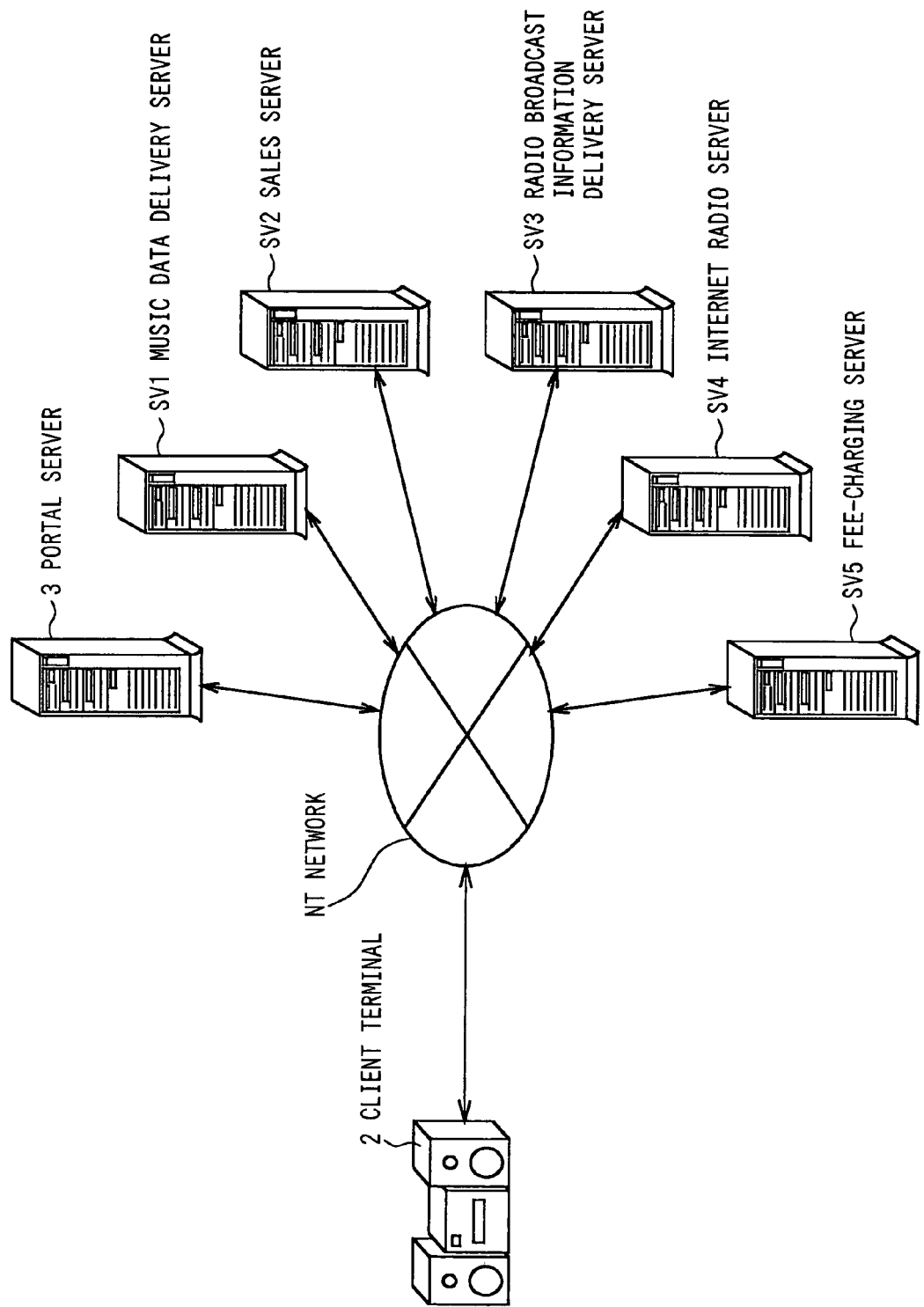
FIG. 1 is a schematic diagram showing the overall configuration of a music related service provision system.

(1) First Embodiment (1-1) Configuration of Music Related Service Provision System With reference to FIG. 1, the reference numeral 1 denotes a music related service provision system as a whole. The music related service provision system 1 includes a client terminal 2, a portal server 3, other various servers SV1 through SV5. A user of the client terminal 2 is under contract to a company operating the music related service provision system 1. The portal server 3 manages the client terminal 2. A plurality of servers SV1 through SV5 provides the client terminal 2 with various kinds of services relating to music.

In this embodiment, the music data delivery server SV1 provides distribution services for distributing music data to the client terminal 2. The music data is converted into such formats as ATRAC3 (Adaptive Transform Acoustic Coding 3), AAC (Advanced Audio Coding), WMA (Windows (Registered Trademark) Media Audio), RealAUDIO G2 Music Codec, MP3 (MPEG Audio Layer-3), and the like.

A sales server SV2 provides sales services for selling Compact Discs (CDs), Digital Versatile Discs (DVDs), and the like to users through the client terminal 2.

A radio broadcast information delivery server SV3 provides radio broadcast information distribution services for distributing to the client terminal 2 radio broadcast information relating to music and radio program broadcast by radio stations.

A Internet radio server SV4 provides Internet radio broadcast services. In the radio broadcast services, the Internet radio server SV4 supplies radio broadcast data encoded into a streaming format to the client terminal 2 via a network NT. In this case, the network NT is equivalent to the Internet.

A fee-charging server SV5 performs fee-charging processes to charge users various fees in response to requests from the portal server 3 and the like.

(1-2) Configuration of Client Terminal 2

(1-2-1) Functional Circuit Block Configuration of Client Terminal 2

Figure 2:
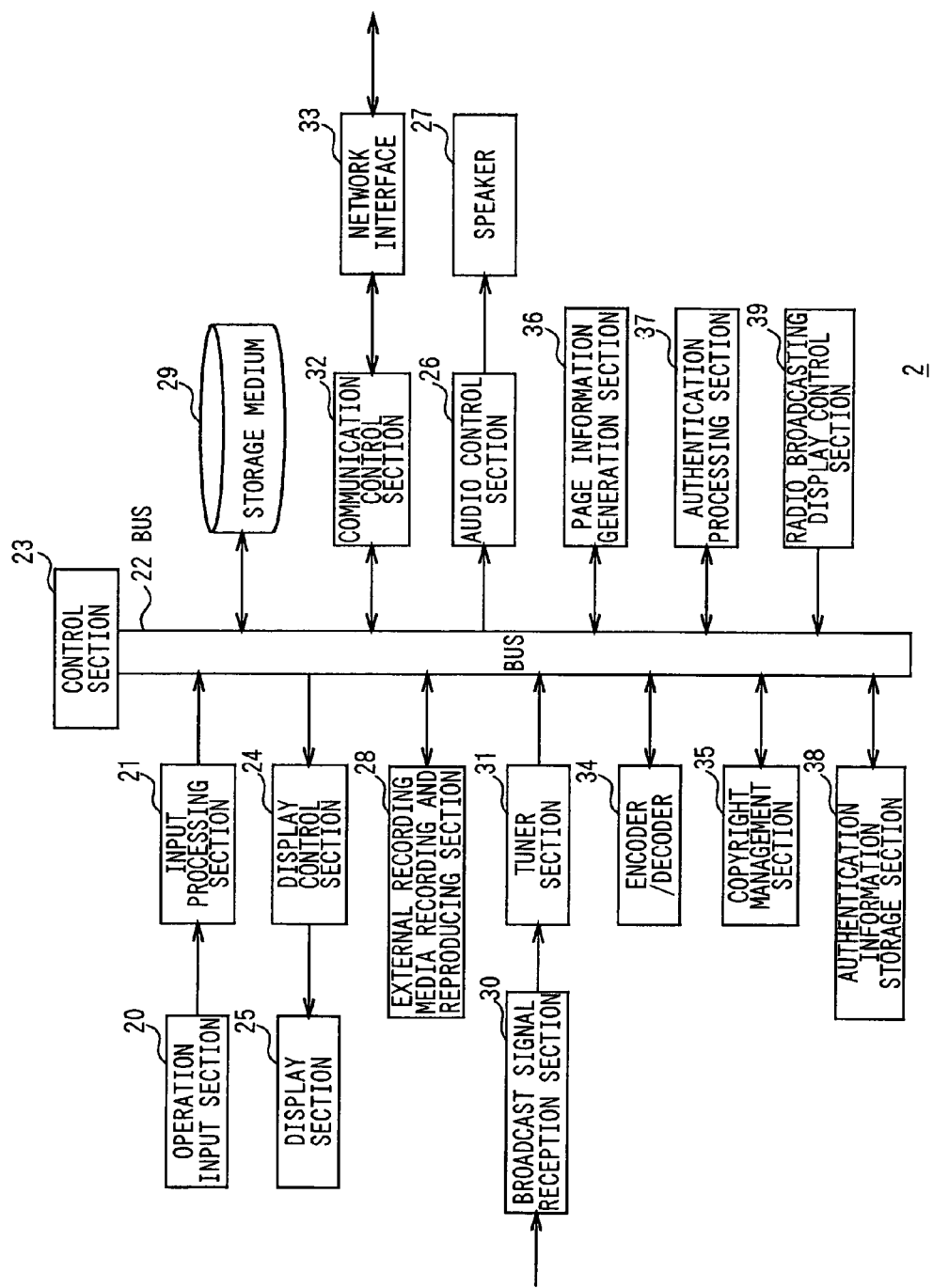
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 which includes various kinds of buttons. The operation input section 20 is disposed on the surface of the cabinet of the client terminal 2 or remote control (not shown). If a user operates the operation input section 20, the operation input section 20 detects the operation, and supplies operation input signals corresponding to the operation to an input processing section 21.

The input processing section 21 converts the operation input signals provided by the operation input section 20 into specific operation commands, and transmits them via a bus 22 to a control section 23.

The control section 23 is connected to each circuit via the bus 22. The control section 23 controls operation of each circuit based on operation commands and control commands provided by each circuit.

A display control section 24 receives video data via the bus 22, and performs digital-to-analog conversion for the video data to generate analog video signals. The display control section 24 then supplies the analog video signals to the display section 25.

For example, the display section 25 is a display device such as a liquid crystal display. The display section 25 may be disposed on the surface of the cabinet directly or externally.

The display section 25 receives analog video signals from the display control section 24, and displays images based on the analog video signals. The analog video signals may be correspond to processing results of the control section 23 or various kinds of video data.

An audio control section 26 receives audio data via the bus 22, and performs digital-to-analog conversion for the audio data to generate analog audio signals. The audio control section 26 then transmits the analog audio signals to a speaker 27. The speaker 27 outputs audio based on the analog audio signals supplied from the audio control section 26.

For example, external storage media such as CDs and MEMORY STICK (Registered Trademark of Sony Corporation) store contents data. The MEMORY STICK consists of flash memories covered with exterior cases. An external recording media recording and reproducing section 28 reads content data from external storage media, and then reproduces them. Alternatively, the external recording media recording and reproducing section 28 records record-target content data on external storage media.

If the external recording media recording and reproducing section 28 obtains video data (content data) from an external storage medium, the external recording media recording and reproducing section 28 then transmits the video data via the bus 22 to the display control section 24.

The display control section 24 converts the video data to analog video signals, then transmits the analog video signals to the display section 25. By the way, the video data, (content data) is read from the external storage medium by the external recording media recording and reproducing section 28.

If the external recording media recording and reproducing section 28 obtains audio data (content data) from an external storage medium, the external recording media recording and reproducing section 28 then transmits the audio data via the bus 22 to the audio control section 26.

The audio control section 26 converts the audio data to analog audio signals, then transmits the analog audio signals to the speaker 27. By the way, the audio data (content data) is read from the external storage medium by the external recording media recording and reproducing section 28.

A storage medium 29 is disposed in the client terminal 2. The control section 23 transmits content data read from external storage media by the external recording media recording and reproducing section 28 via the bus 22 to a storage medium 29 to store the content data in the storage medium 29 (storing content data in the storage medium 29 as described above is referred to as "ripping").

If the control section 23 obtains video data (content data) from the'storage medium 29, the control section 23 then supplies the video data via the bus 22 to the display control section 24. The video data is for example equivalent to image data.

If the control section 23 obtains audio data (content data) from the storage medium 29, the control section 23 then supplies the audio data via the bus 22 to the audio control section 26.

The control section 23 also reads music data from the storage medium 29, and supplies the music data to the external recording media recording and reproducing section 28 to records the music data on external storage media.

A broadcast signal reception section 30 receives radio waves from each broadcast station, and then transmits radio waves to a tuner section 31.

For example, a user operates the operation input section 20 to specify a certain radio station. The tuner section 31 under the control of the control section 23 extracts radio broadcast signals of the frequency corresponding to the specified station from radio waves received by the broadcast signal reception section 30. The tuner section 31 then performs prescribed reception processes to generate audio data, and supplies the audio data via the bus 22 to the audio control section 26.

The audio control section 26 receives the audio data from the tuner section 31, and converts the audio data to analog audio signals. The audio control section 26 then transmits the analog audio signals to the speaker 27. The speaker 27 therefore outputs audio of a radio program broadcast from a radio station. As a result, a user can listen to audio of a radio program.

The control section 23 supplies audio data obtained by the tuner section 31 to the storage medium 29 to store it in the storage medium 29. In this manner, the control section 23 can record audio of a radio program.

The control section 23 also connects with the network NT through a communication control section 32 and a network interface 33 in order. The control section 23 therefore can access the portal server 3 and other servers SV1 through SV4 on the network NT. The control section 23 interchanges various kinds of information and data with the portal server 3 and other servers SV1 through SV4.

An encoder/decoder section 34 decodes compressed-coded content data, and transmits it to the display control section 24 or the audio control section 26. The compressed-coded content data is obtained from the network NT via the network interface 33 and the communication control section 32 in order, or the storage medium 29, or external storage media.

The encoder/decoder section 34 performs compression code processes for content data, audio data supplied from the tuner section 31 or the like to generate compressed-coded content data, and supplies it to the storage medium 29. For example, the content data which is neither compressed nor coded is read from external storage media.

The compressed-coded content data generated by the encoder/decoder section 34 therefore is stored in the storage medium 29 by the control of the control section 23.

The copyright management section 35 generates copyright management information for content data downloaded from the network NT via the network interface 33 and the communication control section 32 in order. The copyright management section 35 also generates copyright management information for content data read from external storage media by the external recording media recording and reproducing section 28.

The copyright management information generated by the copyright management section 35 is to be associated with corresponding content data, and to be stored in the storage medium 29 by the control of the control section 23.

The copyright management section 35 properly updates copyright management information associated with content data, when performing check-out processes of the content data between the storage medium 29 and a specific external storage medium, or when performing check-in processes of the content data between the storage medium 29 and a specific external storage medium. In this manner, the copyright management section 35 protects copyright of the content data.

A page information generation section 36 interprets page information to generate video data which is to be displayed on the display section 25. The page information includes extensible Markup Language (XML) files or Hyper Text Markup Language (HTML) files obtained from the network NT via the network interface 33 and the communication control section 32 in order. The page information generation section 36 then supplies the video data to the display control section 24.

An authentication processing section 37 connects with the portal server 3 and other servers SV1 through SV4 on the network NT via the network interface 33. The authentication processing section 37 performs authentication processes such as transmitting authentication information to the portal server 3 and other servers SV1 through SV4 via the communication control section 32 and the network interface 33 in order.

An authentication information storage section 38 stores authentication information. The authentication processing section 37 requires the authentication information when accessing the portal server 3 and other servers SV1 through SV4.

A radio broadcasting display control section 39, when receiving a radio program to let users listen to it, transmits request signals for requesting radio broadcast information relating to the radio program to the radio broadcast information delivery server SV3 corresponding to a radio station which broadcasts the received radio program via the communication control section 32 and the network interface 33 in order.

As a result, the radio broadcasting display control section 39 receives radio information transmitted from the radio information delivery server SV3 on the network NT via the network interface 33 and the communication control section 32 in order, and supplies the radio information to the display control section 24. The display section 25 therefore displays radio information which includes a title of the received radio program, a title of received music, and an artist name of the music.

(1-2-2) Directory Management

Figure 3:
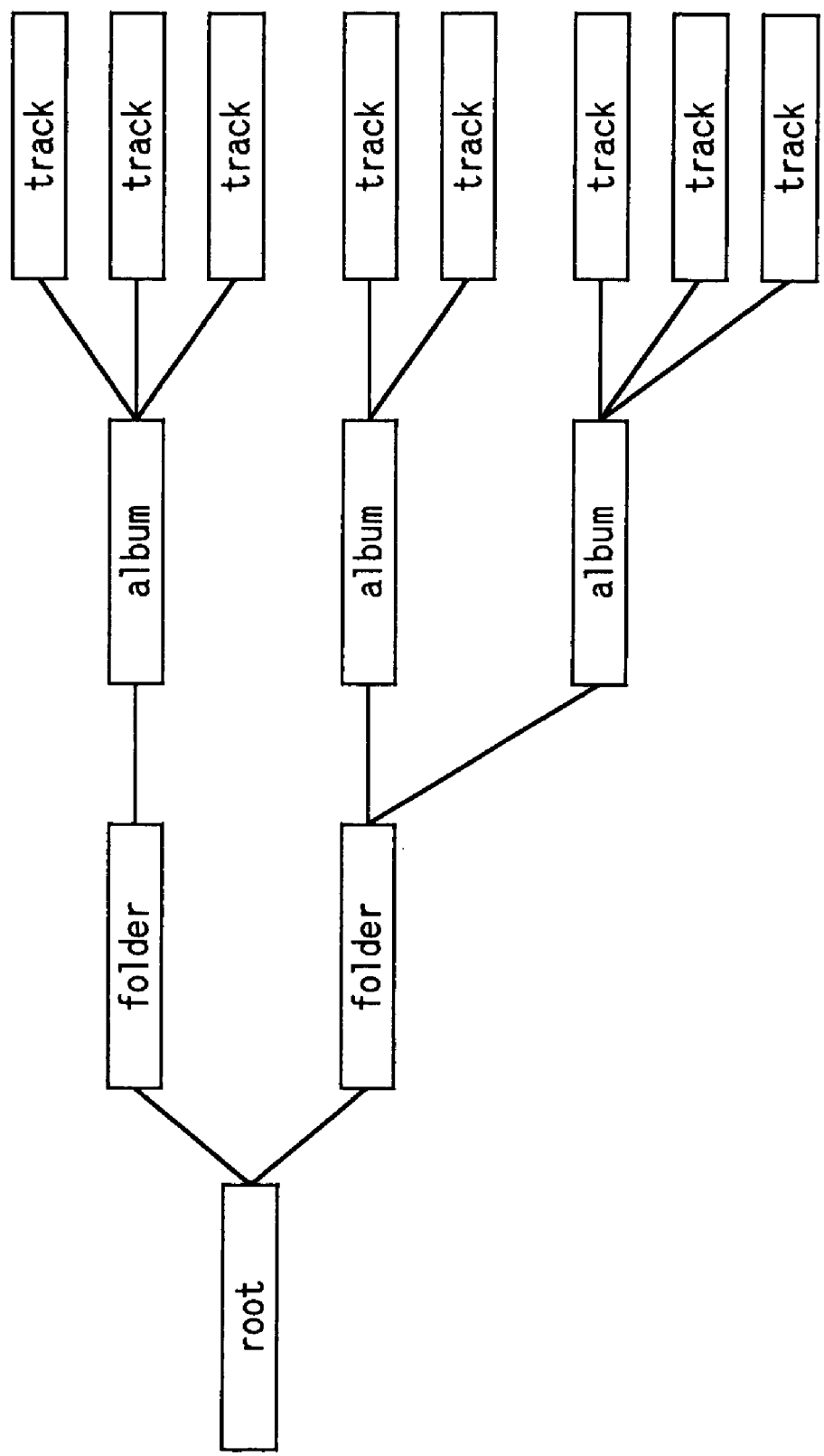
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
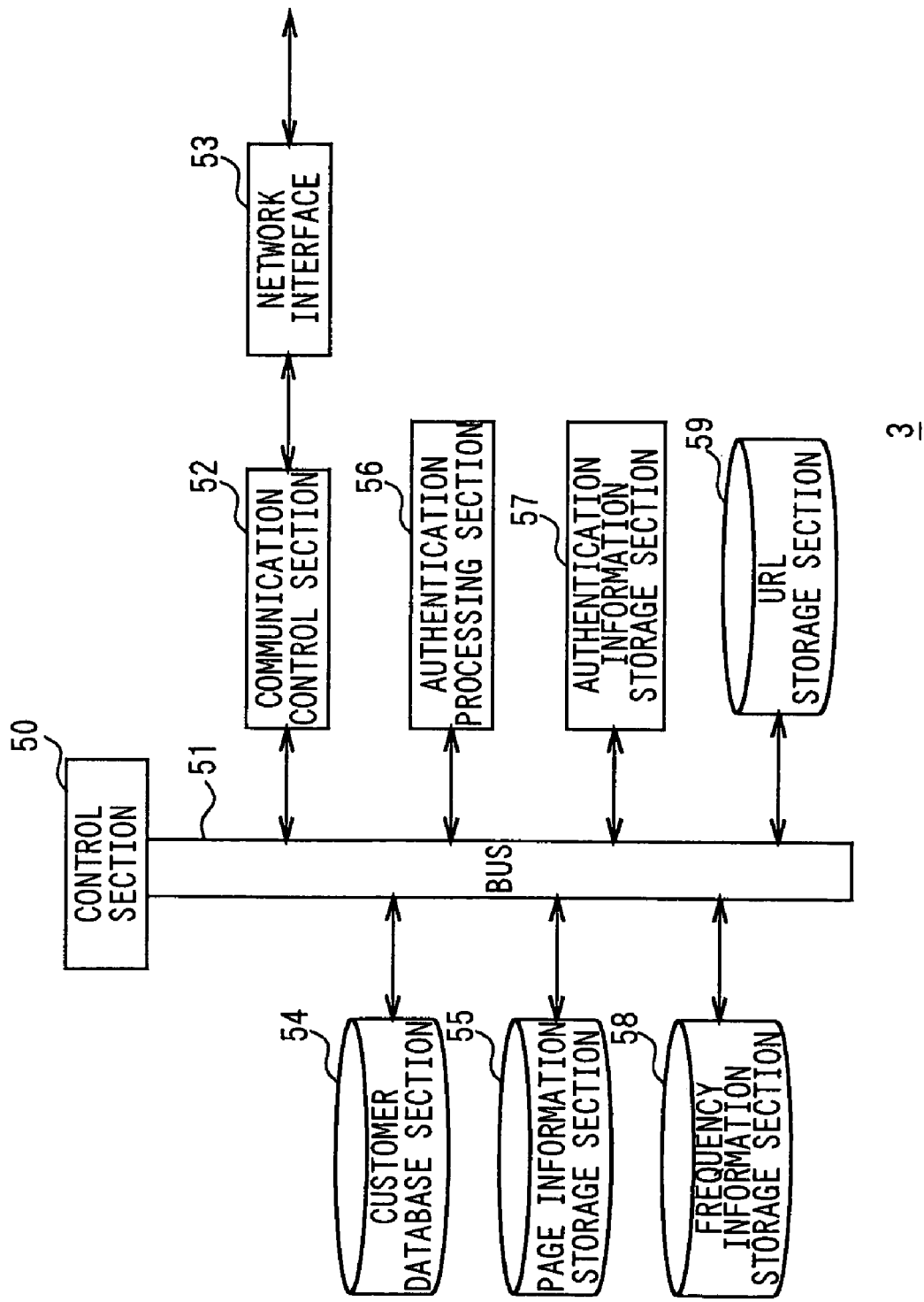
FIG. 4 is a block diagram showing the hardware configuration of a portal server using functional circuit blocks.

With reference to FIG. 4, the functional circuit block configuration of the portal server 3 will be described. The control section 50 of the portal server 3 controls operation of each circuit which is connected via a bus 51.

A communication control section 52 under the control of the control section 50 interchanges various kinds of information with the client terminal 2 and other servers SV1 through SV5 via a network interface 53.

A customer database section 54 stores a user's user Identification (ID) with its password information as customer information. The user is under contract with a-company operating the music related service provision system 1.

A page information storage section 55 stores page information and the like. The page information is being managed by a company operating the music related service provision system 1.

The page information is described in the XML language or the like. The page information includes Uniform Resource Locators (URLs) for accessing the music data delivery server SV1, the sales server SV2, the radio broadcast information delivery server SV3, the Internet radio server SV4 and the like.

An authentication processing section 56 receives the user ID information and password information transmitted from the client terminal 2 via the network-interface 53 and the communication control section 52 in order, and then performs user authentication processes. In the processes of user authentication, the authentication processing section 56 checks whether or not the received user ID information and password information are stored in the customer database section 54 as customer information.

After completing the user authentication processes, the authentication processing section 56 issues "portal authentication result information (equivalent to "authentication session ID information" described below)" showing the result of the user authentication process. The authentication processing section 56 then temporarily stores the portal authentication result information in an authentication information storage section 57.

If the result of the user authentication processes done by the authentication processing section 56 shows that the user is legitimate, the control section 50 transmits contractor's page information and portal authentication result information to the client terminal 2 via the communication control section 52 and the network interface 53 in order. The contractor's page information has been stored in a page information storage section 55.

If the result of the user authentication processes done by the authentication processing section 56 shows that the user is not legitimate, the control section 50 may transmit authentication error information and authentication failure notification page information to the client terminal 2 via the communication control section 52 and the network interface 53 in order. In this case, the authentication failure notification page information has been stored in the page information storage section 55, and showing the failure of authentication.

The client terminal 2 may obtain "portal authentication result information (equivalent to "authentication ticket" described below)" from the music data delivery server SV1, the sales server SV2 or the radio broadcast information delivery server SV3, after the music data delivery server SV1, the sales server SV2 or the radio broadcast information delivery server SV3 performs authentication processes for a user. In this case, the authentication processing section 56 receives the portal authentication result information from the user's client terminal 2 via the network interface 53 and the communication control section 52 in order, and compares it with the one which corresponds to the user and which is temporarily stored in the authentication information storage section 57.

That is to say, the authentication processing section 56 performs authentication processes for the portal authentication result information that the client terminal 2 received from the music data delivery server SV1, the sales server SV2 or the radio broadcast information delivery server SV3. In the authentication processes, the authentication processing section 56 performs a check process to check whether or not the received portal authentication result information is legitimate, and then transmits check result information showing the check result via the communication control section 52 and the network interface 53 to the music data delivery server SV1, the sales server SV2 or the radio broadcast information delivery server SV3.

A frequency information storage section 58 associates the followings together and stores them: a regional code identifying a region, such as a postal code; frequency information showing radio broadcast frequencies receivable in the region; a name of a radio station (which is also referred to as "radio station name") which broadcasts the radio programs; and a call sign which is unique to the radio station. The call sign is identification information to identify each radio station.

A URL storage section 59 associates each call sign with corresponding URL information, and stores them. The call sign is unique to each radio station which broadcasts radio programs. The URL information is utilized to acquire radio broadcast information. The radio broadcast information includes information relating to a radio program being broadcast from a radio station which corresponds to the associated call sign. The radio broadcast information for example includes a title of a radio program, an artist name and title of music being played in the radio program. The radio broadcast information is also referred to as "now-on-air information".

(1-4) Functional Circuit Block Configuration of Music Data Delivery Server SV1

Figure 5:
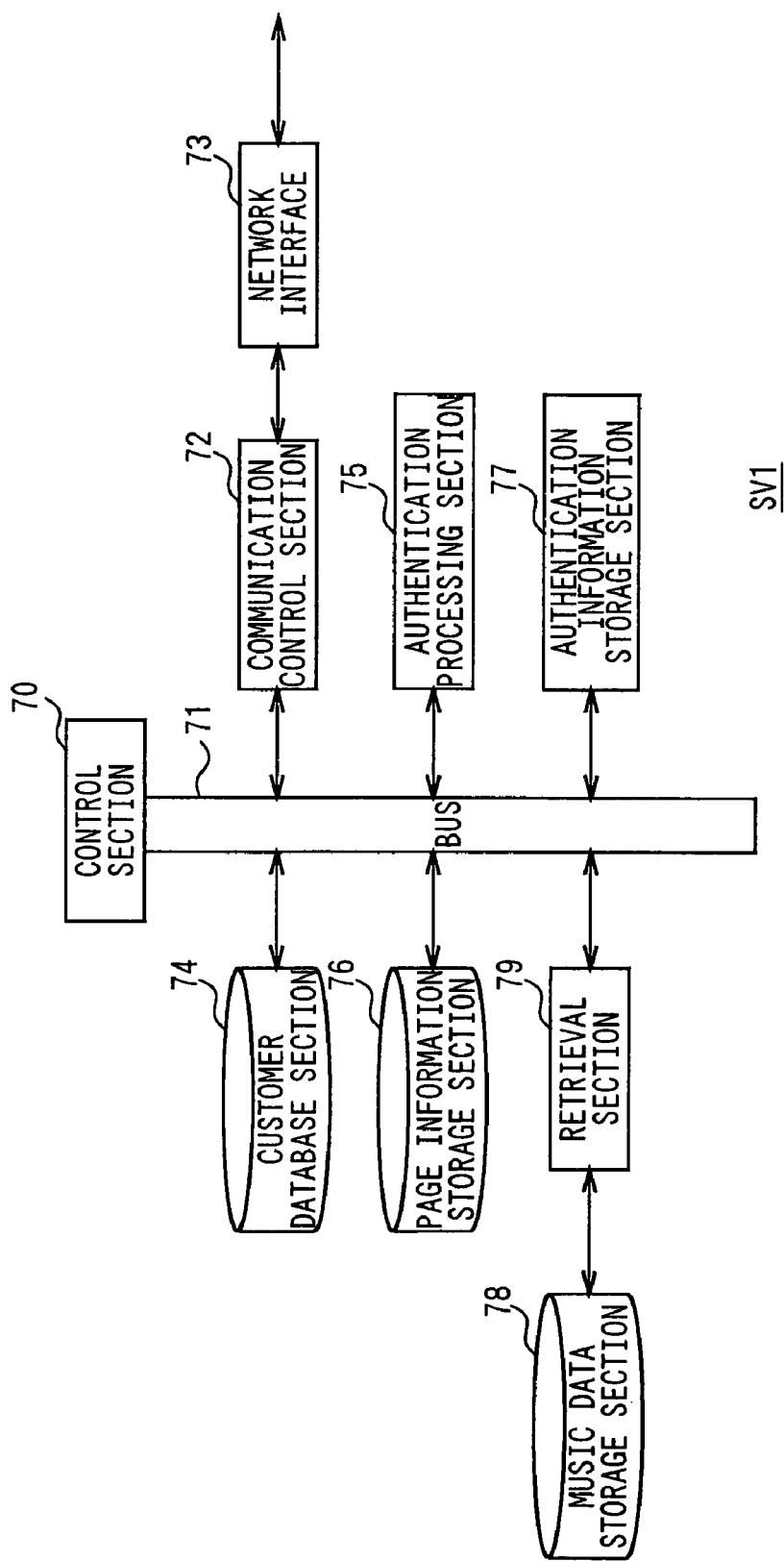
FIG. 5 is a block diagram showing the hardware configuration of a music data delivery server using functional circuit blocks.

With reference to FIG. 5, the functional circuit block configuration of the music data delivery server SV1 will be described. The control section 70 of the music data delivery server SV1 controls operation of each circuit which is connected via a bus 71.

A communication control section 72 under the control of the control section 70 interchanges various kinds of information and various kinds of data such as content data with the client terminal 2, the portal server 3, and the like via a network interface 73.

A customer database section 74 stores a user's user ID information with its password information as customer information. The user is under contract with a company operating the music related service provision system 1. By the way, an authentication processing section 75 may have functions to authenticate a user based on portal authentication result information (this information is issued by the portal server 3 to the client terminal 2 and transmitted from the client terminal 2 to the music data delivery server SV1). In this case, the customer database section 74 can be omitted.

A page information storage section 76 stores page information and the like. The page information is utilized for music data distribution, and presenting downloadable music data (this page information is also referred to as "music-data-distribution page information"). The page information is being managed by the music data delivery server SV1.

The music-data-distribution page information, described in the XML language or the like, has a structure in which a user of the client terminal 2 can select music data which the user wants to be downloaded.

When the client terminal 2 transmits a page information acquisition request signal which requests music-data-distribution page information, the control section 70 receives the page information acquisition request signal via the network interface 73 and the communication control section 72 in order. The control section 70 then transmits music-data-distribution page information stored in the page information storage section 76 to the client terminal 2 via the communication control section 72 and the network interface 73 in order, in response to the page information acquisition request signal.

When the client terminal 2 transmits its user's user ID information and password information, the authentication processing section 75 receives the user ID information and the password information via the network interface 73 and the communication control section 72 in order. The authentication processing section 75 then performs a user authentication process. In the user authentication process, the authentication processing section 75 checks whether or not the received user ID information and password information has been registered with the customer database section 74 as customer information.

The authentication processing section 75 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 75 receives the portal authentication result information via the network interface 73 and the communication control section 72 in order, and then transmits it to the portal server 3 via the communication control section 72 and the network interface 73 in order.

In this manner, the portal authentication result information is transmitted from the authentication processing section 75 to the portal server 3. The portal server 3 then performs authentication processes for the portal authentication result information (i.e. the check process described above), and then transmits check results information. The authentication processing section 75 receives the check results information via the network interface 73 and the communication control section 72 in order, and then checks whether or not the user is legitimate based on the check results information. In this case, a legitimate user means someone who has contracted with a company operating the music related service provision system 1.

When completing the user authentication process, the authentication processing section 75 issues server authentication result information (equivalent to a "service session ID information" described below). The server authentication result information shows the result of the user authentication process.

If the result of the user authentication process done by the authentication processing section 75 shows that the user is legitimate, the control section 70 transmits music-data-distribution page information and the server authentication result information to the client terminal 2 via the communication control section 72 and the network interface 73 in order. The music-data-distribution page information has been prepared for contractors, and stored in the page information storage section 76.

Whereas if the result of the user authentication process done by the authentication processing section 75 shows that the user is not legitimate, the control section 70 transmits authentication error information and authentication failure notification page information to the client terminal 2 via the communication control section 72 and the network interface 73 in order. In this case, the authentication failure notification page information has been stored in the page information storage section 76, and showing the failure of authentication.

An authentication information storage section 77 temporarily stores the server authentication result information issued by the authentication processing section 75. The authentication information storage section 77 also stores other authentication information which is necessary for the authentication processing section 75 to perform user authentication processes. In the user authentication process, a user of the client terminal 2 is authenticated.

A music data storage section 78 associates each compressed-coded music data with its retrieval key, and stores them. The music data has been compressed/coded by the ATRAC3, the MP3, or the like. The retrieval key is equivalent to content ID information and the like.

By the way, after the music-data-distribution page information is transmitted to the client terminal 2, the client terminal 2 may transmits-a download request signal. The download request signal requests download of music data which a user wants to be downloaded, and includes a retrieval key for searching the music data. A retrieval section 79 receives the download request signal via the network interface 73 and the communication control section 72 in order, and obtains the retrieval key from it.

The retrieval section 79 then searches a plurality of music data stored in the music data storage section 78 for the music data which meet retrieval conditions shown in the retrieval key. That is to say, the retrieval section 79 searches for the music data which a user wants to be downloaded.

As a result, the control section 70 transmits the searched music data (which a user wants to be downloaded) to the client terminal 2 via the communication control section 72 and the network interface 73 in order.

At this time, the control section 70 transmits fee-charging information to the fee-charging server SV5 via the communication control section 72 and the network interface 73 in order. The fee-charging information is used for charging users a fee for the music data downloaded to the client terminal 2. The fee-charging server SV5 performs fee-charging processes for charging users a fee for the downloaded music data.

(1-5) Functional Circuit Block Configuration of Sales Server SV2

Figure 6:
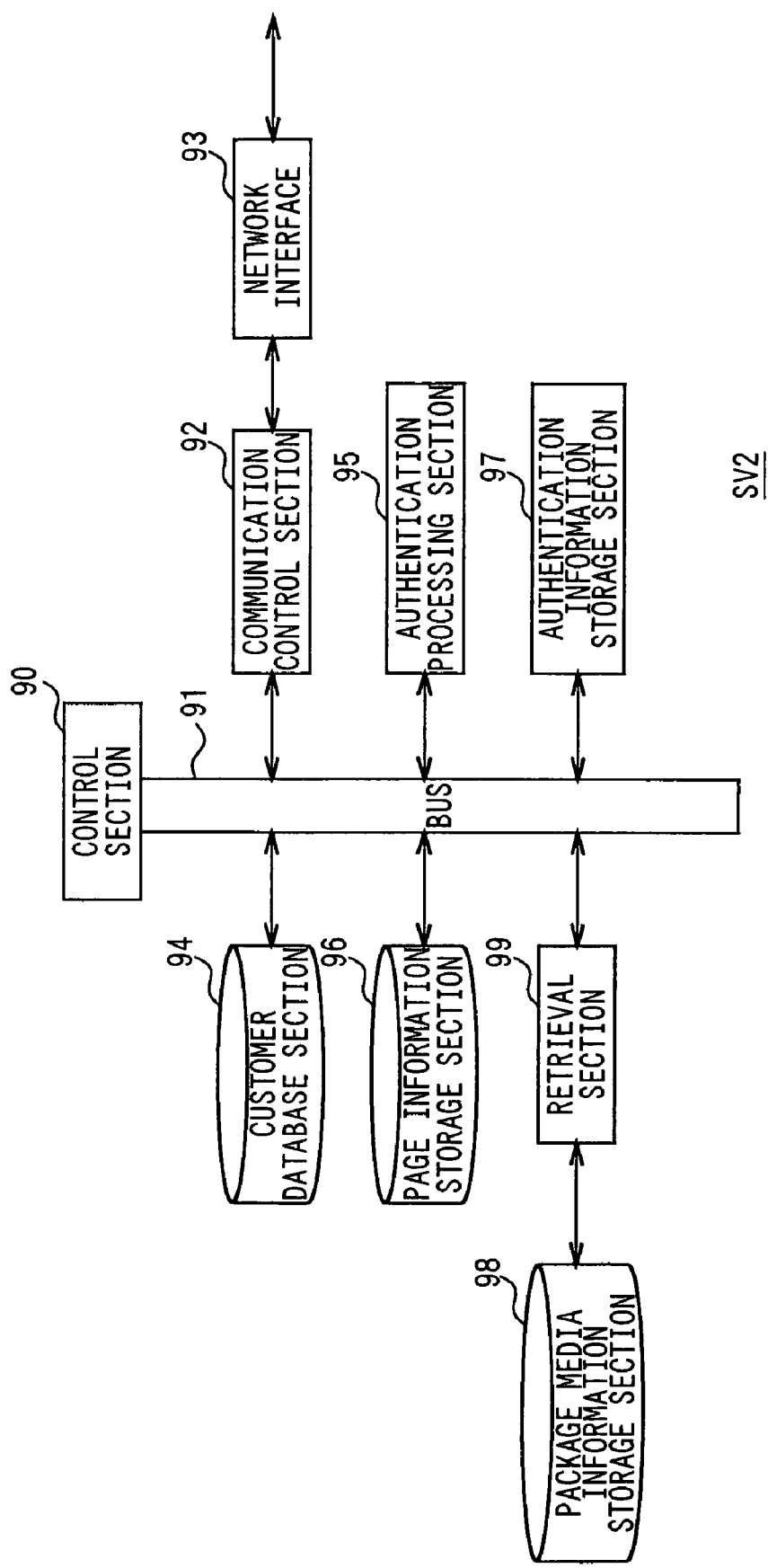
FIG. 6 is a block diagram showing the hardware configuration of a sales server using functional circuit blocks.

With reference to FIG. 6, the functional circuit block configuration of the sales server SV2 will be described. The control section 90 of the sales server SV2 controls operation of each circuit which is connected via a bus 91.

A communication control section 92 under the control of the control section 90 interchanges various kinds of information with the client terminal 2, the portal server 3, and the like via a network interface 93.

A customer database section 94 stores a user's user ID information with its password information as customer information. The user is under contract with a company operating the sales server SV2. By the way, an authentication processing section 95 may have functions to authenticate a user based on portal authentication result information (this information is issued by the portal server 3 to the client terminal 2 and transmitted from the client terminal 2 to the sales server SV2). In this case, the customer database section 94 can be omitted.

A page information storage section 96 stores page information and the like. The page information is utilized for sales of package media, and presenting package media such as CDs and DVDs for sale (this page information is also referred to as "package-media-sales page information"). The page information is being managed by the sales server SV2.

The package-media-sales page information, described in the XML language or the like, has a structure in which a user of the client terminal 2 can select package media such as CDs and DVDS which the user wants to buy.

When the client terminal 2 transmits a page information acquisition request signal which requests package-media-sales page information, the control section 90 receives the page information acquisition request signal via the network interface 93 and the communication control section 92 in order. The control section 90 then transmits package-media-sales page information stored in the page information storage section 96 to the client terminal 2 via the communication control section 92 and the network interface 93 in order, in response to the page information acquisition request signal.

When the client terminal 2 transmits its user's user ID information and password information, the authentication processing section 95 receives the user ID information and the password information via the network interface 93 and the communication control section 92 in order. The authentication processing section 95 then performs a user authentication process. In the user authentication process, the authentication processing section 95 checks whether or not the received user ID information and password information has been registered with the customer database section 94 as customer information.

The authentication processing section 95 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 95 receives the portal authentication result information via the network interface 93 and the communication control section 92 in order, and then transmits it to the portal server 3 via the communication control section 92 and the network interface 93 in order.

In this manner, the portal authentication result information is transmitted from the authentication processing section 95 to the portal server 3. The portal server 3 then performs authentication processes for the portal authentication result information (i.e. the check process described above), and then transmits check results information. The authentication processing section 95 receives the check results information via the network interface 93 and the communication control section 92 in order, and then checks whether or not the user is legitimate based on the check results information. In this case, a legitimate user means someone who has contracted with a company operating the music related service provision system 1.

When completing the user authentication process, the authentication processing section 95 issues server authentication result information (equivalent to a "service session ID information" described below). The server authentication result information shows the result of the user authentication process.

If the result of the user authentication process done by the authentication processing section 95 shows that the user is legitimate, the control section 90 transmits package-media-sales page information and the server authentication result information to the client terminal 2 via the communication control section 92 and the network interface 93 in order. The package-media-sales page information has been prepared for contractors, and stored in the page information storage section 96.

Whereas if the result of the user authentication process done by the authentication processing section 95 shows that the user is not legitimate, the control section 90 transmits, authentication error information and authentication failure notification information to the client terminal 2 via the communication control section 92 and the network interface 93 in order. In this case, the authentication failure notification information has been stored in the page information storage section 96, and showing the failure of authentication.

An authentication information storage section 97 temporarily stores the server authentication result information issued by the authentication processing section 95. The authentication information storage section 97 also stores other authentication information which is necessary for the authentication processing section 95 to perform user authentication processes. In the user authentication process, a user of the client terminal 2 is authenticated.

A package media information storage section 98 associates each piece of package media information with a corresponding retrieval key, and stores them. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information relating to package media such as CDs and DVDs. A retrieval section 99 receives the media information request signal via the network interface 93 and the communication control section 92 in order, and obtains a retrieval key from it. The retrieval key is used for searching specific package media information.

The retrieval section 99 then searches a plurality of piece of package media information stored in the package media information storage section 98 for the piece of package media information which meets retrieval conditions shown in the retrieval key.

As a result, the control section 90 transmits the searched package media information to the client terminal 2 via the communication control section 92 and the network interface 93 in order, to show a user the package media information relating to a specific package medium.

When the client terminal 2 transmits a purchase request signal which requests the purchase of the package medium, the control section 90 receives the purchase request signal via the network interface 93 and the communication control section 92 in order, and then performs sale processes. In the sale processes, the control section 90 for example does shipping procedures to ship the package medium to a user of the client terminal 2.

At this time, the control section 90 transmits fee-charging information to the fee-charging server SV5 via the communication control section 92 and the network interface 93 in order. The fee-charging information is used for charging users a fee for the purchased package medium. The fee-charging server SV5 performs fee-charging processes to charge users a fee for the purchased package medium.

After the fee-charging server SV5 completes the fee-charging processes for the user, the control section 90 subsequently transmits sale completion page information to the client terminal 2 via the communication control section 92 and the network interface 93 in order. The sale completion page information shows that the sale process of the package medium has been completed.

(1-6) Functional Circuit Block Configuration of Radio Broadcast Information Delivery Server SV3

Figure 7:
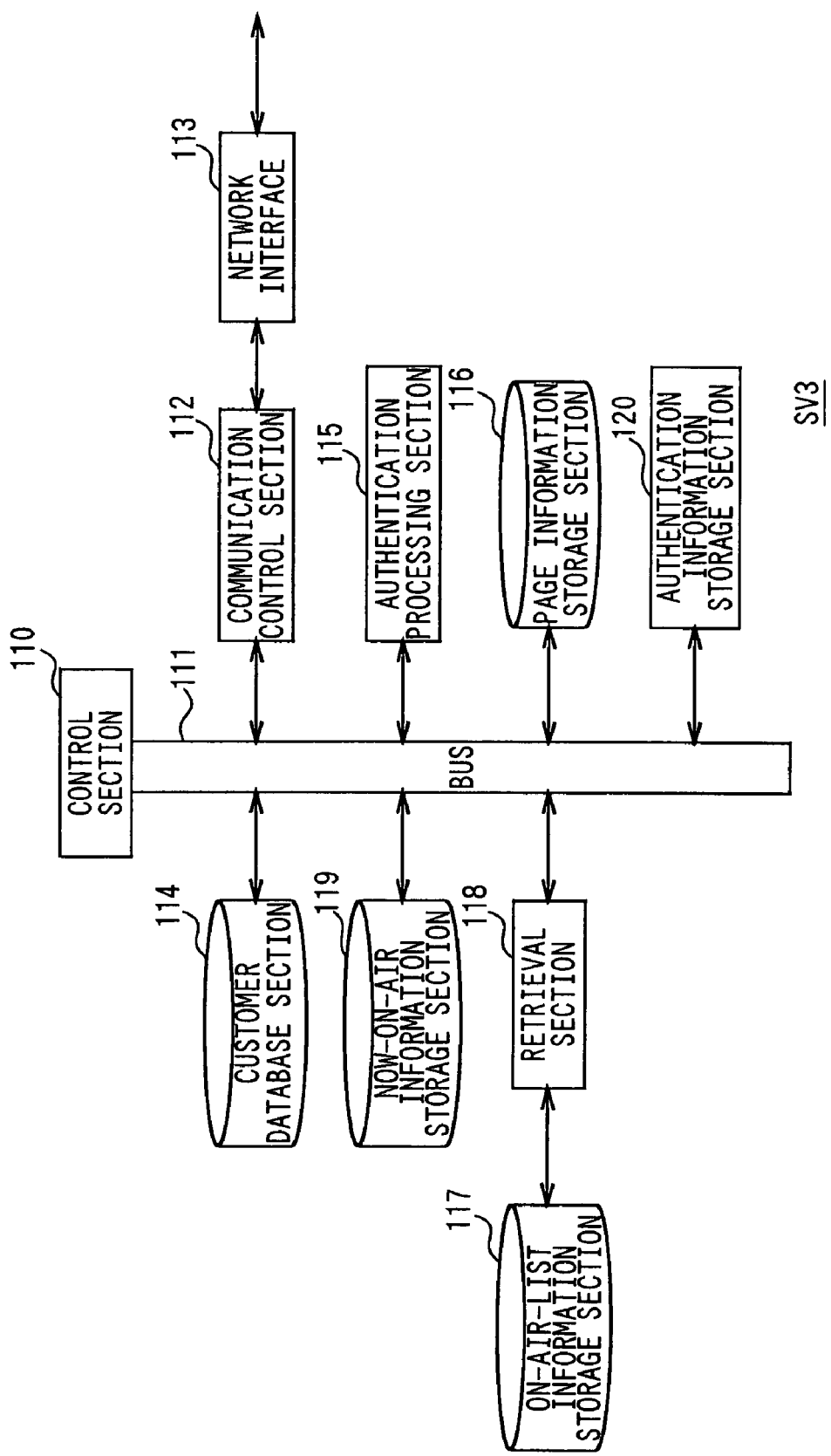
FIG. 7 is a block diagram showing the hardware configuration of a radio broadcast information delivery server using functional circuit blocks.

With reference to FIG. 7, the functional circuit block configuration of the radio broadcast information delivery server SV3 will be described. The control section 110 of the radio broadcast information delivery server SV3 controls operation of each circuit which is connected via a bus 111.

A communication control section 112 under the control of the control section 110 interchanges various kinds of information with the client terminal 2, the portal server 3, and the like via a network interface 113.

A customer database section 114 stores a user's user ID information with its password information as customer information. The user is under contract with a company operating the radio broadcast information delivery server SV3. By the way, an authentication processing section 115 may have functions to authenticate a user based on portal authentication result information (this information is issued by the portal server 3 to the client terminal 2 and transmitted from the client terminal 2 to the radio broadcast information delivery server SV3). In this case, the customer database section 114 can be omitted.

A page information storage section 116 stores page information and the like. The page information is used for acquisition of radio broadcast information. In this case, the radio broadcast information relates to radio programs which have already been broadcast from a radio station that corresponds to the radio broadcast information delivery server SV3. The radio broadcast information is also referred to as "on-air-list information", and the page information used for acquisition of on-air-list information is also referred to as "on-air-list-information-distribution page information". The page information is being managed by the radio broadcast information delivery server SV3.

The on-air-list-information-distribution page information, described in the XML language or the like, provides an input box and the like in which a user of the client terminal 2 can input retrieval keys of on-air-list information which the user wants to obtain. Radio program titles, the date and time of broadcast of the radio program, and the like could be the retrieval key.

An on-air-list information storage section 117 stores on-air-list information. The on-air-list information is generated by listing the following information: a title of a radio program which has already been broadcast from a radio station that corresponds to the radio broadcast information delivery server SV3; the start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112 in order. The control section 110 then transmits on-air-list-information-distribution page information which was stored in the page information storage section 116 to the client terminal 2 via the communication control section 112 and the network interface 113 in order, in response to the page information acquisition request signal.

When a user input a retrieval key of on-air-list information which the user wants to obtain into the on-air-list-information-distribution page information, the client terminal 2 transmits an on-air-list information request signal which includes the retrieval key. The on-air-list information request signal requests the download of the on-air-list information. A retrieval section 118 receives the on-air-list information request signal via the network interface 113 and the communication control section 112 in order, and obtains the retrieval key from the on-air-list information request signal.

The retrieval section 118 then searches the whole on-air-list information stored in the on-air-list information storage section 117 based on the retrieval key to extract the part of on-air-list information which meets retrieval conditions shown in the retrieval key. In this manner, the part of on-air-list information which a user wants to acquire is obtained.

The control section 110 subsequently transmits the obtained on-air-list information to the client terminal 2 via the communication control section 112 and the network interface 113 in order.

A now-on-air information storage section 119 stores now-on-air information. The now-on-air information consists of the following information: a title of a radio program which is currently being broadcast from a radio station that corresponds to the radio broadcast information delivery server SV3; the start and end time of broadcast of the program; an artist name and title of music being currently played in the program; the start time of broadcast of the music, and the like.

When the client terminal 2 transmits its user's user ID information and password information with a now-on-air information request signal which requests now-on-air information, the authentication processing section 115 receives the user ID information and the password information via the network interface 113 and the communication control section 112 in order. The authentication processing section 115 then performs a user authentication process. In the user authentication process, the authentication processing section 115 checks whether or not the received user ID information and password information has been registered with the customer database section 114 as customer information.

The authentication processing section 115 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 115 receives the portal authentication result information via the network interface 113 and the communication control section 112 in order, and then transmits it to the portal server 3 via the communication control section 112 and the network interface 113 in order.

In this manner, the portal authentication result information is transmitted from the authentication processing section 115 to the portal server 3. The portal server 3 then performs authentication processes for the portal authentication result information (i.e. the check process described above), and then transmits check results information. The authentication processing section 115 receives the check results information via the network interface 113 and the communication control section 112 in order, and then checks whether or not the user is legitimate based on the check results information. In this case, a legitimate user means someone who has contracted with a company operating the music related service provision system 1.

When completing the user authentication process, the authentication processing section 115 issues server authentication result information (equivalent to a "service session ID information" described below). The server authentication result information shows the result of the user authentication process.

If the result of the user authentication process done by the authentication processing section 115 shows that the user is legitimate, the control section 110 transmits the server authentication result information and the now-on-air information stored in the now-on-air information storage section 119 to the client terminal 2 via the communication control section 112 and the network-interface 113 in order.

Whereas if the result of the user authentication process done by the authentication processing section 115 shows that the user is not legitimate, the control section 110 transmits authentication error information and authentication failure notification page information to the client terminal 2 via the communication control section 112 and the network interface 113 in order. In this case, the authentication failure notification page information has been-stored in the page information storage section 116, and showing the failure of authentication.

As described above, when the control section 110 receives a request for now-on-air information from a user, the control section 110 supplies now-on-air information, if the authentication result shows that the user is legitimate. Whereas if the authentication result shows that the user is not legitimate, the control section 110 does not provide radio broadcast information delivery services, i.e., it does not supply now-on-air information. The radio broadcast information delivery service is a service which is provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to perform user authentication processes. In the user authentication process, a user of the client terminal 2 is authenticated.

(1-7) Brief Overview of Processes of Each Server

With reference to sequence charts shown in FIG. 8 through FIG. 13, brief overview of processes between the client terminal 2 and the portal server 3 will be described. Also, brief overview of processes between the client terminal 2 and other servers such as the music data delivery server SV1, the sales server SV2, and the radio broadcast information delivery server SV3 will be described.

(1-7-1) User Authentication Process Between Client Terminal 2 and Portal Server 3

Figure 8:
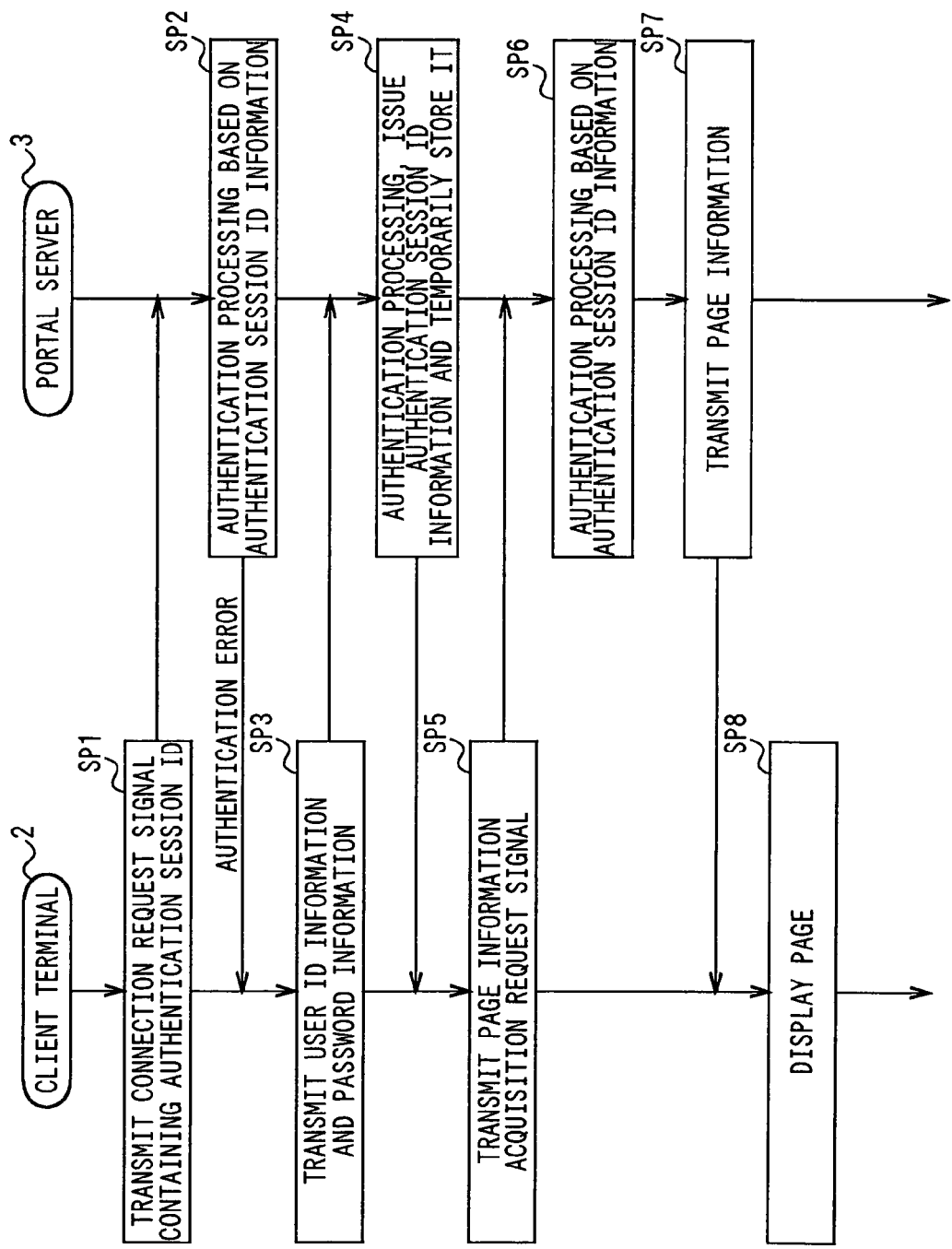
FIG. 8 is a sequence chart showing a user authentication process between the client terminal and the portal server.

With reference to FIG. 8, user authentication processes between the client terminal 2 and the portal server 3 will be described.

When a user under contract with a company operating the music related service provision system 1 operates the client terminal 2 to turn it on, the operation input section 20 of the client terminal 2 detects an operation input signal. Alternatively, when a user pushes a particular operation button of the operation input section 20, the operation input section 20 detects an operation input signal. The input processing section 21 converts the operation input signal to an operation command, and supplies it to the control section 23. The control section 23 therefore starts authentication request processes.

At step SP1, the control section 23 of the client terminal 2 which has started authentication request processes generates a connection request signal, and transmits the connection request signal to the portal server 3 via the communication control section 32 and the network interface 33 in order. The connection request signal contains authentication session ID information which was temporarily stored in the authentication information storage section 38, and the like.

The authentication session ID information is issued by the portal server 3 each time when the communication connection between the client terminal 2 and the portal server 3 is established to perform various kinds of processes such as the user authentication process. The authentication session ID information identifies each communication connection state (i.e., session).

The authentication session ID information has a certain period of validity for the user authentication processes and the like. The period of validity starts when the portal server 3 issues it. The period of validity for example is one minute.

In cases in which the client terminal 2 that already obtained authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of user authentication processes or the like.

In this case, the authentication information storage section 38 temporarily stores the authentication session ID information, which was issued by the portal server 3 when the communication connection between the client terminal 2 and the portal server 3 was established for the purpose of user authentication processes or the like at a time in the past.

When the client terminal 2 transmits connection request signal, the control section 50 of the portal server 3 receives the connection request signal via the network interface 53 and the communication control section 52 in order, at step SP2. The control section 50 then transmits authentication session ID information and the like in the connection request signal to the authentication processing section 56.

The authentication processing section 56 under the control of the control section 50 performs authentication processes based on the authentication session ID information and the like. This authentication session ID information was received as the connection request signal from the client terminal 2.

As a result, if the authentication processing section 56 determines that a user of the client terminal 2 is not legitimate, the control section 50 transmits authentication error information showing authentication error to the client terminal 2 via the communication control section 52 and the network interface 53 in order. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information transmitted from the portal server 3 via the network interface 33 and the communication control section 32 in order. The control section 23 subsequently obtains user ID information, password information, and the like from the authentication information storage section 38, and then transmits the user ID information, the password information, and the like to the portal server 3 via the communication control section 32 and the network interface 33 in order.

At step SP4, the control section 50 of the portal server 3 receives the user ID information, the password information, and the like transmitted from the client terminal 2 via the network interface 53 and the communication control section 52 in order, and then supplies the user ID information, the password information, and the like to the authentication processing section 56.

The authentication processing section 56 under the control of the control section 50 performs user authentication processes. In the user authentication process, the authentication processing section 56 checks whether or not the user ID information, the password information, and the like received from the client terminal 2 exist in customer information registered with the customer database section 54.

As a result, if the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the issued authentication session ID information and the like in the authentication information storage section 57.

The control section 50 then transmits the authentication session ID information and the like to the client terminal 2 via the communication control section 52 and the network interface 53 in order. The authentication session ID information and the like were issued by the authentication processing section 56 for the client terminal 2.

At step SP5, the control section 23 of the client terminal 2 receives the authentication session ID information and the like transmitted from the portal server 3 via the network interface 33 and the communication control section 32 in order, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 then transmits a page information acquisition request signal with the authentication session ID information and the like (which were received from the portal server 3 and temporarily stored in the authentication information storage section 38) to the portal server 3 via the communication control section 32 and the network interface 33 in order. The page information acquisition request signal requests page information from the portal server 3.

At step SP6, the control section 50 of the portal server 3 receives the page information acquisition request signal, the authentication session ID information, and the like transmitted from the client terminal 2 via the network interface 53 and the communication control section 52 in order, and then supplies the authentication session ID information, and the like to the authentication processing section 56.

The authentication processing section 56 under the control of the control section 50 then performs user authentication processes. In the user authentication process, the authentication processing section 56 compares the authentication session ID information and the like received from the client terminal 2 with the ones temporarily stored in the authentication information storage section 57. The information temporarily stored in the authentication information storage section 57 was issued for the client terminal 2 at step SP4.

At step SP7, if the authentication result shows that a user of the client terminal 2 is legitimate, the authentication processing section 56 determines that the request for page information received from the client terminal 2 is legitimate. The authentication processing section 56 then extends the period of validity of authentication session ID information and the like.

The control section 50 therefore reads the page information requested by a user from the page information storage section 55, and transmits the page information, the authentication session ID information, and the like to the client terminal 2 via the communication control section 52 and the network interface 53 in order. The authentication session ID information and the like have their period of validity extended by the authentication processing section 56.

At step SP8, the control section 23 of the client terminal 2 receives the page information, authentication session ID information and the like transmitted from the portal server 3 via the network interface 33 and the communication control section 32 in order. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates video data of page based on the page information supplied from the control section 23. The video data of page contains links to the music data delivery server SV1, the sales server SV2, and the radio broadcast information delivery server SV3. The page information generation section 36 subsequently supplies the video data to the display control section 24.

The display control section 24 performs digital-to-analog conversion for the video data supplied from the page information generation section 36 to generate analog video signals. The display control section 24 then supplies the analog video signals to the display section 25 which displays images of page of the portal server 3 based on the analog video signals.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored by the above-noted step SP5 are updated to the ones having their period of validity extended.

(1-7-2) User Authentication Process Between Client Terminal 2 and Servers SV1 Through SV3

Figure 9:
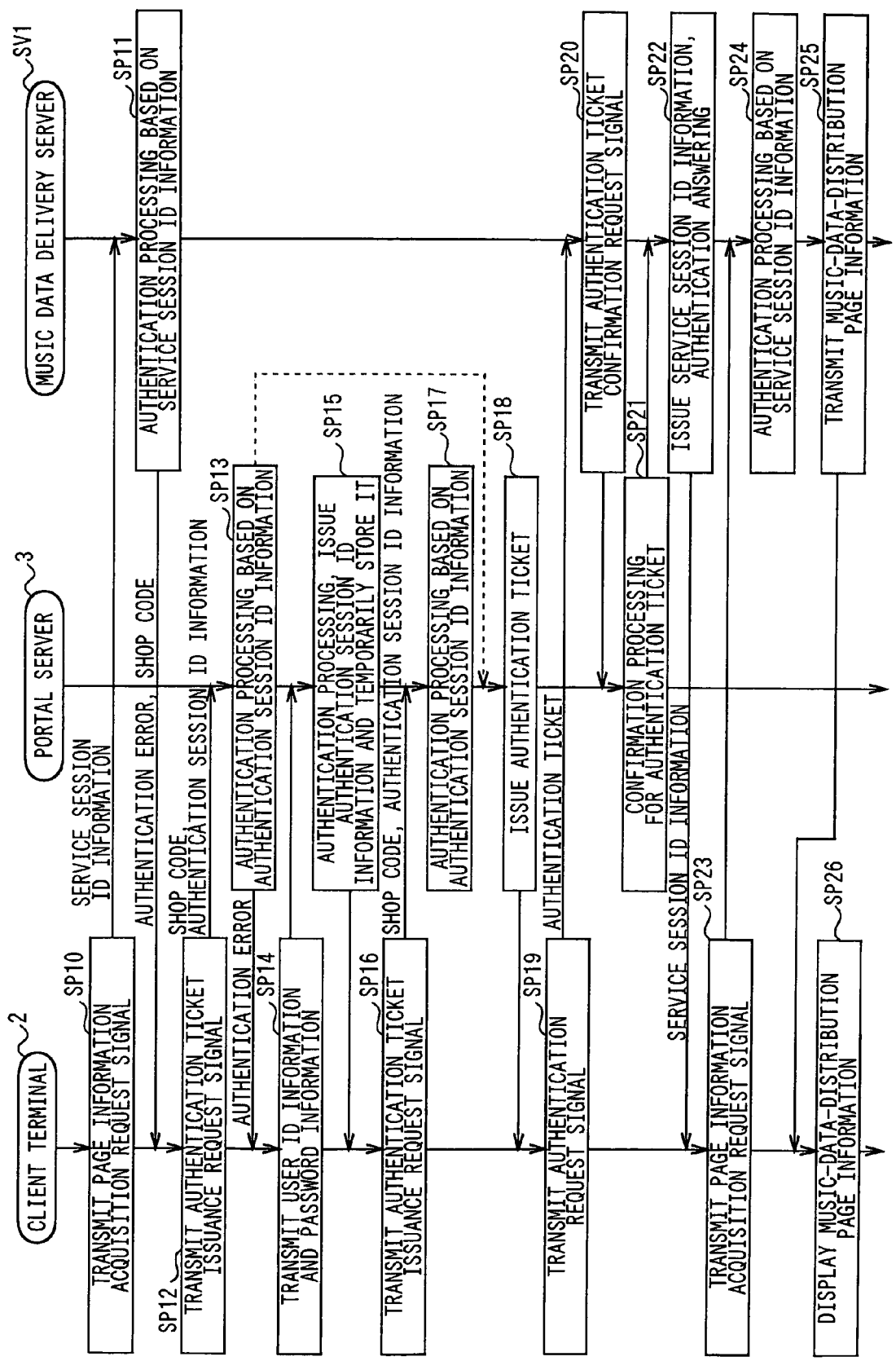
FIG. 9 is a sequence chart showing a user authentication process between the client terminal and the music data delivery server.

With reference to FIG. 9, user authentication processes will be described. The user authentication process is executed between the client terminal 2 and the music data delivery server SV1, the sales server SV2, or the radio broadcast information delivery server SV3.

The user authentication process may be executed after the client terminal 2 obtains page information from the portal server 3 as described above (FIG. 8). In this case, the user authentication process is executed, when the client terminal 2 accesses the music data delivery server SV1, the sales server SV2, or the radio broadcast information delivery server SV3 based on links embedded in the page information. This user authentication process is also referred to as an "indirect access authentication process".

The user authentication process may be executed when the client terminal 2 directly accesses the music data delivery server SV1, the sales server SV2, or the radio broadcast information delivery server SV3 based on URL information and the like previously bookmarked (registered). In this case, the client terminal 2 does not have to obtain page information from the portal server 3. This user authentication process is also referred to as a "direct access authentication process".

The indirect access authentication process can be executed in any combination of the following: the client terminal 2 and the music data delivery server SV1; the client terminal 2 and the sales server SV2; and, the client terminal 2 and the radio broadcast information delivery server SV3.

The direct access authentication process also can be executed in any combination of the following: the client terminal 2 and the music data delivery server SV1; the client terminal 2 and the sales server SV2; and, the client terminal 2 and the radio broadcast information delivery server SV3.

The only difference between the indirect access authentication process and the direct access authentication process is the way to obtain URL information which the client terminal 2 uses to access the music data delivery server SV1, the sales server SV2, and the radio broadcast information delivery server SV3. The indirect access authentication process and the direct access authentication process perform the same procedures after obtaining the URL information.

Accordingly, the situation in which the client terminal 2 accesses the music data delivery serve SV1 will be described to avoid repeatedly explaining. Both the indirect access authentication process and the direct access authentication process will be collectively described as a user authentication process.

At step SP10, the control section 23 of the client terminal 2 transmits a page information acquisition request signal, service session ID information read from the authentication information storage section 38, and the like to the music data delivery server SV1 via the communication control section 32 and the network interface 33 in order. At this time, the control section 23 of the client terminal 2 uses URL information which is embedded in page information as links, or which is previously bookmarked (registered). The page information acquisition request signal requests music-data-distribution page information (if the client terminal 2 accesses the sales server SV2 or the radio broadcast information delivery server SV3, the page information acquisition request signal requests package-media-sales page information or on-air-list-information-distribution page information).

Each time when the communication connection between the client terminal 2 and the music data delivery server SV1, the sales server SV2 or the radio broadcast information delivery server SV3 is established to perform various kinds of processes such as the user authentication process, the service session ID information is issued by the connected server SV1, SV2 or SV3. The service session ID information identifies each communication connection state (i.e., session).

The service session ID information has a certain period of validity for the user authentication processes and the like, in the same way as the above-noted authentication session ID information. The period of validity starts when the music data delivery server SV1, the sales server SV2 or the radio broadcast information delivery server SV3 issues it. The period of validity for example is one minute.

In cases in which the client terminal 2 that already has service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data-delivery server SV1, the sales server SV2 or the radio broadcast information delivery server SV3 prevents the issued authentication session ID information from being used improperly by someone who has not contracted with a company operating the music related service provision system 1 for the purpose of user authentication processes or the like.

In this case, the authentication information storage section 38 temporarily stores the service session ID information, which was issued by the music data delivery server SV1, the sales server SV2 or the radio broadcast information delivery server SV3 when the communication connection between the client terminal 2 and the server SV1, SV2 or SV3 was established for the purpose of user authentication processes or the like at a time in the past.

At step SP11, the control section 70 of the music data delivery server SV1 receives the page information acquisition request signal, service session ID information, and the like transmitted by the client terminal 2 via the network interface 73 and the communication control section 72 in order. The control section 70 of the music data delivery server SV1 then supplies the service session ID information and the like to the authentication processing section 75.

The authentication processing section 75 under the control of the control section 70 performs user authentication processes. In the user authentication process, the authentication processing section 75 compares the service session ID information and the like received from client terminal 2 with the ones temporarily stored in the authentication information storage section 77.

As a result, if the authentication result shows that a user of the client terminal 2 is not legitimate, the authentication processing section 75 determines that the request for music-data-distribution page information received from the client terminal 2 is not legitimate. For example, the authentication result shows that a user of the client terminal 2 is not legitimate, when the service session ID information received from the client terminal 2 has expired.

The control section 70 subsequently transmits authentication error information showing authentication error, and a shop code identifying the music data delivery server SV1 to the client terminal 2 via the communication control section 72 and the network interface 73 in order, because the authentication processing section 75 determines that a user of the client terminal 2 is not legitimate.

At step SP12, the control section 23 of the client terminal 2 receives the authentication error information and shop code transmitted from the music data delivery server SV1 via the network interface 33 and the communication control section 32 in order. The control section 23 of the client terminal 2 then recognizes that the user is not authenticated as legitimate based on the authentication error information, and temporarily stores the shop code received from the music data delivery server SV1 in the authentication information storage section 38.

The control section 23 subsequently generates an authentication ticket issuance request signal. The authentication ticket issuance request signal requests the issue of an authentication ticket which is used for accessing the music data delivery server SV1. The control section 23 then transmits the authentication ticket issuance request signal, a shop code of the music data delivery server SV1, authentication session ID information temporarily stored in the authentication information storage section 38, and the like to the portal server 3 via the communication control section 32 and the network interface 33 in order.

At step SP13, the control section 50 of the portal server 3 receives the authentication ticket issuance request signal, shop code, authentication session ID information, and the like transmitted from the client terminal 2 via the network interface 53 and the communication control section 52 in order, and supplies them to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

As a result, the authentication result shows that a user of the client terminal 2 is not legitimate, the authentication processing section 56 determines that the request for authentication ticket received from the client terminal 2 is not legitimate. For example, the authentication result shows that a user of the client terminal 2 is not legitimate, when the authentication session ID information received from the client terminal 2 has expired.

The control section 50 subsequently transmits authentication error information showing authentication error to the client terminal 2 via the communication control section 52 and the network interface 53 in order, because the authentication processing section 56 determines that a user of the client terminal 2 is not legitimate.

Whereas if the authentication result shows that a user of the client terminal 2 is legitimate, the authentication processing section 56 determines that the request for authentication ticket received from the client terminal 2 is legitimate. For example, the authentication result shows that a user of the client terminal 2 is legitimate, when the authentication session ID information received from the client terminal 2 has not expired.

In cases in which the authentication result by the authentication processing section 56 shows that a user of the client terminal 2 is legitimate, the control section 50 proceeds to step SP18 which is described below.

At step SP14, the control section 23 of the client terminal 2 receives the authentication error information transmitted from the portal server 3 via the network interface 33 and the communication control section 32 in order. The control section 23 of the client terminal 2 then reads user ID information, password information and the like from the authentication information storage section 38, and transmits the user ID information, the password information and the like to the portal server 3 via the communication control section 32 and the network interface 33 in order.

At step SP15, the control section 50 of the portal server 3 receives the user ID information, password information and the like transmitted from the client terminal 2 via the network interface 53 and the communication control section 52 in order, and supplies the user ID information, the password information and the like to the authentication processing section 56.

Therefore, the authentication processing section 56 under the control of the control section 50 performs user authentication processes. In the user authentication process, the authentication processing section 56 checks whether or not the user ID information, password information and the like received from the client terminal 2 exists in customer information registered with the customer database section 54.

As a result, if the authentication result shows that a user of the client terminal 2 is legitimate, the authentication processing section 56 under the control of the control section 50 issues authentication session ID information (portal authentication result information) for the communication connection being currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like issued to the client terminal 2 by the authentication processing section 56 to the client terminal 2 via the communication control section 52 and the network interface 53 in order.

At step SP16, the control section 23 of the client terminal 2 receives the authentication session ID information and the like transmitted from the portal server 3 via the network interface 33 and the communication control section 32 in order, and temporarily stores the authentication session ID information and the like in the authentication information storage section 38 using the authentication processing section 37.

The control section 23 then regenerate an authentication ticket issuance request signal which requests the issue of authentication tickets. The control section 23 subsequently transmits the authentication ticket issuance request signal, the shop code temporarily stored in the authentication information storage section 38, the authentication session ID information and the like being temporarily stored, to the portal server 3 via the communication control section 32 and the network interface 33 in order.

In the present embodiment, the client terminal 2 temporarily stores the shop code in the authentication information storage section 38. However, this invention is not limited to this. The client terminal 2 may interchange again the shop code with the portal server 3 while performing the steps of SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, shop code, authentication session ID information and the like transmitted from the client terminal 2 via the network interface 53 and the communication control section 52 in order, and supplies them to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

If the authentication result shows that a user of the client terminal 2 is legitimate, the authentication processing section 56 determines that the request for authentication tickets received from the client terminal 2 is legitimate. For example, the authentication result shows that a user of the client terminal 2 is legitimate, when the authentication session ID information and the like received from the client terminal 2 have not expired yet.

Then, the control section 50 proceeds to step SP18, as a user of the client terminal 2 is authenticated as legitimate by the authentication processing section 56.

At step SP18, the authentication processing section 56 under the control of the control section 50 issues an authentication ticket (portal authentication result information) and the like based on the shop code and authentication ticket issuance request signal received from the client terminal 2 by the above-noted step SP17. The authentication ticket allows the client terminal 2 to access the music data delivery server SV1 which corresponds to the shop code.

The authentication processing section 56 under the control of the control section 50 temporarily stores the issued authentication ticket and the like in the authentication information storage section 57, and extends the period of validity of authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53 in order.

At step SP19, the control section 23 of the client terminal 2 receives the authentication ticket, authentication session ID information having its period of validity extended, and the like transmitted from the portal server 3 via the network interface 33 and the communication control section 32 in order, and supplies the authentication session ID information to the authentication processing section 37.

The control section 23 transmits the authentication ticket received from the portal server 3, an authentication request signal, and the like to the music data delivery server SV1 via the communication control section 32 and the network interface 33 in order.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored by the above-noted step SP16 are updated to the ones having their period of validity extended.

At step SP20, the control section 70 of the music data delivery server SV1 receives the authentication request signal, authentication ticket and the like transmitted from the client terminal 2 via the network interface 73 and the communication control section 72 in order.

The control section 70 then transmits the authentication ticket received from the client terminal 2, an authentication ticket confirmation request signal which requests the confirmation of the authentication ticket, and the like to the portal server 3 via the communication control section 72 and the network interface 73 in order.

At step SP21, the control section 50 of the portal server 3 receives the authentication ticket confirmation request signal, authentication ticket, and the like transmitted from the music data delivery server SV1 via the network interface 53 and the communication control section 52 in order. The control section 50 of the portal server 3 then supplies the authentication ticket confirmation request signal, authentication ticket, and the like to the authentication processing section 56.

In response to the authentication ticket confirmation request signal, the authentication processing section 56 under the control of the control section 50 performs confirmation processes to confirm the authentication ticket received from the music data delivery server SV1. In the confirmation process, the authentication processing section 56 compares the authentication ticket and the like received from the music data delivery server SV1 with the ones temporarily stored in the authentication information storage section 57.

If the confirmation result shows that the authentication ticket and the like received from the music data delivery server SV1 are legitimate, the control section 50 transmits confirmation result information to the music data delivery server SV1 via the communication control section 52 and the network interface 53 in order, the confirmation result information showing that the authentication ticket and the like are legitimate.

At step SP22, the control section 70 of the music data delivery server SV1 receives the confirmation result information transmitted from the portal server 3 via the network interface 73 and the communication control section 72 in order, and supplies the confirmation result information to the authentication processing section 75.

In response to the confirmation result information, the authentication processing section 75 under the control of the control section 70 issues service session ID information (server authentication result information) for the communication connection being currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73 in order.

At step SP23, the control section 23 of the client terminal 2 receives the service session ID information and the like transmitted from the music data delivery server SV1 via the network interface 33 and the communication control section 32 in order, and temporarily stores the service session ID information and the like in the authentication information storage section 38 using the authentication processing section 37.

Therefore, the control section 23 transmits a page information acquisition request signal which requests music-data-distribution page information, the service session ID information and the like to the music data delivery server SV1 via the communication control section 32 and the network interface 33 in order. The service session ID information was received from the music data delivery server SV1 and temporarily stored in the authentication information storage section 38.

At step SP24, the control section 70 of the music data delivery server SV1 receives the page information acquisition request signal, service session ID information and the like transmitted from the client terminal 2 via the network interface 73 and the communication control section 72 in order, and supplies the service session ID information and the like to the authentication processing section 75.

The authentication processing section 75 under the control of the control section 70 performs user authentication processes. In the user authentication process, the authentication processing section 75 compares the service session ID information and the like received from the client terminal 2 with the ones temporarily stored in the authentication information storage section 77. The information temporarily stored in the authentication information storage section 77 was issued to the client terminal 2 by the above-noted step SP22.

If the authentication result shows that a user of the client terminal 2 is legitimate, the authentication processing section 75 determines that the request for music-data-distribution page information received from the client terminal 2 is legitimate. For example, the authentication result shows that a user of the client terminal 2 is legitimate, when the service session ID information and the like received from the client terminal 2 have not expired yet.

Then, the control section 70 proceeds to step SP25, as a user of the client terminal 2 is authenticated as legitimate by the authentication processing section 75.

At step SP25, the control section 70 reads the music-data-distribution page information which is requested by a user from the page information storage section 76. The control section 70 also extends the period of validity of the service session ID information and the like issued to the client terminal 2 using the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73 in order.

At step SP26, the control section 23 of the client terminal 2 receives the music-data-distribution page information, the service session ID information having its period of validity extended, and the like transmitted from the music data delivery server SV1 via the network interface 33 and the communication control section 32 in order. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like which have their period of validity extended were received from the music data delivery server SV1. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored by the above-noted step SP23 are updated to the ones having their period of validity extended.

The page information generation section 36 generates video data based on the music-data-distribution page information, and supplies the video data to the display control section 24.

The display control section 24 performs digital-to-analog conversion for the video data supplied from the page information generation section 36 to generate analog video signals. The display control section 24 then supplies the analog video signals to the display section 25. The display section 25 displays images of the music-data-distribution page based on the analog video signals.

(1-7-3) Music Related Service Provision Processes

After completing the user authentication process (FIG. 9) between the client terminal 2 and the music data delivery server SV1 or the sales server SV2 or the radio broadcast information delivery server SV3, the music related service provision process is executed. With reference to FIG. 10 through FIG. 13, the music related service provision process will be described in the following situation: the client terminal 2 receives music data distribution services using music-data-distribution page information obtained during the user authentication processing from the music data delivery server SV1; the client terminal 2 receives sales services using package-media-sales page information obtained during the user authentication processing from the sales server SV2; and the client terminal 2 receives radio broadcast information distribution services using on-air-list-information-distribution page information obtained during the user authentication processing from the radio broadcast information delivery server SV3.

(1-7-3-1) Music Data Distribution Service Provision Process

Figure 10:
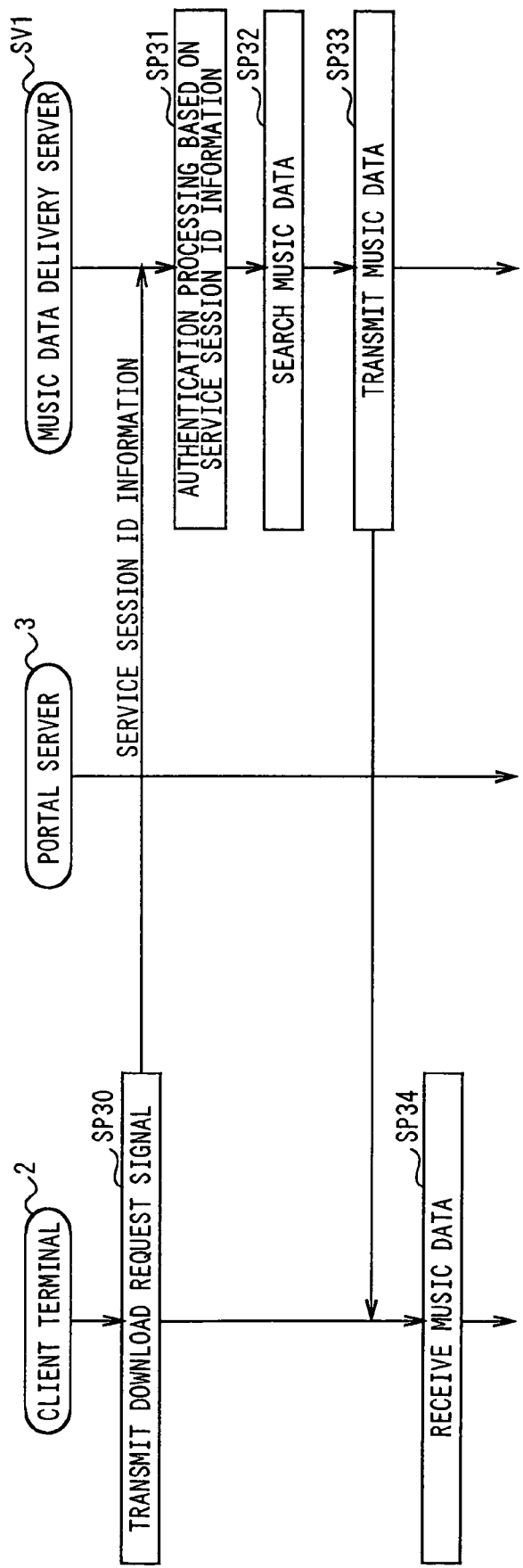
FIG. 10 is a sequence chart showing a music data distribution service provision process.

With reference to FIG. 10, the music data distribution service provision process will be described. In the music data distribution service provision process, the client terminal 2 receives the music data distribution service from the music data delivery server SV1.

At step SP30, if control commands which select a part of the music-data-distribution page displayed as images on the display section 25 are input from the input processing section 21, the control section 23 of the client terminal 2 generates a download request signal. The download request signal requests the download of music data which a user wants to be downloaded.

The control section 23 then transmits the download request signal, the service session ID information, and the like to the music data delivery server SV1 via the communication control section 32 and the network interface 33 in order. The service session ID information was issued by the music data delivery server SV1 and temporarily stored in the authentication information storage section 38.

At step SP31, the control section 70 of the music data delivery server-SV1 receives the download request signal, service session ID information and the like transmitted from the client terminal 2 via the network interface 73 and the communication control section 72 in order, and supplies the service session ID information and the like to the authentication processing section 75.

The authentication processing section 75 under the control of the control section 70 performs user authentication processes. In the user authentication process, the authentication processing section 75 compares the service session ID information and the like received from the client terminal 2 with the ones temporarily stored in the authentication information storage section 77.

If the authentication processing section 75 authenticates that a user is legitimate, the control section 70 proceeds to step SP32. In this case, the user has requested the download of music data using the client terminal 2.

At step SP32, the retrieval section 79 performs search processes based on a retrieval key in the download request signal. In the search process, the retrieval section 79 searches a plurality of music data stored in the music data storage section 78 for the music data corresponding to the retrieval conditions shown in the retrieval key, which a user wants to be downloaded.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data (which a user wants to be downloaded) found by the retrieval, section 79 from the music data storage section 78. The control section 70 then transmits the music data, the service session ID information having its period of validity extended by the authentication processing section 75, and the like to the client terminal 2 via the communication control section 72 and the network interface 73 in order.

At step SP34, the control section 23 of the client terminal 2 receives the music data (which a user wants to be downloaded), the service session ID information having its period of validity extended, and the like transmitted from the music data delivery server SV1 via the network interface 33 and the communication control section 32 in order. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like which have their period of validity extended were received from the music data delivery server SV1. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

As described above, the client terminal 2 is capable of downloading the music data which a user wants to obtain using music data distribution services provided by the music data delivery server SV1.

(1-7-3-2) Sales Service Provision Process

Figure 11:
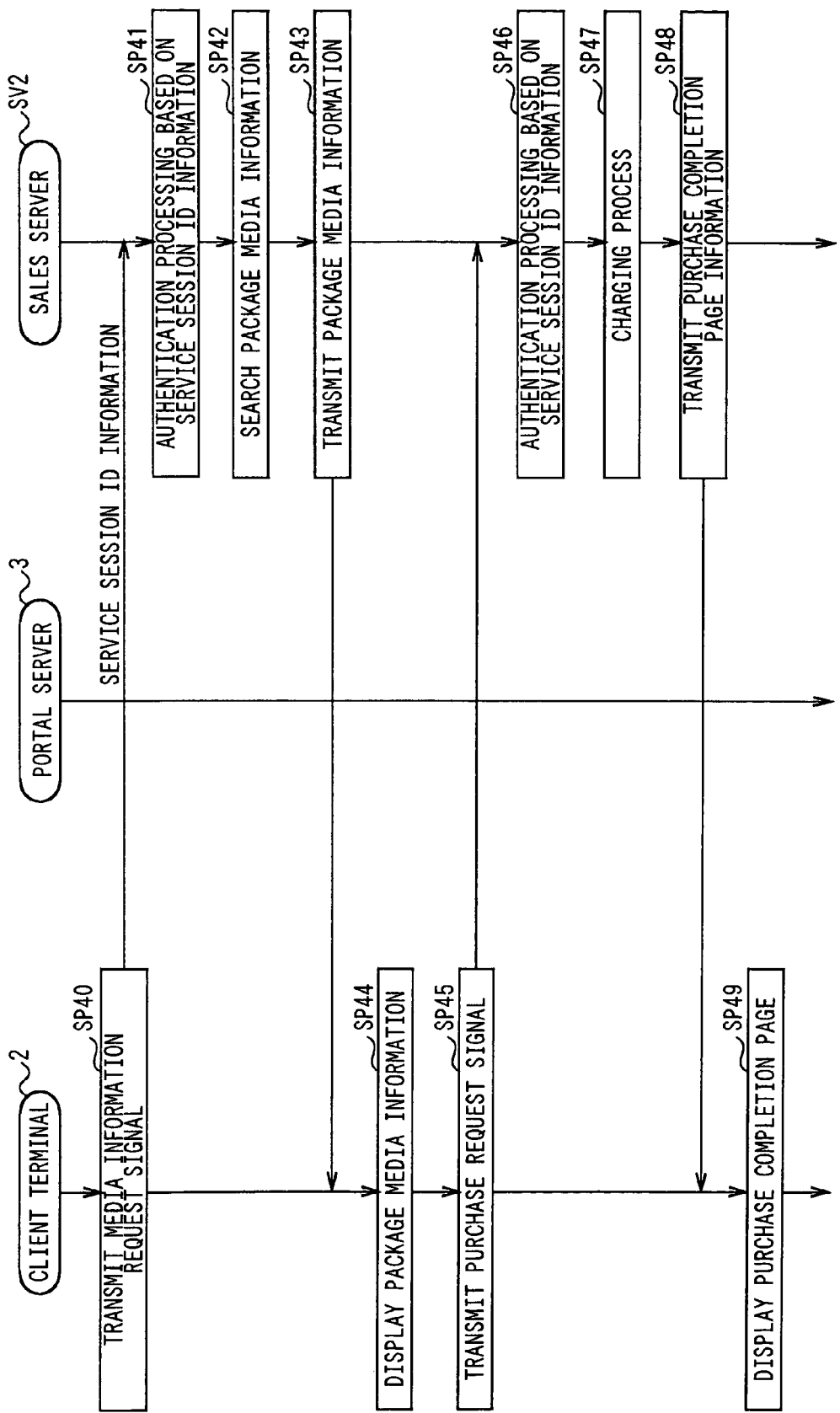
FIG. 11 is a sequence chart showing a sales service provision process.

With reference to FIG. 11, the sales service provision process will be described. In the sales service provision process, the client terminal 2 receives sales services from the sales server SV2.

At step SP40, if control commands-which selects a part of the package-media-sales page information displayed as images on the display section 25 are input from the input processing section 21, the control section 23 of the client terminal 2 generates a media information request signal. The media information request signal requests package media information relating to a specific package media which corresponds to the control commands.

The control section 23 then transmits the media information request signal, the service session ID information and the like to the sales server SV2 via the communication control section 32 and the network interface 33 in order. The service session ID information was issued by the sales server SV2 and temporarily stored in the authentication information storage section 38.

At step SP41, the control section 90 of the sales server SV2 receives the media information request signal, the service session ID information and the like transmitted from the client terminal 2 via the network interface 93 and the communication control section 92 in order, and then supplies the service session ID information and the like to the authentication processing section 95.

The authentication processing section 95 under the control of the control section 90 performs user authentication processes. In the user authentication process, the authentication processing section 95 compares the service session ID information and the like received from the client terminal 2 with the ones temporarily stored in the authentication information storage section 97.

If the authentication processing section 95 authenticates that a user is legitimate, the control section 90 proceeds to step SP42. In this case, the user has requested the package media information relating to the package media using the client terminal 2.

At step SP42, the retrieval section 99 performs search processes based on a retrieval key in the media information request signal. In the search process, the retrieval section 99 searches a plurality of pieces of package media information stored in the package media information storage section 98 for a certain piece of package media information which corresponds to retrieval conditions shown in the retrieval key.

When the retrieval section 99 has the piece of package media information found, the control section 90 extends the period of validity of the service session ID information and the like issued to the client terminal 2 using the authentication processing section 95, and then proceeds to step SP43.

At step SP43, the control section 90 reads the package media information found by the retrieval section 99 from the package media information storage section 98. The control section 90 then transmits the package media information, the service session ID information having its period of validity extended by the authentication processing section 95, and the like to the client terminal 2 via the communication control section 92 and the network interface 93 in order.

At step SP44, the control section 23 of the client terminal 2 receives the package media information, the service session ID information having its period of validity extended, and the like transmitted from the sales server SV2 via the network interface 33 and the communication control section 32 in order, and supplies the package media information to the page information generation section 36. The control section 23 of the client terminal 2 also supplies the service session ID information and the like received from the sales server SV2 to the authentication processing section 37.

The authentication processing section 37 under the control of the control section 23 temporarily stores the service session ID information and the like in the authentication information storage section 38. The service session ID information and the like which have their period of validity extended were received from the sales server SV2. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the package media information supplied from the control section 23. The page information generation section 36 then converts the video data to analog video signals using the display control section 24, and supplies the analog video signals to the display section 25.

After the display section 25 starts to display images of the package media information based on the analog video signals, the control section 23 proceeds to step SP45.

At step SP45, if control commands that request the purchase of the package media corresponding to the package media information displayed as images on the display section 25 are input from the input processing section 21, the control section 23 generates a purchase request signal in response to the control commands. The purchase request signal requests the purchase of the package media.

The control section 23 then transmits the purchase request signal, the service session ID information having its period of validity extended, and the like to the sales server SV2 via the communication control section 32 and the network interface 33 in order. The service session ID information was received from the sales server SV2 and temporarily stored in the authentication information storage section 38.

At step SP46, the control section 90 of the sales server SV2 receives the purchase request signal, the service session ID information and the like transmitted from the client terminal 2 via the network interface 93 and the communication control section 92 in order, and supplies the service session ID information and the like to the authentication processing section 95.

The authentication processing section 95 under the control of the control section 90 performs user authentication processes. In the user authentication process, the authentication processing section 95 compares the service session ID information and the like received from the client terminal 2 with the ones temporarily stored in the authentication information storage section 97.

As a result, if the authentication processing section 95 authenticates that the user who requests the purchase of package media using the client terminal 2 is legitimate, the control section 90 proceeds to step SP47.

At step SP47, the control section 90 performs sales processes. In the sales process, the control section 90 executes procedures to deliver the requested package media to the user of the client terminal 2. The control section 90 also transmits fee-charging information to the fee-charging server SV5 via the communication control section 92 and the network interface 93 in order. The fee-charging information is used for charging the user a fee for the purchased package media. Therefore, the fee-charging server SV5 performs fee-charging processes to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing the completion of the purchase of package media, the service session ID information having its period of validity extended by the authentication processing section 95, and the like to the client terminal 2 via the communication control section 92 and the network interface 93 in order.

At step SP49, the control section 23 of the client terminal 2 receives the purchase completion page information, the service session ID information having its period of validity extended, and the like transmitted from the sales server SV2 via the network interface 33 and the communication control section 32 in order, and supplies the purchase completion page information to the page information generation section 36. The control section 23 also supplies the service session ID information and the like received from the sales server SV2 to the authentication processing section 37.

The authentication processing section 37 under the control of the control section 23 temporarily stores the service session ID information and the like in the authentication information storage section 38. The service session ID information and the like which have their period of validity extended were received from the sales server SV2. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the purchase completion page information supplied from the control section 23. The page information generation section 36 then converts the video data to analog video signals using the display control section 24, and supplies the analog video signals to the display section 25.

Therefore, the control section 23 can display images of the purchase completion page based on the analog video signals on the display section 25.

As described above, the client terminal 2 allows a user to purchase package media he/she wants using the sales services provided by the sales server SV2.

(1-7-3-3) On-Air-List Information Distribution Service Provision Process

Figure 12:
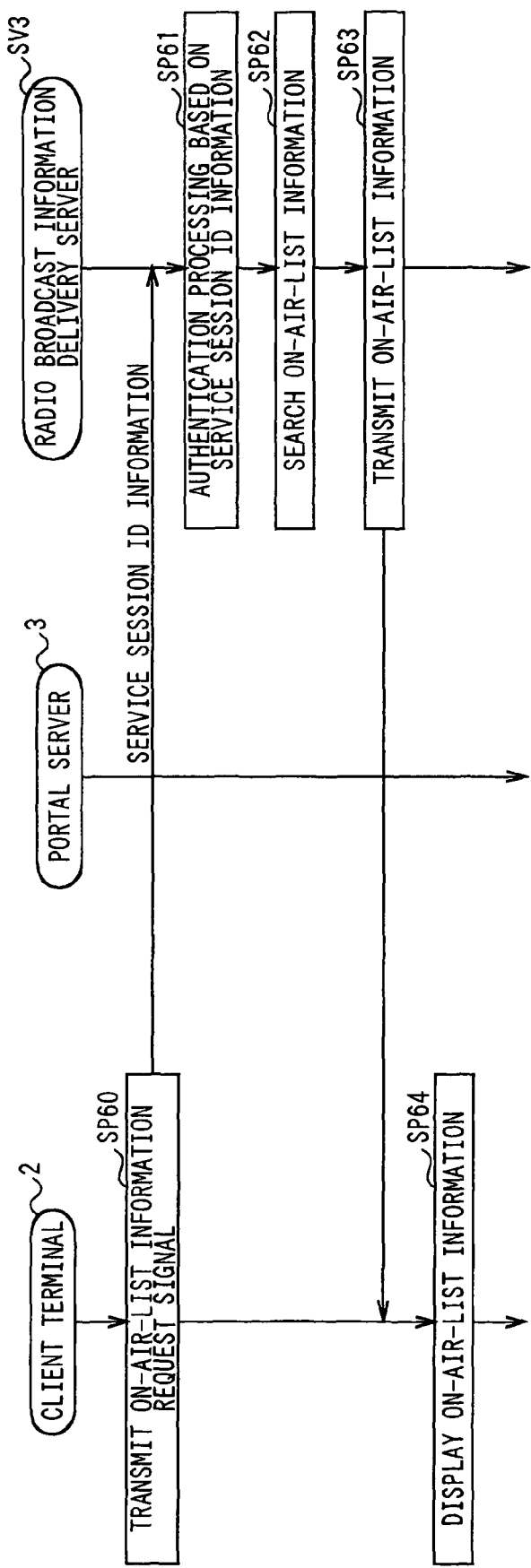
FIG. 12 is a sequence chart showing a radio broadcast information (on-air list information) distribution service provision process.

With reference to FIG. 12, radio broadcast information distribution service provision processes will be described. In the radio broadcast information distribution service provision process, the client terminal 2 receives the radio broadcast information distribution service, especially the on-air-list information distribution service from the radio broadcast information delivery server SV3.

At step SP60, a user input a retrieval key in an input box disposed on the on-air-list-information-distribution page being displayed as images on the display section 25. The retrieval key is a character string which corresponds to on-air-list information the user wants to obtain, and is used for retrieving the on-air-list information. At this time, control commands corresponding to the character string are input from the input processing section 21. The control section 23 of the client terminal 2 generates an on-air-list information request signal based on the inputted control commands. The on-air-list information request signal requests the download of the on-air-list information which the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33 in order. The service session ID information was issued by the radio broadcast information delivery server SV3.

At step SP61, the control section 110 of the radio broadcast information delivery server SV3 receives the on-air-list information request signal, the service session ID information and the like transmitted from the client terminal 2 via the network interface 113 and the communication control section 112 in order, and supplies the service session ID information and the like to the authentication processing section 115.

The authentication processing section 115 under the control of the control section 110 performs user authentication processes. In the user authentication process, the authentication processing section 115 compares the service session ID information and the like received from the client terminal 2 with the ones temporarily stored in the authentication information storage section 120.

As a result, if the authentication processing section 115 authenticates that a user who requests on-air-list information using the client terminal 2 is legitimate, the control section 110 proceeds to step SP62.

At step SP62, the retrieval section 118 performs search processes based on a retrieval key in the on-air-list information request signal. In the search process, the retrieval section 118 searches the whole on-air-list information in the on-air-list information storage section 117 for a certain part of the on-air-list information which meets retrieval conditions shown by the retrieval key to obtain the desired on-air-list information.

When the retrieval section 118 has the on-air-list information found, the control section 110 extends the period of validity of the service session ID information and the like issued to the client terminal 2 using the authentication processing section 115. The control section 110 then proceeds to step SP63.

At step SP63, the control section 110 reads the on-air-list information found by the retrieval section 118 from the on-air-list information storage section 117. The control section 110 then transmits the on-air-list information, the service session ID information having its period of validity extended by the authentication processing section 115, and the like to the client terminal 2 via the communication control section 112 and the network interface 113 in order.

At step SP64, the control section 23 of the client terminal 2 receives the on-air-list information, the service session ID information having its period of validity extended, and the like transmitted from the radio broadcast information delivery server SV3 via the network interface 33 and the communication control section 32 in order, and supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like which have their period of validity extended were received from the radio broadcast information delivery server SV3. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the on-air-list information supplied from the control section 23. The page information generation section 36 then converts the video data to analog video signals using the display control section 24, and supplies the analog video signals to the display section 25. The display section 25 therefore displays images based on the analog video signals, i.e., it displays the on-air-list information.

As described above, the client terminal 2 allows a user to obtain the desired on-air-list information using the radio broadcast information distribution service provided by the radio broadcast information delivery server SV3.

(1-7-3-4) Now-On-Air Information Distribution Service Provision Process

Figure 13:
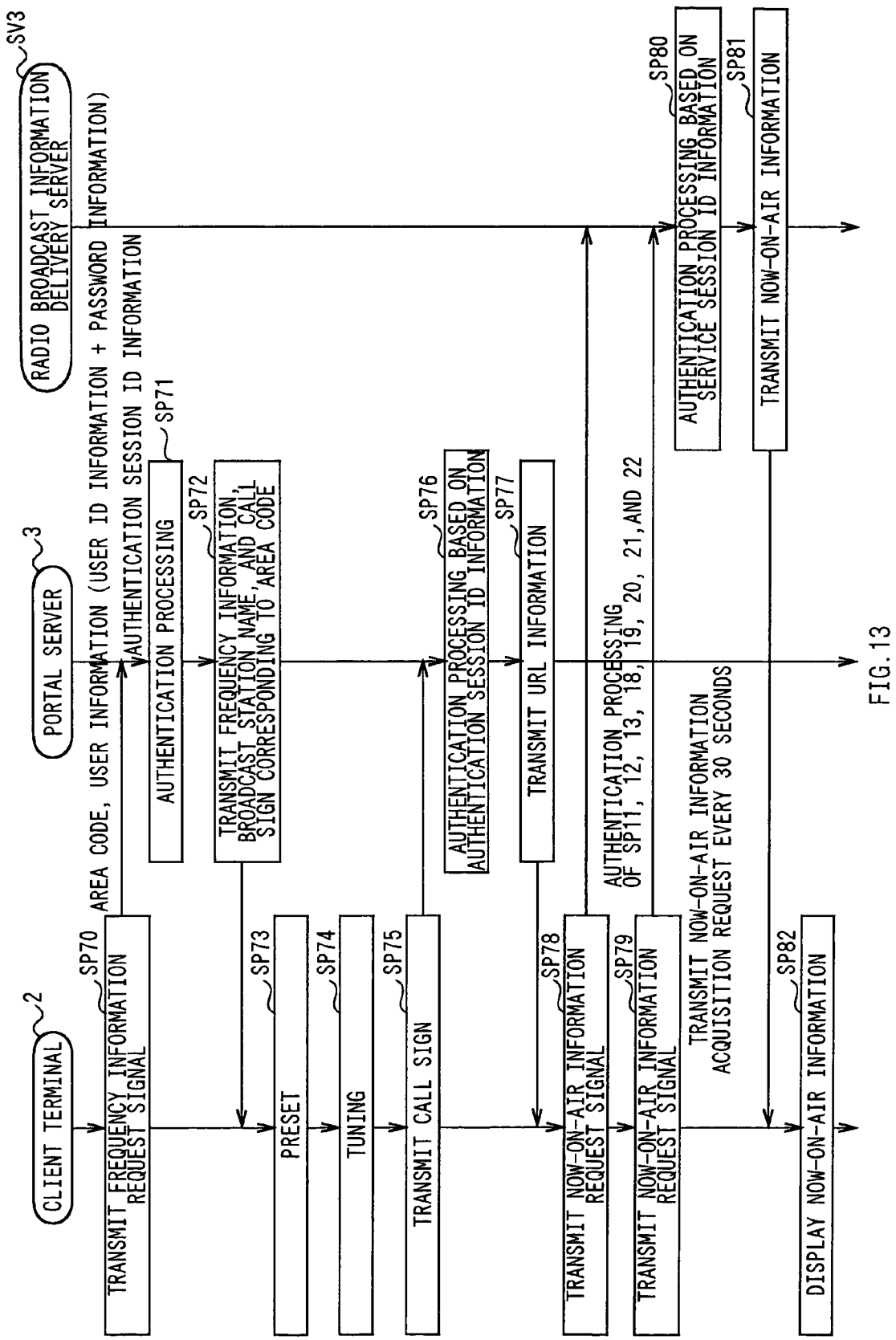
FIG. 13 is a sequence chart showing a radio broadcast information (now-on-air information) distribution service provision process.

With reference to FIG. 13, the radio broadcast information distribution service provision process will be described. In the radio broadcast information distribution service provision process, the client terminal 2 receives the radio broadcast information distribution service, especially the now-on-air information distribution service from the radio broadcast information delivery server SV3.

There is a plurality of radio broadcast information delivery servers SV3 providing now-on-air information, each of which corresponds to a different radio station (call sign).

At initial state, the client terminal 2 may not store URL information of these radio broadcast information delivery servers SV3 corresponding to each radio station.

With the radio broadcast information distribution service provision process described below, the situation in which the portal server 3 manages URL information of each radio broadcast information delivery server SV3 will be described. Specifically, in this case, the portal server 3 manages a plurality of pieces of URL information, each of which corresponds to a call sign of a radio station.

In addition, with the radio broadcast information distribution service provision process described below, the client terminal 2 does not have authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits user ID information, password information, and the like to the portal server 3.

At step SP70, if operation commands which request auto-preset of broadcast frequencies of radio stations are input from the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33 in order. The frequency information request signal requests frequency information about broadcast frequencies of radio stations from which the client terminal 2 can receive their broadcasts.

At step SP71, the control section 50 of the portal server 3 receives the frequency information request signal, the area code, the user ID information, the password information and the like transmitted from the client terminal 2 via the network interface 53 and the communication control section 52 in order, and supplies the user ID information and password information received from the client terminal 2 to the authentication processing section 56.

The authentication processing section 56 under the control of the control section 50 performs user authentication processes. In the user authentication process, the authentication processing section 56 compares the user ID information, password information and the like received from the client terminal 2 with the customer information registered with the customer database section 54.

As a result, if the authentication processing section 56 authenticates that a user of the client terminal 2 is legitimate, the authentication processing section 56 determines that the request for frequency information received from the client terminal 2 is legitimate. Therefore, the authentication processing section 56 under the control of the control section 50 issues authentication session ID information and the like. The authentication session ID information identifies the communication connection being currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates that the user is legitimate.

At step SP72, the control section 50 performs retrieving processes based on the area code received from the client terminal 2. In the retrieving process, the control section 50 retrieves a plurality of pieces of frequency information from the frequency information storage section 58. The control section 50 retrieves frequency information corresponding to the area code from lists including radio station names and call signs. The control section 50 also retrieves radio station names and call signs. The control section 50 then reads the retrieved information from the frequency information storage section 58 in list form.

The control section 50 subsequently transmits the listed frequency information, radio station names and call signs read from the frequency information storage section 58 with the authentication session ID information and the like to the client terminal 2 via the communication control section 52 and the network interface 53 in order. The authentication session ID information was issued to the client terminal 2 by the authentication processing section 56 at the above-noted step SP71.

At step SP73, the control section 23 of the client terminal 2 receives lists of the frequency information, radio station names and call signs transmitted from the portal server 3 via the network interface 33 and the communication control section 32 in order. The control section 23 of the client terminal 2 also receives the authentication session ID information and the like transmitted from the portal server 3 via the network interface 33 and the communication control section 32 in order. The control section 23 of the client terminal 2 then supplies the authentication session ID information and the like received from the portal server 3 to the authentication processing section 37. The control section 23 of the client terminal 2 also supplies the lists of the frequency information, radio station names and call signs to the display control section 24.

The authentication processing section 37 under the control of the control section 23 temporarily stores the authentication session ID information and the like received from the portal server 3 in the authentication information storage section 38.

The display control section 24 supplies the lists of the frequency information, radio station names and call signs to the display section 25. The display section 25 therefore displays the lists.

When selection commands are input from the input processing section 21, the control section 23 stores the selected frequency information, radio station names and call signs in the storage medium 29 (i.e. preset), and proceeds to step SP74.

At step SP74, when tuning control commands are input from the input processing section 21, the control section 23 controls the tuner section 31 based on the inputted tuning control commands such that the tuner section 31 extracts radio broadcast signals of a radio broadcast transmitted in a broadcast frequency corresponding to the tuning control commands from radio waves.

The tuner section 31 therefore extracts radio broadcast signals being transmitted in the broadcast frequency from radio waves received by the broadcast signal reception section 30. The tuner section 31 then performs prescribed reception processes such as decoding to generate audio data, and supplies the audio data to audio control section 26.

The audio control section 26 therefore converts the audio data supplied from the tuner section 31 to analog audio signals, and supplies the analog audio signals to the speaker 27. As a result, the speaker 27 outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control commands. The radio broadcasting display control section 39 then transmits the call sign, the authentication session ID information temporarily stored in the authentication information storage section 38, and the like to the portal server 3 via the communication control section 32 and the network interface 33 in order.

At step SP76, the control section 50 of the portal server 3 receives the call sign, the authentication session ID information and the like transmitted from the client terminal 2 via the network interface 53 and the communication control section 52 in order, and supplies the authentication session ID information and the like to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

As a result, if the authentication processing section 56 authenticates that a user who transmits the call sign using the client terminal 2 is legitimate, the control section 50 proceeds to step SP77. In this case, the authentication processing section 56 authenticates that the user is legitimate, since the authentication session ID information and the like received from the client terminal 2 have not expired yet.

At step SP77, the control section 50 performs retrieving processes based on the call sign received from the client terminal 2. In the retrieving process, the control section 50 retrieves a piece of URL information corresponding to the call sign from among a plurality of pieces of ULR information stored in the URL storage section 59.

The control section 50 also extends the period of validity of the authentication session ID information and the like issued to the client terminal 2 using the authentication processing section 56.

The control section 50 then reads the retrieved URL information from the URL storage section 59, and transmits the URL information, the authentication session ID information having its period of validity extended by the authentication processing section 56, and the like to the client terminal 2 via the communication processing section 52 and the network interface 53 in order.

At step SP78, the control section 23 of the client terminal 2 receives the URL information, the authentication session ID information having its period of validity extended, and the like transmitted from the portal server 3 via the network interface 33 and the communication control section 32 in order, and supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored are updated to the ones having their period of validity extended.

The radio broadcasting display control section 39 under the control of the control section 23 associates the URL information supplied from the control section 23 with the call sign stored in the storage medium 29, and temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33 in order. In this case, the radio broadcasting display control section 39 transmits the now-on-air information request signal using the URL information temporarily being stored in the storage medium 29 or the like. The service session ID information stored in the authentication information storage section 38 was received from the radio broadcast information delivery server SV3.

In the radio broadcast information distribution service provision process, the process of step SP78 corresponds to the process of step SP10 illustrated in FIG. 9. In the process of step SP78, now-on-air information request signals, service session ID information and the like are transmitted from the client terminal 2 to the radio broadcast information delivery server SV3.

Accordingly, in the radio broadcast information distribution service provision process, the client terminal 2, the radio broadcast information delivery server SV3 and the portal server 3 performs the same user authentication processes as those of step SP11 through SP13 and step SP18 through SP22 following the process of step SP78, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits a now-on-air information request signal, the service session ID information temporarily stored in the authentication information storage section 38, and the like to the radio broadcast information delivery server SV3 via the communication control section 32 and the network interface 33 in order. The radio broadcasting display control section 39 transmits the now-on-air information request signal using the URL information temporarily being stored in the storage medium 29 or the like. The service session ID information stored in the authentication information storage section 38 was received from the radio broadcast information delivery server SV3.

At step SP80, the control section 110 of the radio broadcast information delivery server SV3 receives the now-on-air information request signal, the service session ID information and the like transmitted from the client terminal 2 via the network interface 113 and the communication control section 112 in order, and supplies the received authentication session ID information and the like to the authentication processing section 115.

The authentication processing section 115 under the control of the control section 110 performs user authentication processes. In the user authentication process, the authentication processing section 115 compares the service session ID information and the like received from the client terminal 2 with the ones temporarily stored in the authentication information storage section 120.

As a result, if the authentication processing section 115 authenticates that a user of the client terminal 2 is legitimate, the authentication processing section 115 determines that the request for now-on-air information received from the client terminal 2 is legitimate.

After the authentication processing section 115 authenticates that a user of the client terminal 2 is legitimate, the control section 110 extends the period of validity of the service session ID information and the like issued to the client terminal 2 using the authentication processing section 115, and proceeds to step SP81.

At step SP81, the control section 110 reads now-on-air information from the now-on-air information storage section 119, and transmits the now-on-air information, the service session ID information having its period of validity extended by the authentication processing section 115, and the like to the client terminal 2 via the communication control section 112 and the network interface 113 in order.

At step SP82, the control section 23 of the client terminal 2 receives the now-on-air information, the service session ID information having its period of validity extended and the like transmitted from the radio broadcast information delivery server SV3 via the network interface 33 and the communication control section 32 in order, and supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like which have their period of validity extended were received from the radio broadcast information delivery server SV3. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The radio broadcasting display control section 39 supplies the now-on-air information supplied from the control section 23 to the display section 25 via the display control section 24. The display section 25 therefore displays the now-on-air information relating to radio programs currently being received.

After that, in the radio broadcast information distribution service provision process, the client terminal 2 repeats the request of now-on-air information (step SP79) at a certain interval of time. When receiving the request from the client terminal 2, the radio broadcast information delivery server SV3 sequentially performs the processes of step SP80 and SP81.

In this manner, the client terminal 2 can update now-on-air information being displayed on the display section 25 every second. The now-on-air information includes the following: a title of a radio program currently being received by the client terminal 2; a start time of the radio program; an end time of the radio program; an artist name and title of music currently being played in the radio program; and a start time of the broadcast of the music.

(1-8) Configuration of Hardware Circuit Blocks of Client Terminal 2

(1-8-1) Circuit Configuration

The configuration of hardware circuit block of the client terminal 2 will be described. According to the configuration of hardware circuit of the client terminal 2, a part of functions of the client terminal 2 is performed by software modules as further described below.

Figure 14:
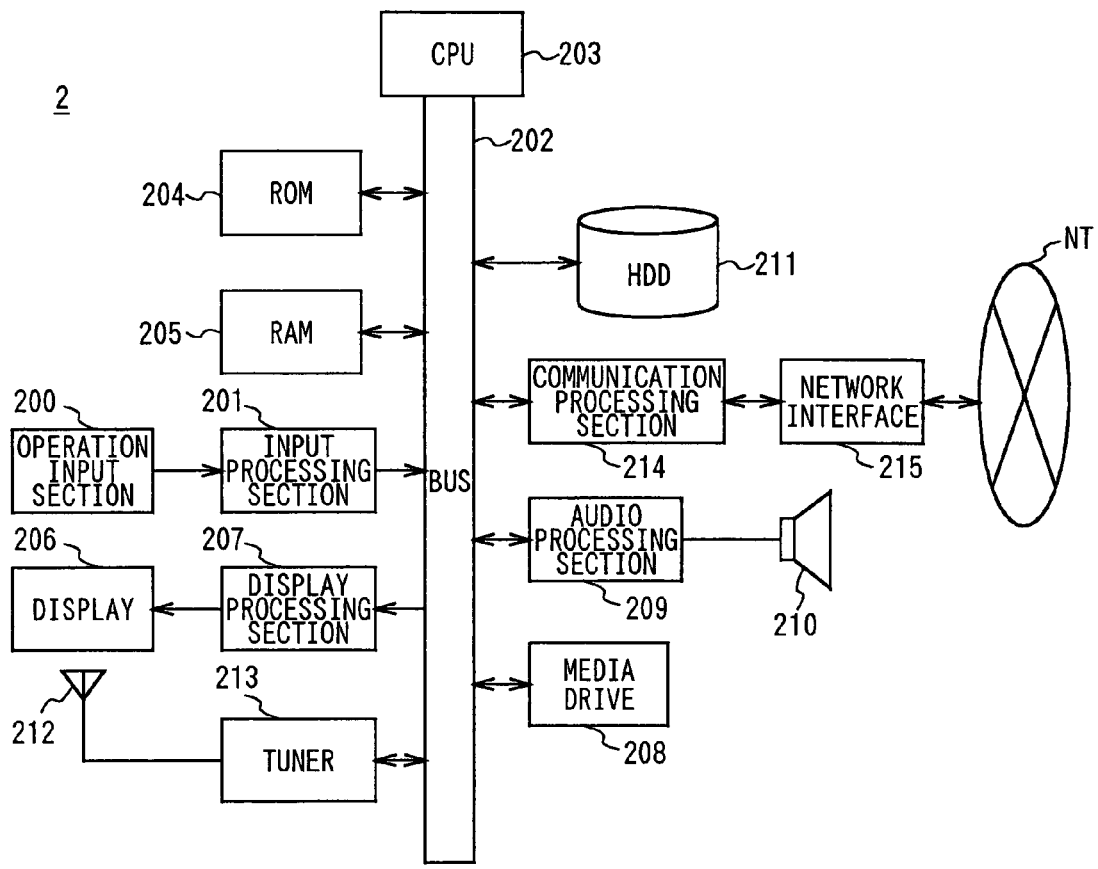
FIG. 14 is a block diagram showing the hardware configuration of a client terminal using the hardware circuit blocks.

Referring to FIG. 14, the client terminal 2 has an operation input section 200 on its body surface or a remote control (not shown). The operation input section 200 provides various operation buttons. When users operate the operation input section 200, the operation input section 200 detects the operation and supplies an operation input signal corresponding to the operation to an input processing section 201.

The input processing section 201 performs a prescribed process for the supplied operation input signal to convert the signal to an operation command. The input processing section 201 then supplies the command via a bus 202 to a Central Processing Unit (CPU) 203.

A Read Only Memory (ROM) 204 pre-stores various programs, such as basic programs and application programs. The CPU 203 reads these programs from the ROM 204 via the bus 202, and loads them into a Random Access Memory (RAM) 205. The CPU 203 takes overall control of the client terminal 2 based on the programs, and performs prescribed arithmetic processes and various processes corresponding to the operation commands supplied from the input processing section 201.

For example, a display 206 is a display device such as a liquid crystal display. The display 206 may be directly or externally disposed on the body surface.

Processing results generated by the CPU 203 and various video data are supplied to the display 206 via a display processing section 207 as analog video signals. The display 206 displays images based on the analog video signals.

For example, CDs and MEMORY STICK (Registered Trademark of Sony Corporation) store content data. The MEMORY STICK consists of flash memories covered with exterior cases. A media drive 208, for example, reads content data from the CDs and the MEMORY STICK, and then reproduces them. Alternatively, the media drive 208 records record-target content data on the CDs or the MEMORY STICK.

If the media drive 208 reads video data (content data) from CDs or MEMORY STICK, the media drive 208 then supplies the video data to the display processing section 207 via the bus 202.

If the media drive 208 reads audio data (content data) from CDs or MEMORY STICK, the media drive 208 then supplies the audio data to an audio processing section 209.

The display processing section 207 performs digital-to-analog conversion for the video data supplied via the bus 202 to generate analog video signals. The display processing section 207 then supplies the analog video signals to the display 206. The display 206 displays images based on the analog video signals.

The audio processing section 209 performs digital-to-analog conversion for the audio data supplied via the bus 202 to generate analog audio signals. The audio processing section 209 then supplies the analog audio signals to a 2-channel speaker 210. The speaker 210 outputs sound on stereo based on the analog audio signals.

In addition, the CPU 203 is able to supply content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files stored in the hard disk drive 211 from the hard disk drive 211 as content data.

If the CPU 203 reads video data (content data) from the hard disk drive 211, the CPU 203 then supplies the video data to the display processing section 207 via the bus 202.

If the CPU 203 reads audio data (content data) from the hard disk drive 211, the CPU 203 then supplies the audio data to the audio processing section 209.

An antenna 212 receives radio broadcast waves broadcast from each radio station. The antenna 212 then supplies the radio broadcast waves to a tuner 213 such as AM/FM tuner.

For example, a user selects a certain radio station using the operation input section 200. The tuner 213 under the control of the CPU 203 extracts radio broadcast signals of the broadcast frequency that corresponds to the selected radio station from the radio broadcast waves received by the antenna 212. The tuner 213 then performs prescribed reception processes for the radio broadcast signals to generate audio data, and supplies the audio data via the bus 202 to the audio processing section 209.

The audio processing section 209 converts the audio data supplied from the tuner 213 to analog audio signals, then supplies the analog audio signals to the speaker 210. The speaker 210 therefore outputs sound of a radio program broadcast from a radio station. This allows users to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215 in order. The CPU 203 therefore can accesses the portal server 3 and other servers SV1 through SV4 on the network NT, and interchanges various data with the portal server 3 and other servers SV1 through SV4.

(1-8-2) Configuration of Program Modules

Figure 15:
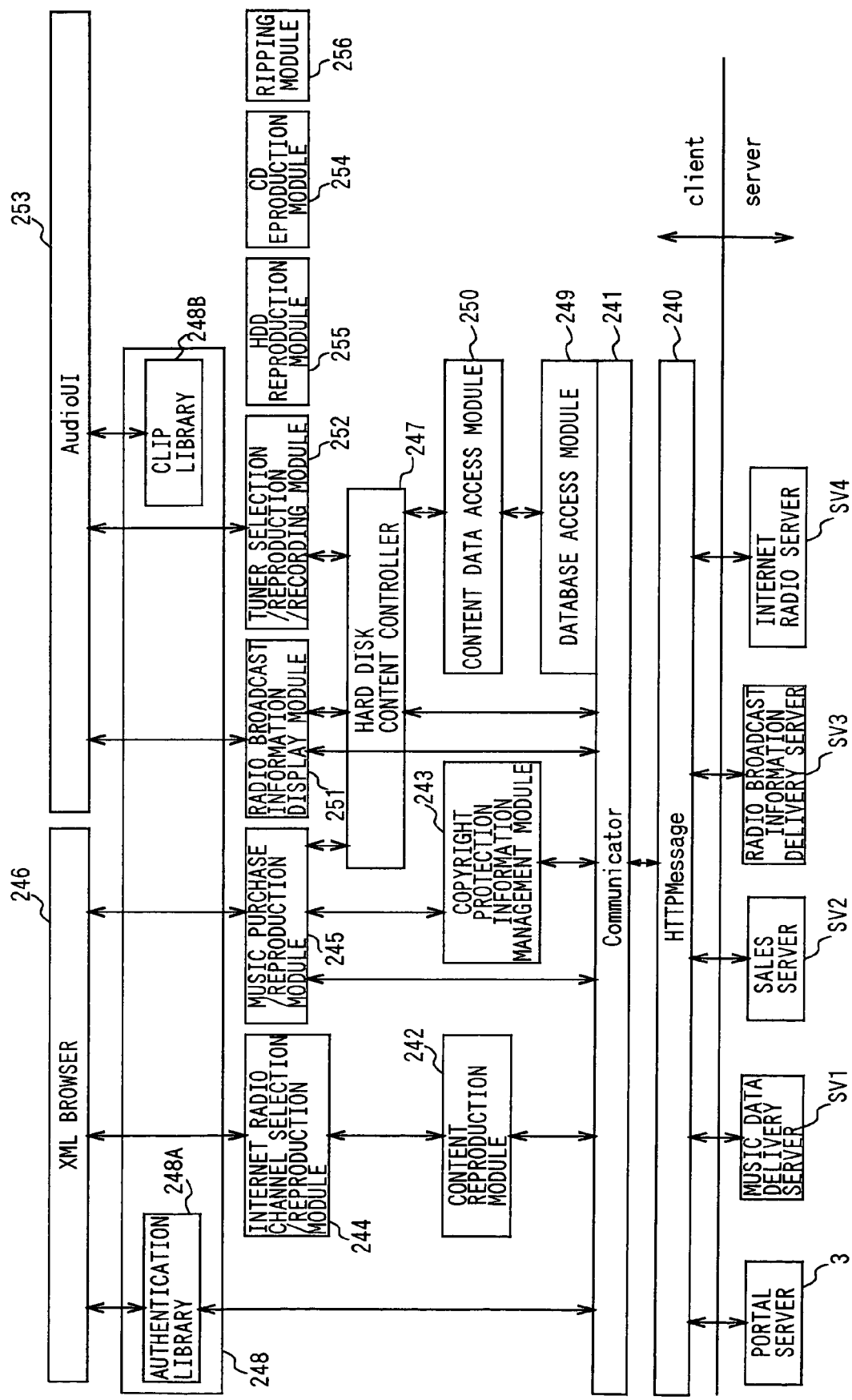
FIG. 15 is a schematic diagram showing program modules of the client terminal.

Program modules are applied to the client terminal 2 that has the hardware configuration described by the hardware circuit blocks shown in FIG. 14. As shown in FIG. 15, the program modules operate on OS, and interchanges with the portal server 3 and other servers SV1 through SV4.

A Hyper Text Transfer Protocol (HTTP) message program 240 interchanges with the portal server 3 and other servers SV1 through SV4 in HTTP communication. A communicator program 241 interchanges data with the HTTP message program 240.

A content reproduction module 242 and a copyright protection information management module 243 are disposed above the communicator program 241. The content reproduction module 242 interprets the codec of contents, and reproduces them. The copyright protection information management module 243 deals with information relating to copyright protection. An Internet radio channel selection/reproduction module 244 and a music purchase/reproduction module 245 are disposed on the content reproduction module 242 and the copyright protection information management module 243 respectively. The Internet radio channel selection/reproduction module 244 selects channels of Internet radio and plays the selected channels. The music purchase/reproduction module 245 controls the purchase of music and the reproduction of demo music.

The Internet radio channel selection/reproduction module 244 and the music purchase/reproduction module 245 perform reproduction process to generate audio data. The audio data is transferred to the audio processing section 209 to output audio from the speaker 210.

A XML browser 246 is disposed above the Internet radio channel selection/reproduction module 244 and the music purchase/reproduction module 245. The XML browser 246 interprets XML files received from various servers, and then displays images on the display 206.

For example, a user selects a piece of music using the XML browser 246. The music purchase/reproduction module 245 therefore performs purchasing processes for purchasing the piece of music. The purchased piece of music is supplied via a hard disk content controller 247 to the hard disk drive 211 to stores it on the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/reproduction/recording module 252 are disposed above the hard disk content controller 247. The radio broadcast information display module 251 performs processes for displaying a title and artist name of music broadcast from radio stations. The tuner selection/reproduction/recording module 252 selects radio stations. The tuner selection/reproduction/recording module 252 also records content data (music) received from a radio station on the hard disk drive 211.

For example, a user selects a radio station using an audio user interface 253 to receive music from the radio station. The received music is supplied via the content data access module 250 to the hard disk drive 211 to stores it in the hard disk drive 211.

The tuner selection/reproduction/recording module 252 performs reproduction processes to generate audio data (content data). The audio data is supplied to the audio processing section 209 to output audio from the speaker 210.

The radio broadcast information display module 251 uses the tuner selection/reproduction/recording module 252 to receive radio broadcast information from the radio broadcast information delivery server SV3 via the HTTP message program 240. For example, the received radio broadcast information is now-on-air information about a title and artist name of music being broadcast by a radio station. The radio broadcast information display module 251 then transmits the information via the audio user interface (UI) 253 to the display 206 which displays the information.

The radio broadcast information, transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD reproduction module 254 controls the media drive 208 to play back CDs.

Audio data played back from CDs by the CD reproduction module 254 are transferred to the audio processing section 209 to output audio from the speaker 210.

A HDD reproduction module 255 connects with the hard disk content controller 247 and the copyright protection information management module 243 (the connection is not shown here).

The HDD reproduction module 255 under the control of the hard disk content controller 247 reads audio data (content data) from the hard disk drive 211. The HDD reproduction module 255 then reproduces the audio data based on copyright management information supplied from the copyright protection information management module 243.

Audio data, reproduced by the HDD reproduction module 255 based on the copyright management information, is supplied to the audio processing section 209 to output audio from the speaker 210.

A ripping module 256 connects with the hard disk content controller 247 and the copyright protection information management module 243 (the connection is not shown here).

The ripping module 256 controls the CD reproduction module 254, the copyright protection information management module 243, and the hard disk content controller 247 to store (i.e., rip) audio data played back from CDs by the CD reproduction module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can perform the same function as the communication control section 32 of the client terminal 2 (FIG. 2) does.

The content reproduction module 242 can perform the same function as the encoder/decoder section 34 of the client terminal 2 (FIG. 2) does.

The copyright protection information management module 243 can perform the same function as the copyright management section 35 of the client terminal 2 (FIG. 2) does.

The Internet radio channel selection/reproduction module 244 can perform the same function as the control section 23 and audio control section 26 of the client terminal 2 (FIG. 2) do.

The music purchase/reproduction module 245 can perform the same function as the control section 23 and audio control section 26 of the client terminal 2 (FIG. 2) do.

The XML browser 246 can perform the same function as the input processing section 21 and page information generation section 36 of the client terminal 2 (FIG. 2) do.

The hard disk content controller 247, the database access module 249, and the content data access module 250 can perform the same function as the control section 23 of the client terminal 2 (FIG. 2) does.

The authentication library 248A of the library 248 can perform the same function as the authentication processing section 37 and the authentication information storage section 38 of the client terminal 2 (FIG. 2) do.

The clip library 248B of the library 248 can perform the same function as the control section 23 of the client terminal 2 (FIG. 2) does.

The radio broadcast information display module 251 can perform the same function as the radio broadcasting display control section 39 of the client terminal 2 (FIG. 2) does.

The tuner selection/reproduction/recording module 252 can perform the same function as the control section 23, audio control section 26 and tuner section 31 of the client terminal 2 (FIG. 2) do.

The audio user interface 253 can perform the same function as the input processing section 21, control section 23 and display control section 24 of the client terminal 2 (FIG. 2) do.

The CD reproduction module 254 can perform the same function as the audio control section 26 and external recording media recording and reproducing section 28 of the client terminal 2 (FIG. 2) do.

The HDD reproduction module 255 can perform the same function as the control section 23 and audio control section 26 of the client terminal 2 (FIG. 2) do.

The Ripping module 256 can perform the same function as the control section 23, external recording media recording and reproducing section 28 and encoder/decoder section 34 of the client terminal 2 (FIG. 2) do.

Accordingly, the client terminal 2 illustrated by FIG. 14 (which has the hardware configuration of hardware circuit blocks) can perform the same function as the client terminal 2 illustrated by FIG. 2 (which has the hardware configuration of functional circuit blocks) does, as the CPU 203 performs processes based on the above-noted program modules.

(1-9) Configuration of Portal Server

Figure 16:
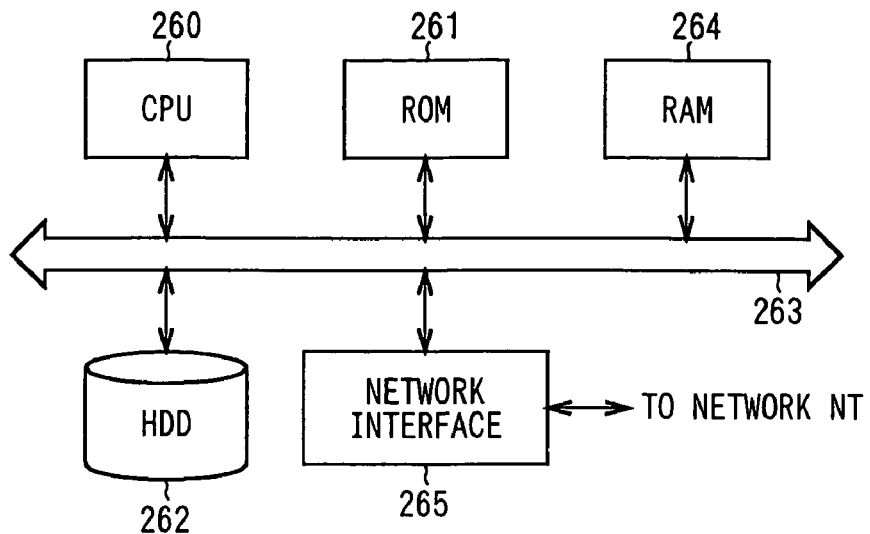
FIG. 16 is a block diagram showing the configuration of a portal server using hardware circuit blocks.

The portal server 3 shown in FIG. 16 has a CPU 260 to take overall control of the server 3. The CPU 260 reads basic programs and other programs from a ROM 261 or a hard disk drive 262, and loads them into a RAM 264 via a bus 263. The CPU 260 then executes these programs to perform various kinds of processes such as a user authentication process.

The CPU 260 of the portal server 3 for example receives user ID information, password information and the like from the client terminal 2 via the network NT and a network interface 265 in order. The CPU 260 then starts user authentication processes.

In a case in which the portal server 3 has that configuration of hardware circuit blocks, the CPU 260 can perform the same function as the control section 50, communication control section 52, and authentication processing section 56 of the portal server 3 (FIG. 4) do, if programs to be stored in the ROM 261 or the hard disk drive 262 are selected based on the functions that the portal server 3 (FIG. 4) provides. In addition, the hard disk drive 262 can be used as the customer database section 54, page information storage section 55, authentication information storage section 57, frequency information storage section 58 and URL storage section 59 of the portal sever 3 (FIG. 4). By the way, the portal server 3 illustrated by FIG. 4 has the configuration of functional circuit blocks.

(1-10) Configuration of Music Data Delivery Server

Figure 17:
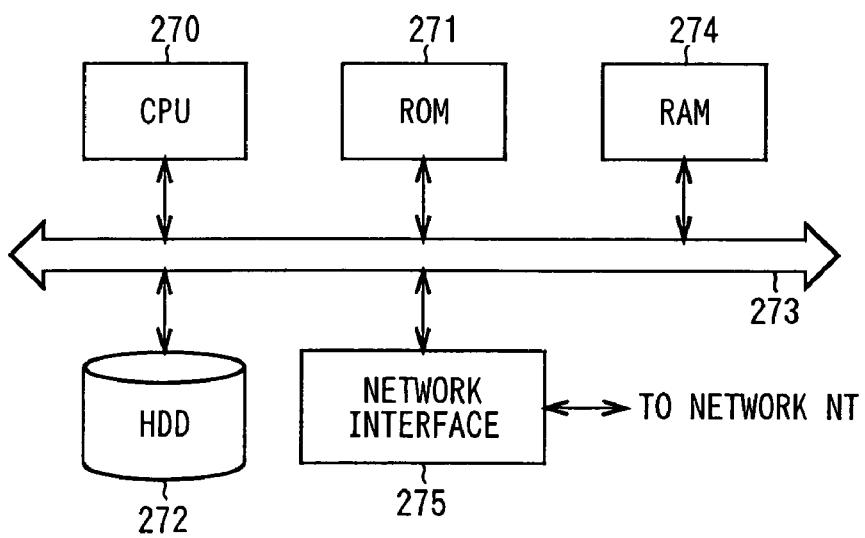
FIG. 17 is a block diagram showing the configuration of a music data delivery server using hardware circuit blocks.

The music data delivery server SV1 shown in FIG. 17 has a CPU 270 to take overall control of the server SV1. The CPU 270 reads basic programs and other programs from a ROM 271 or a hard disk drive 272, and loads them into a RAM 274 via a bus 273 to execute these programs. The CPU 270 therefore performs processes to distribute music data to the client terminal 2.

The CPU 270 of the music data delivery server SV1 for example receives a request requesting music data from the client terminal 2 via the network NT and a network interface 275 in order. The CPU 270 then reads the music data from the hard disk drive 272, and transmits it to the client terminal 2.

In a case in which the music data delivery server SV1 has that configuration of hardware circuit blocks, the CPU 270 can perform the same function as the control section 70, communication control section 72, authentication processing section 75 and retrieval section 79 of the music data delivery server SV1 (FIG. 5) do, if programs to be stored in the ROM 271 or the hard disk drive 272 are selected based on the functions that the music data delivery server SV1 (FIG. 5) provides. In addition, the hard disk drive 272 can be used as the customer database section 74, page information storage section 76, authentication information storage section 77, and music data storage section 78 of the music data delivery server SV1 (FIG. 5). By the way, the music data delivery server SV1 illustrated by FIG. 5 has the configuration of functional circuit blocks.

(1-11) Configuration of Sales server

Figure 18:
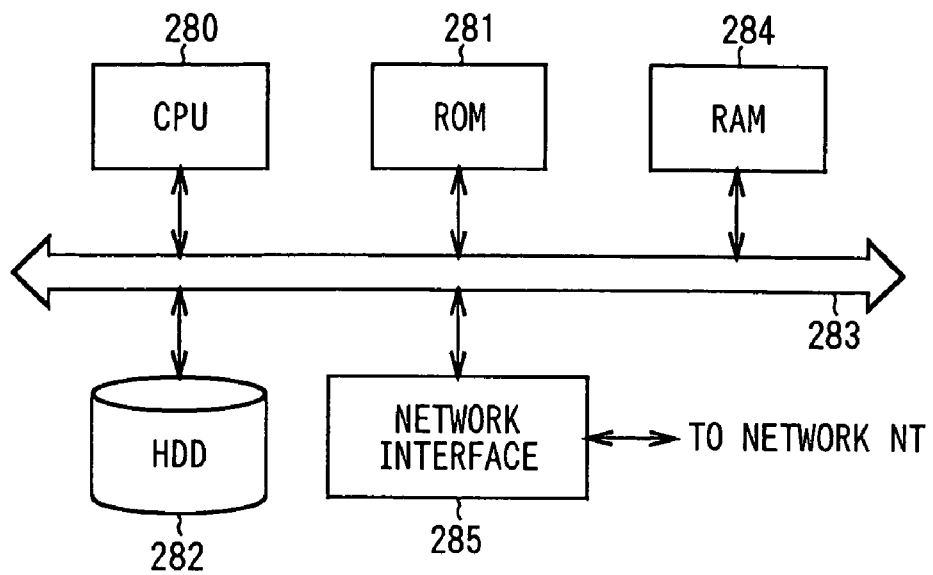
FIG. 18 is a block diagram showing the configuration of a sales server using hardware circuit blocks.

The sales server SV2 shown in FIG. 18 has a CPU 280 to take overall control of the server SV2. The CPU 280 reads basic programs and other programs from a ROM 281 or a hard disk drive 282, and loads them into a RAM 284 via a bus 283 to execute these programs. The CPU 280 therefore performs processes to provide sales services.

The CPU 280 of the sales server SV2 for example receives a request requesting the purchase of a music CD from the client terminal 2 via the network NT and a network interface 285 in order. The CPU 280 then performs processes to sell the music CD to a user of the client terminal 2.

In a case in which the sales server SV2 has that configuration of hardware circuit blocks, the CPU 280 can perform the same function as the control section 90, communication control section 92, authentication processing section 95 and retrieval section 99 of the sales server SV2 (FIG. 6) do, if programs to be stored in the ROM 281 or the hard disk drive 282 are selected based on the functions that the sales server SV2 (FIG. 6) provides. In addition, the hard disk drive 282 can be used as the customer database section 94, page information storage section 96, authentication information storage section 97, and package media information storage section 98 of the sales server SV2 (FIG. 6). By the way, the sales server SV2 illustrated by FIG. 6 has the configuration of functional circuit blocks.

(1-12) Configuration of Radio Broadcast Information Delivery Server

Figure 19:
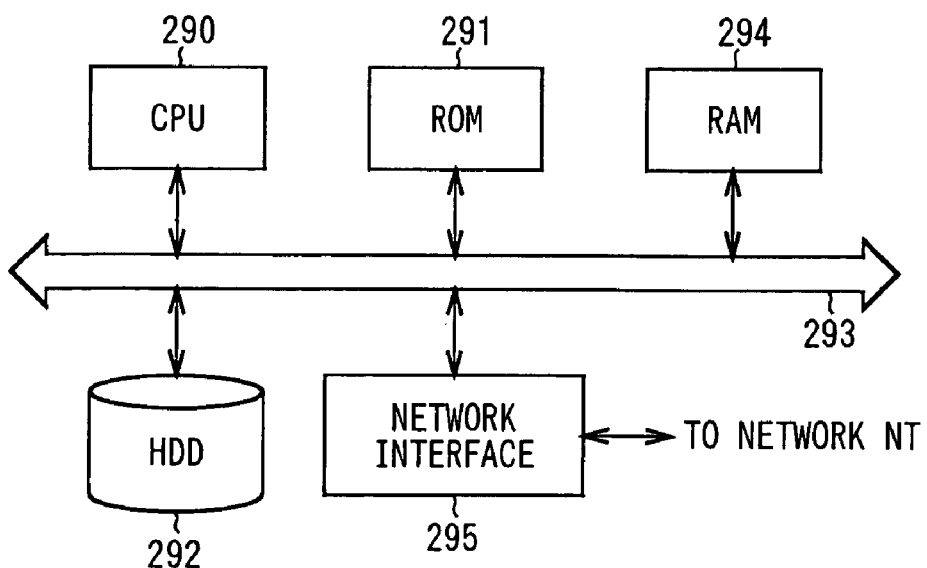
FIG. 19 is a block diagram showing the configuration of a radio broadcast information delivery server using hardware circuit blocks.

The radio broadcast information delivery server SV3 shown in FIG. 19 has a CPU 290 to take overall control of the server SV3. The CPU 290 reads basic programs and other programs from a ROM 291 or a hard disk drive 292, and loads them into a RAM 294 via a bus 293 to execute these programs. The CPU 290 therefore performs processes to provide radio broadcast information such as now-on-air information and on-air-list information.

The radio broadcast information delivery server SV3 has a radio broadcast information database in the hard disk drive 292. The radio broadcast information delivery server SV3 utilizes the radio broadcast information database to manage now-on-air information and on-air-list information. In this case, each radio station takes care of its own now-on-air information and on-air-list information which show information about radio programs broadcast from it.

FIG. 20 shows the configuration of the radio broadcast information database. The radio broadcast information database includes an on-air program table TB1, a broadcasted music table TB2, and a broadcasted program table TB3. The on-air program table TB1 manages now-on-air information. The broadcasted music table TB2 and the broadcasted program table TB3 manages on-air-list information.

The on-air program table TB1 stores now-on-air information. The now-on-air information includes the following: a station name of a radio station corresponding to the radio broadcast information delivery server SV3; a program title of a radio program currently being broadcast from the radio station; a name of presenter (DJ (Disk-Jockey)); a broadcast start time of music currently being played in the radio program (including its date); a music title; and an artist name and genre of the music.

In this manner, the on-air program table TB1 stores now-on-air information, which is to say it stores information about radio programs and music currently being broadcast.

The broadcasted music table TB2 stores on-air-list information. The on-air-list information stored in the broadcasted music table TB2 includes the following: a station name of a corresponding radio station; a broadcast time (date and start time) of music played in a radio program of the radio station; a music title; and an artist name and genre of the music.

That is to say, the broadcasted music table TB2 stores on-air-list information, such that it stores information about music already played in radio programs.

The broadcasted program table TB3 stores on-air-list information. The on-air-list information stored in the broadcasted program table TB3 includes the following; a station name of a corresponding radio station; a broadcast period (date, start time and end time) of a radio program broadcast from the radio station; a program title; and a name of presenter (DJ (Disk Jockey)).

That is to say, the broadcasted program table TB3 stores on-air-list information, such that it stores information about radio programs already broadcast.

Figure 21:
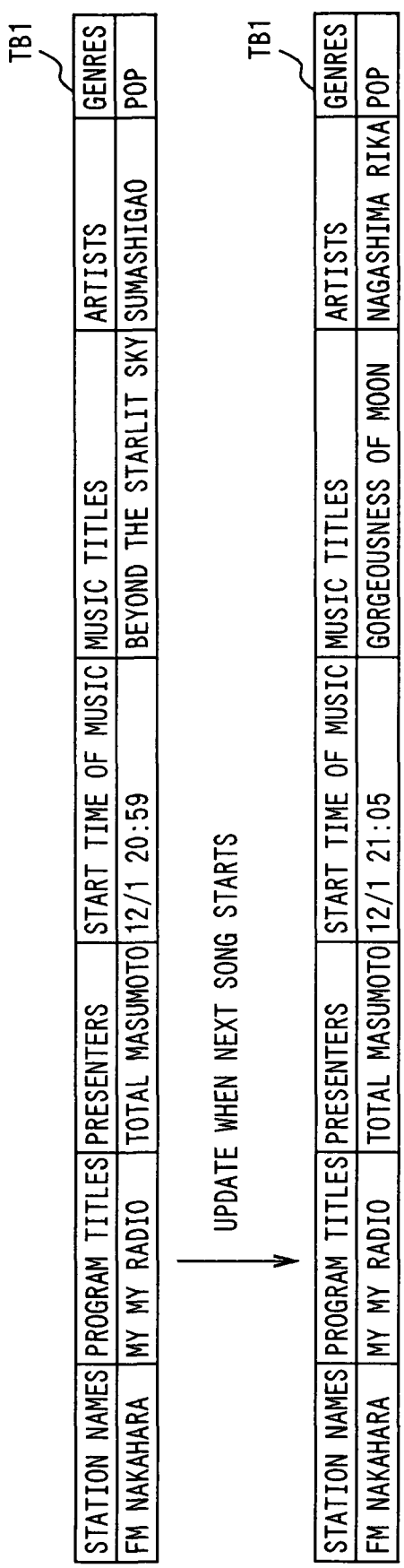
FIG. 21 is a schematic diagram illustrating update processes of now-on-air information on an on-air program table.

As a practical matter, when the CPU 290 (FIG. 19) of the radio broadcast information delivery server SV3 is notified of current broadcast situation (start or end of radio programs, start or end of a song played in radio programs, and the like) by a corresponding radio station, the CPU 290 updates the on-air program table TB1 based on the notified situation as shown in FIG. 21.

That is to say, the CPU 290 updates now-on-air information stored in the on-air program table TB1 at the time when one radio program ends and next radio program starts, or when-one piece of music ends and next piece of music starts in a radio program.

Therefore, now-on-air information stored in the on-air program table TB1 is updated almost in real time based on current broadcast situation. The on-air program table TB1 may store null data, for example, when music is not played in a radio program. In this case, the null data represents the fact that music is not currently being played. Alternatively, the on-air program table TB1 may keep storing previous now-on-air information (the information about music previously played) until next music starts.

When the CPU 290 receives an acquisition request for now-on-air information from the client terminal 2, the CPU 290 transmits now-on-air information stored in the on-air program table TB1 to the client terminal 2 via the network interface 295.

As shown in FIG. 22, the CPU 290 adds on-air-list information of a piece of music to the broadcasted music table TB2 a certain time (several minutes, for example) after the broadcast of the piece of music ends in a radio program.

As shown in FIG. 23, the CPU 290 adds on-air-list information of a radio program to the broadcasted program table TB3 a certain time (several minutes, for example) after the broadcast of the radio program ends.

The CPU 290 receives an acquisition request for on-air-list information from the client terminal 2, the acquisition request requesting a certain period of time (past one week, for example) of on-air-list information. The CPU 290 then associates the on-air-list information stored in the broadcasted music table TB2 with the one stored in the broadcasted program table TB3 by relating the broadcast times shown in the broadcasted music table TB2 with the broadcast periods shown in the broadcasted program table TB3 (FIG. 24), and extracts past one week of on-air-list information from them. The CPU 290 subsequently transmits the extracted information to the client terminal 2 via the network interface 295.

Accordingly, in this case, the on-air-list information transmitted to the client terminal 2 is a list of each piece of music played in each radio program in the past one week. The client terminal 2 displays the on-air-list information on the display 206 to let users know what music was played in radio programs broadcast in the past one week.

As described above, the radio broadcast information delivery server SV3 stores and manages now-on-air information and on-air list information relating to radio programs broadcast from the corresponding radio station, and delivers them in response to requests from the client terminal 2.

In a case in which the radio broadcast information delivery server SV3 has that configuration of hardware circuit blocks, the CPU 290 can perform the same function as the control section 110, communication control section 112, authentication processing section 115 and retrieval section 118 of the radio broadcast information delivery server SV3 (FIG. 7) do, if programs to be stored in the ROM 291 or the hard disk drive 292 are selected based on the functions that the radio broadcast information delivery server SV3 (FIG. 7) provides. In addition, the hard disk drive 292 can be used as the customer database section 114, page information storage section 116, on-air-list information storage section 117, now-on-air information storage section 119, and authentication information storage section 120 of the radio broadcast information delivery server SV3 (FIG. 7). By the way, the radio broadcast information delivery server SV3 illustrated by FIG. 7 has the configuration of functional circuit blocks.

(1-13) Keyword Recording Function

The client terminal 2 in accordance with the present embodiment has a keyword recording function to record music played in radio programs based on keyword input by a use. Keyword recording processes of the keyword recording function will be described.

Figure 25:
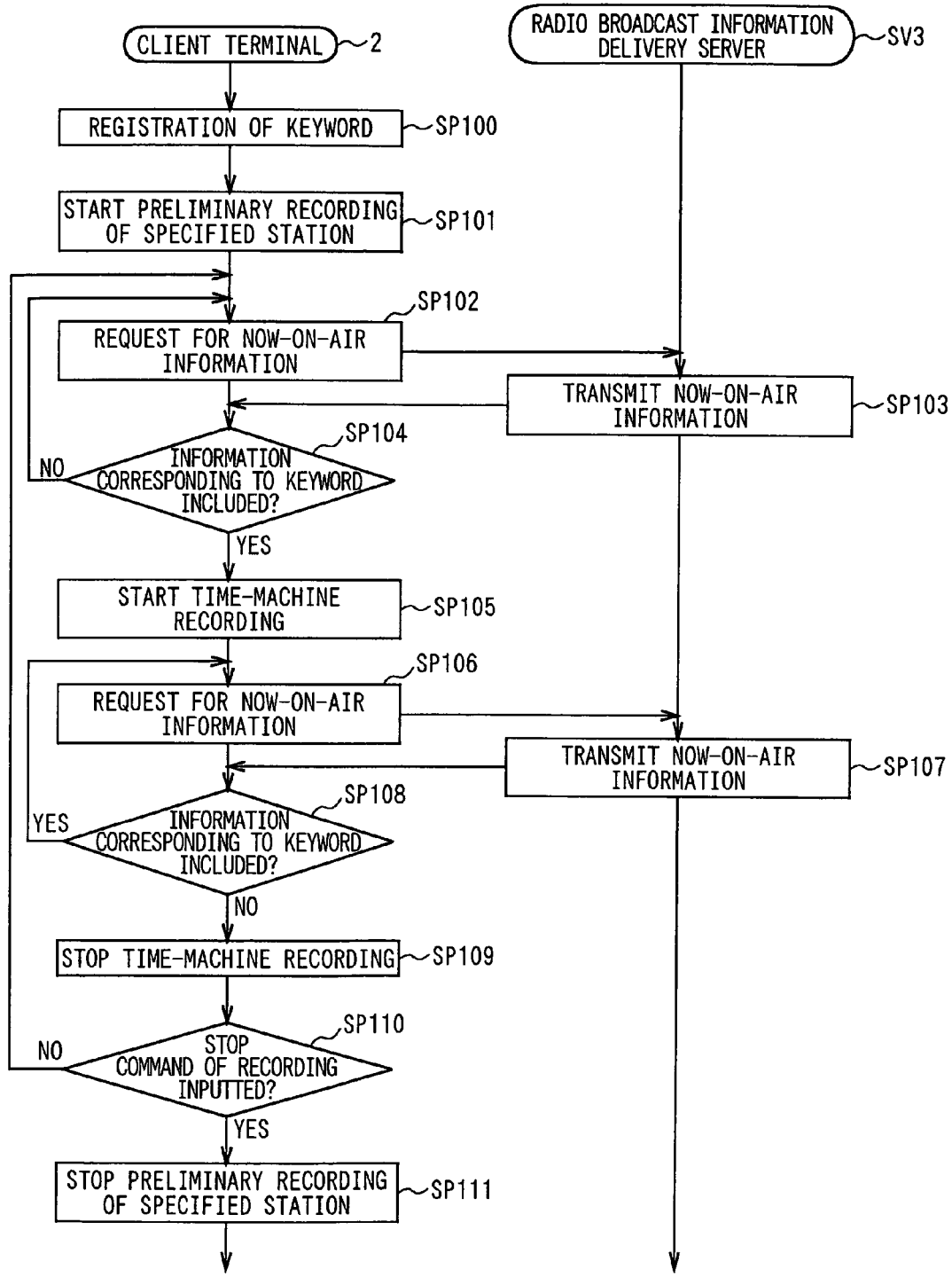
FIG. 25 is a sequence chart illustrating a key word recording process of a first embodiment.

The keyword recording process is a sequence process between the client terminal 2 and the radio broadcast information delivery server SV3 as show in FIG. 25. The CPU 203 of the client terminal 2 and the CPU 290 of the radio broadcast information delivery server SV3 performs the keyword recording process.

In the keyword recording process, the client terminal 2 obtains now-on-air information from the radio broadcast information delivery server SV3. The acquisition and authentication method of now-on-air information will not be described since they are fully described above.

When accepting a start command of keyword recording via the operation input section 200, the client terminal 2 at step 100 displays massages on the display 206 to instruct a user to input a keyword of the desired music. When a keyword (Music title; "Many flowers in the world", for example) is input, the client terminal 2 stores the keyword (Music title; "Many flowers in the world") in the hard disk drive 211, and generates a folder (a folder of "Many flowers in the world") corresponding to the keyword on the hard disk drive 211. Then the client terminal 2 proceeds to step SP101.

At step SP101, the client terminal 2 displays messages on the display 206 to instruct a user to specify his/her desired radio station. When a user specifies his/her desired radio station, the client terminal 2 tunes the tuner 213 in to the frequency of the specified radio station, and starts preliminary recording of a radio program's sound being broadcast from the radio station.

In this case, the idea of the preliminary recording is to temporarily record program's sound on the hard disk drive 211. In contrast to the preliminary recording, the idea of an actual recording (described below) is to record program's sound on the hard disk drive 211 and save it in the hard disk drive 211.

For the preliminary recording, the hard disk drive 211 has a buffer portion to store a certain period (three minutes, for example) of audio data-generated by the reception process of the tuner 213. The audio data is also referred to as "program's sound data". The record and delete processes on the buffer portion are repeated to save the most three minutes of program's sound data in the buffer portion any time.

When the client terminal 2 starts the preliminary recording, it proceeds to step SP102. At step SP102, the client terminal 2 transmits request information for requesting now-on-air information from the radio broadcast information delivery server SV3 corresponding to the specified radio station.

When the radio broadcast information delivery server SV3 receives the request information from the client terminal 2, it obtains now-on-air information from the on-air program table TB1 of the radio broadcast information database, and transmits the now-on-air information to the client terminal 2 at step SP103.

When receiving the now-on-air information from the radio broadcast information delivery server SV3, the client terminal 2 at step SP104 checks whether or not the received now-on-air information includes information corresponding to the keyword (Music title; "Many-flowers in the world").

Negative result at step SP104 means that the use's desired music is not playing in a radio program currently being received, since the received now-on-air information does not include information corresponding to the keyword (Music title; "Many flowers in the world"). In this case, the client terminal 2 returns to step SP102, and requests again now-on-air information from the radio broadcast information delivery server SV3 after a polling time (30 seconds, for example) has passed.

Positive result at step SP104 means that the desired music starts playing in a radio program currently being received, since the received now-on-air information includes information corresponding to the keyword (Music title; "Many flowers in the world"). In this case, the client terminal 2 proceeds to step SP105.

At step SP1O5, the client terminal 2 starts an actual recording of program's sound.

By the way, the client terminal 2 receives now-on-air information every 30 seconds (polling time). This causes a possible delay of maximum 30 seconds in receiving the now-on-air information informing the desired music starts to play, with respect to the time when the music actually starts to play.

Therefore, at the timing (present time, i.e.) when the client terminal 2 receives now-on-air information including the keyword, the client terminal 2 obtains the most recent 30 seconds of program's sound data from the buffer portion. The client terminal 2 then stores the obtained data as front data in the hard disk drive 211, and sequentially stores program's sound data received after the timing behind the front data.

In this manner, the client terminal 2 performs an actual recording using program's sound data stored in the buffer portion, as if it starts to record program's sound 30 seconds before receiving the now-on-air information. This method of actual recording is also referred to as "time-machine recording". This allows the client terminal 2 to record program's sound from the part where the music starts to play. Therefore, it is avoided that top of music data is not recorded.

After starting the time-machine recording, the client terminal 2 proceeds to step SP106. The client terminal 2 then requests again now-on-air information from the radio broadcast information delivery server SV3 after the polling time has passed.

When the radio broadcast information delivery server SV3 receives the request for now-on-air information from the client terminal 2, it obtains now-on-air information from the on-air program table TB1 of the radio broadcast information database, and transmits the now-on-air information to the client terminal 2 at step SP107.

When receiving the now-on-air information from the radio broadcast information delivery server SV3, the client terminal 2 at step SP108 checks whether or not the received now-on-air information includes information corresponding to the keyword (Music title; "Many flowers in the world").

Positive result at step SP108 means that the desired music is still playing in a radio program currently being received, since the received now-on-air information includes information corresponding to the keyword (Music title; "Many flowers in the world"). In this case, the client terminal 2 returns to step SP106, and requests again now-on-air-information from the radio broadcast information delivery server SV3 after the polling time has passed.

Negative result at step SP108 means that the use's desired music finished playing in a radio program currently being received, since the received now-on-air information does not include information corresponding to the keyword (Music title; "Many flowers in the world"). In this case, the client terminal 2 proceeds to step SP109.

At step SP109, the client terminal 2 stops the time-machine recording of program's sound. The client terminal 2 then registers the program's sound data obtained by the time-machine recording with the folder "Many flowers in the world" as the user's desired content data, and proceeds to step SP110.

As described above, the client terminal 2 stops time-machine recording, when the received now-on-air information does not include the keyword (Music title; "Many flowers in the world"). This allows the client terminal 2 to record program's sound to the part where the music ends. Therefore, it is avoided that the bottom of music data is not recorded.

At step SP110, the client terminal 2 checks whether or not a stop command of keyword recording is input via the operation input section 200. When the client terminal 2 obtains negative result at step SP110, it returns to step SP102 to continue the keyword recording process. When the client terminal 2 obtains positive result at step SP110, it proceeds to step SP111 to end the keyword recording process.

(1-14) Operation and Effect in First Embodiment

In the configuration described above, if a user specifies a radio station and a keyword representing his/her desired music, the client terminal 2 performs a preliminary recording of program's sound being broadcast from the specified radio station.

The client terminal 2 also receives now-on-air information from the radio broadcast information delivery server SV3 corresponding to the specified radio station, and checks whether or not the now-on-air information includes information corresponding to the keyword.

If the now-on-air information includes information corresponding to the keyword, the client terminal 2 determines that the desired music starts to play in a radio program being received. The client terminal 2 therefore starts time-machine recording to record program's sound from the part which the client terminal 2 received 30 seconds ago (i.e., 30 seconds before it receives the now-on-air information). At this time, the client terminal 2 utilizes program's sound preliminary recorded.

After that, the client terminal 2 keeps receiving now-on-air information each time when the polling time passes. If the client terminal 2 receives now-on-air information which does not include information corresponding to the keyword (i.e., at the time when the music finishes), it stops the time-machine recording.

Accordingly, the client terminal 2 can record the program's sound in which the user's desired music (corresponding to the keyword) is playing.

According to the configuration described above, the client terminal 2 receives now-on-air information at a certain interval of time. While detecting the keyword in the received now-on-air information, the client terminal 2 records received broadcast signals. This allows the client terminal 2 to record the program's sound in which user's desired music is playing. Therefore, the client terminal 2 can not only record program's sound in a program unit, but also easily record user's desired part of program's sound.

(2) Second Embodiment

The second embodiment's configuration of the system, client terminal and servers is the same as those of the first embodiment. Accordingly, descriptions about them will be omitted.

However, in the second embodiment, the radio broadcast information delivery server SV3 stores program guide data in the hard disk drive 292. The program guide data is equivalent to a program guide covering radio programs (the present time to a few weeks later) of the corresponding radio station. The radio broadcast information delivery server SV3 delivers the program guide data in response to requests from the client terminal 2.

The client terminal 2 receives the program guide data from the radio broadcast information delivery server SV3 at a certain interval of time, and stores the program guide data in the hard disk drive 211. In this case, the radio broadcast information delivery server SV3 corresponds to a radio station from which the client terminal 2 can receive its broadcast signals. By the way, the client terminal 2 has a keyword recording function which utilizes the program guide data. The keyword recording process of the keyword recording function will be described hereinafter.

Figure 26:
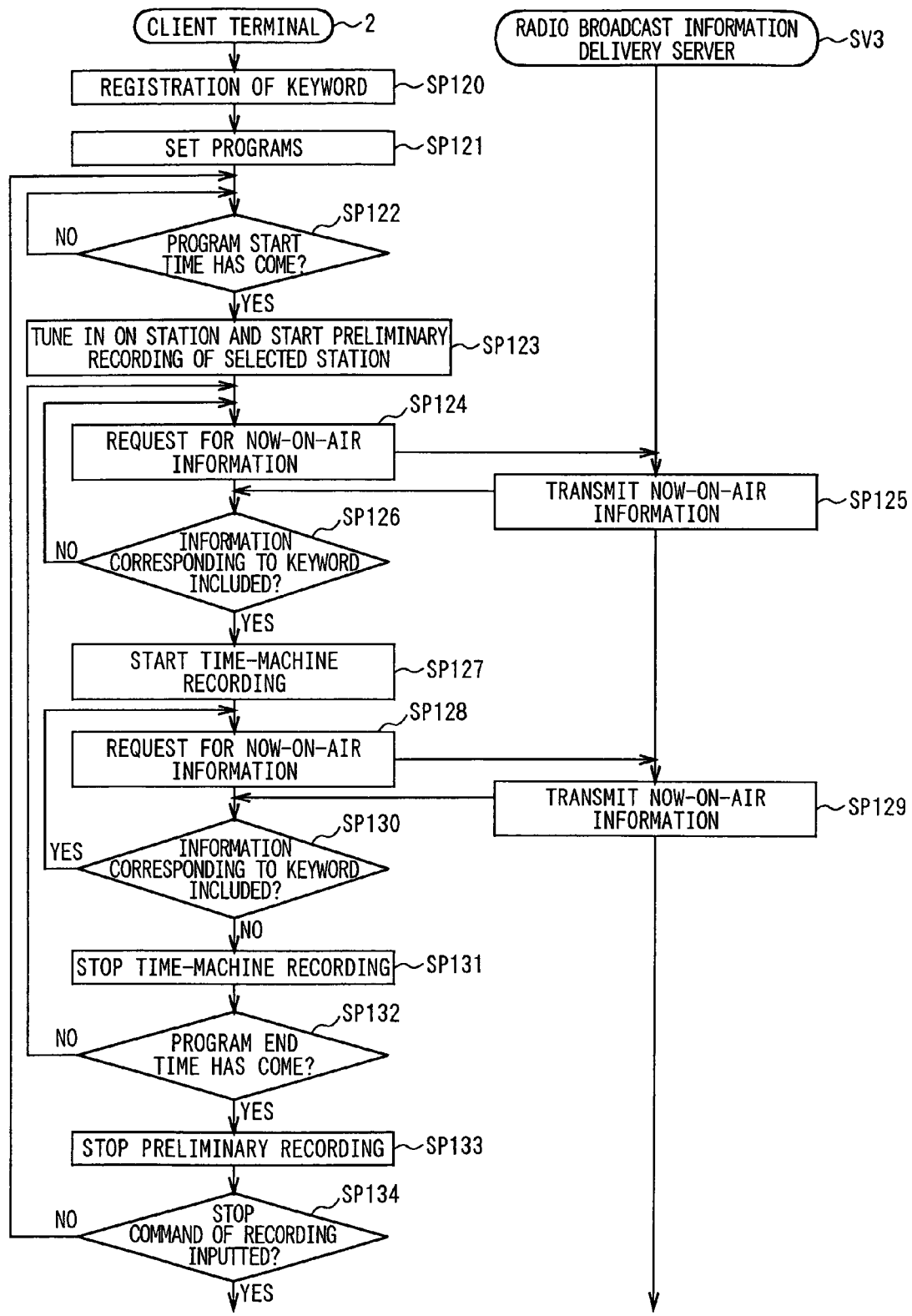
FIG. 26 is a sequence chart illustrating a key word recording process of a second embodiment.

The keyword recording process is a sequence process between the client terminal 2 and the radio broadcast information delivery server SV3 as show in FIG. 26. The CPU 203 of the client terminal 2 and the CPU 290 of the radio broadcast information delivery server SV3 performs the keyword recording process.

When accepting a start command of keyword recording via the operation input section 200, the client terminal 2 at step 120 displays massages on the display 206 to instruct a user to input a keyword of the desired music. When a keyword (Music title; "Many flowers in the world", for example) is input, the client terminal 2 stores the keyword (Music title; "Many flowers in the world") in the hard disk drive 211, and generates a folder (a folder of "Many flowers in the world") corresponding to the keyword on the hard disk drive 211. Then the client terminal 2 proceeds to step SP121.

At step SP121, the client terminal 2 generates a receivable radio stations, radio program guide based on the program data stored in the hard disk drive 211. For example, the receivable radio stations, radio program guide shows programs of the preset radio stations. The client terminal 2 then displays the receivable radio stations radio program guide on the display 206 as a program guide screen 300 as shown in FIG. 27.

The program guide screen 300 is utilized for specifying keyword-recording target radio programs. The program guide screen 300 shows titles of radio programs which are scheduled to broadcast within a few weeks of the present time from the receivable radio stations. Each radio program's title is associated with its broadcast date, broadcast start time and end time on the program guide screen 300.

The program guide screen 300 has checkboxes CB beside each place where a program title is displayed. Each checkbox CB is utilized for selecting a corresponding radio program.

Therefore, a user can specify a radio program as keyword-recording target. In this case, the user selects a checkbox CB corresponding to the desired program's title using a cursor (not shown). The user can operate the cursor using the operation input section 300.

As described above, the client terminal 2 allows a user to specify a keyword-recording target radio program on the program guide screen 300. Therefore, a user for example can leave out his/her least favorite programs from the keyword-recording targets.

When the client terminal 2 detects the push of a set button PB on the program guide screen 300 after the desired radio programs are specified, the client terminal 2 stores recording rule information in the hard disk drive 211. The recording rule information includes the specified program's title associated with the corresponding radio station name, broadcast start time and broadcast end time. The client terminal 2 then proceeds to step SP122.

At step SP122, the client terminal 2 waits until the broadcast start time of the specified radio program has come. In this case, the client terminal 2 has a built-in timer circuit (not shown). The client terminal 2 uses the timer circuit to determine whether or not the broadcast start time has come. The broadcast start time has been set as the recording rule information. When the broadcast start time has come, the client terminal 2 proceeds to step SP123.

At step SP123, the client terminal 2 tunes the tuner 213 into the frequency of the radio station broadcasting the specified radio program to start preliminary recording of the radio program, and proceeds to step SP124. By the way, the radio program was specified as recording rule information. The preliminary recording is performed in the same way as the above-noted first embodiment.

At step SP124, the client terminal 2 requests now-on-air information from the radio broadcast information delivery server SV3 corresponding to the selected radio station.

When receiving the request for now-on-air information from the client terminal 2, the radio broadcast information delivery server SV3 at step SP125 obtains now-on-air information from the on-air program table TB1 of the radio broadcast information data base, and transmits the now-on-air information to the client terminal 2.

When receiving the now-on-air information transmitted from the radio broadcast information delivery server SV3, the client terminal 2 at step SP126 checks whether or not the received now-on-air information includes information corresponding to the keyword (Music title; "Many flowers in the world").

Negative result at step SP126 means that the user's desired music is not playing in the radio program currently being received, since the received now-on-air information does not include information corresponding to the keyword (Music title; "Many flowers in the world"). Therefore, the client terminal 2 returns to step SP124, and requests again now-on-air-information from the radio broadcast information delivery server SV3 after the polling time has passed.

Positive result at step SP126 means that the user's desired music starts playing in the radio program currently being received, since the received now-on-air information includes information corresponding to the keyword (Music title; "Many flowers in the world"). Therefore, the client terminal 2 proceeds to step SP127.

At step SP127, the client terminal 2 starts the time-machine recording of the program's sound, and proceeds to step SP128. The time-machine recording is performed in the same way as the above-noted first embodiment.

At step SP128, the client terminal 2 requests again now-on-air information from the radio broadcast information delivery server SV3, after the polling time has passed.

When receiving the request for now-on-air information from the client terminal 2, the radio broadcast information delivery server SV3 at step SP129 obtains now-on-air information from the on-air program table TB1 of the radio broadcast information data base, and transmits the now-on-air information to the client terminal 2.

When receiving the now-on-air information transmitted from the radio broadcast information delivery server SV3, the client terminal 2 at step SP130 checks whether or not the received now-on-air information includes information corresponding to the keyword (Music title; "Many flowers in the world").

Positive result at step SP130 means that the user's desired music is still playing in the radio program currently being received, since the received now-on-air information includes information corresponding to the keyword (Music title; "Many flowers in the world"). Therefore, the client terminal 2 returns to step SP128, and requests again now-on-air-information from the radio broadcast information delivery server SV3 after the polling time has passed.

Negative result at step SP130 means that the user's desired music finished playing in the radio program currently being received, since the received now-on-air information does not include information corresponding to the keyword (Music title; "Many flowers in the world"). Therefore, the client terminal 2 proceeds to step SP131.

At step SP131, the client terminal 2 stops the time-machine recording of program's sound. The client terminal 2 then registers the program's sound data obtained by the time-machine recording with the folder "Many flowers in the world" as the user's desired content data, and proceeds to step SP132.

At step SP132, the client terminal 2 checks whether or not the broadcast end time of the radio program being preliminary recorded has come. When the client terminal 2 obtains negative result at step SP132, the client terminal 2 returns to step SP124, and repeat the processes of step SP124 through SP132 until the broadcast end time of the radio program has come. When the client terminal 2 obtains positive result, the client terminal 2 proceeds to step SP133 to stop the preliminary recording. The client terminal 2 then proceeds to step SP134.

At step SP134, the client terminal 2 checks whether or not a stop command of keyword recording is input via the operation input section 200. When the client terminal 2 obtains negative result at step SP134, it returns to step SP122 to continue the keyword recording process. When the client terminal 2 obtains positive result at step SP134, it ends the keyword recording process.

In the configuration described above, if a user specifies a radio program and a keyword representing his/her desired music, the client terminal 2 of the second embodiment performs a preliminary recording of the specified program's sound.

The client terminal 2 also receives now-on-air information from the radio broadcast information delivery server SV3 corresponding to a radio station broadcasting the specified program, and checks whether or not the now-on-air information includes information corresponding to the keyword.

If the now-on-air information includes information corresponding to the keyword, the client terminal 2 determines that the desired music starts to play in a radio program being received. The client terminal 2 therefore starts time-machine recording to record program's sound from the part which the client terminal 2 received 30 seconds ago (i.e., 30 seconds before it receives the now-on-air information). At this time, the client terminal 2 utilizes program's sound preliminary recorded.

After that, the client terminal 2 receives now-on-air information each time when the polling time passes. If the client terminal 2 receives now-on-air information which does not include information corresponding to the keyword (i.e., at the time when the music finishes), it stops the time-machine recording.

Accordingly, the client terminal 2 can record the specified program's sound only when the music corresponding to the user's desired keyword is playing in the program.

According to the configuration described above, the client terminal 2 receives now-on-air information at a certain interval of time. While detecting the keyword in the received now-on-air information, the client terminal 2 records received broadcast signals. This allows the client terminal 2 to record the program's sound only when the user's desired music is playing in the program. Therefore, the client terminal 2 can not only record program's sound in a program unit, but also easily record user's desired part of program's sound.

In addition, according to the client terminal 2 of the second embodiment, a user can previously specify his/her desired radio programs. This prevents the client terminal 2 from recording the user's least favorite radio program, for example. Therefore, the client terminal 2 can omit the keyword recording process of the user's least favorite radio program to reduce the processing load.

(3) Third Embodiment

The third embodiment's configuration of the system, client terminal and servers is the same as those of the first embodiment and second embodiment. Accordingly, descriptions about them will be omitted.

In the third embodiment, now-on-air information includes a music start time. The client terminal 2 of the third embodiment has a keyword recording function. In the keyword recording function, the client terminal 2 sets a start time of the time-machine recording based on the music start time included in the now-on-air information. The keyword recording process of the keyword recording function will be described hereinafter.

Figure 28:
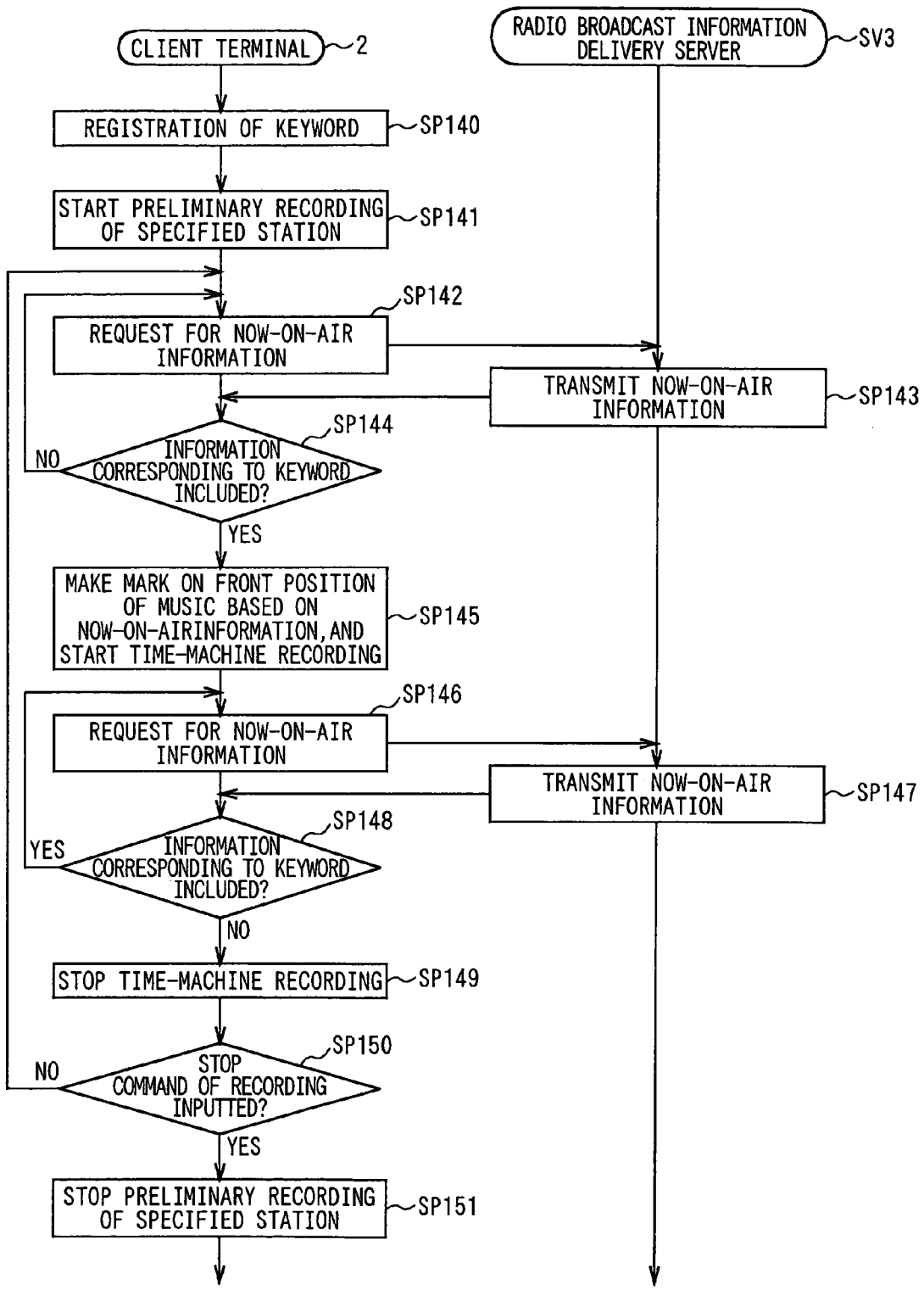
FIG. 28 is a sequence chart illustrating a key word recording process of a third embodiment.

The keyword recording process is a sequence process between the client terminal 2 and the radio broadcast information delivery server SV3 as show in FIG. 28. The CPU 203 of the client terminal 2 and the CPU 290 of the radio broadcast information delivery server SV3 performs the keyword recording process.

When accepting a start command of keyword recording via the operation input section 200, the client terminal 2 at step 140 displays massages on the display 206 to instruct a user to input a keyword of the desired music. When a keyword (Music title; "Many flowers in the world", for example) is input, the client terminal 2 stores the keyword (Music title; "Many flowers in the world") in the hard disk drive 211, and generates a folder (a folder of "Many flowers in the world") corresponding to the keyword on the hard disk drive 211. Then the client terminal 2 proceeds to step SP141.

At step SP141, the client terminal 2 displays messages on the display 206 to instruct a user to specify his/her desired radio station. When a user specifies his/her desired radio station, the client terminal 2 tunes the tuner 213 in to the frequency of the specified radio station, and starts preliminary recording of radio program's sound being broadcast from the radio station. This preliminary recording is performed in the same way as the above-noted first and second embodiment. The client terminal 2 then proceeds to step SP142.

At step SP142, the client terminal 2 requests now-on-air information from the radio broadcast information delivery server SV3 corresponding to the specified radio station.

When receiving the request for now-on-air information from the client terminal 2, the radio broadcast information delivery server SV3 at step SP143 obtains now-on-air information from the on-air program table TB1 of the radio broadcast information database, and transmits the now-on-air information to the client terminal 2.

When receiving the now-on-air information from the radio broadcast information delivery server SV3, the client terminal 2 at step SP144 checks whether or not the received now-on-air information includes information corresponding to the keyword (Music title; "Many flowers in the world").

Negative result at step SP144 means that the use's desired music is not playing in a radio program currently being received, since the received now-on-air information does not include information corresponding to the keyword (Music title; "Many flowers in the world"). In this case, the client terminal 2 returns to step SP142, and requests again now-on-air information from the radio broadcast information delivery server SV3 after the polling time has passed.

Positive result at step SP144 means that the desired music starts playing in a radio program currently being received, since the received now-on-air information includes information corresponding to the keyword (Music title; "Many flowers in the world"). In this case, the client terminal 2 proceeds to step SP145.

At step SP145, the client terminal 2 starts time-machine recording of program's sound.

Specifically, when starting the time-machine recording, the client terminal 2 calculates the time difference between the music start time shown in the now-on-air information and the time (i.e., the present time) when it received the now-on-air information. In this case, the now-on-air information is the one including the keyword. For example, the time difference is 5 seconds, which means that the music started to play 5 seconds ago (with respect to the present time).

The client terminal 2 obtains the most recent 30 seconds of the program's sound data from the buffer portion. The client terminal 2 then makes a mark on a certain part of the program's sound data as a music start position based on the calculated time difference, and records the program's sound data as front data on the hard disk drive 211. The client terminal 2 then records program's sound data received from now on behind the front data.

That is to say, the client terminal 2 calculates time difference between the music start time shown in the now-on-air information and the present time, makes the mark of music start position on the part of program's sound data which was broadcast just the time difference period ago (with respect to the present time), and performs the time-machine recording of program's sound. In this manner, when recording the program's sound, the client terminal 2 can determine the exact time when the music started to play.

After starting the time-machine recording, the client terminal 2 proceeds to step SP146. The client terminal 2 then requests again now-on-air information from the radio broadcast information delivery server SV3 after the polling time has passed.

When the radio broadcast information delivery server SV3 receives the request for now-on-air information from the client terminal 2, it obtains now-on-air information from the on-air program table TB1 of the radio broadcast information database, and transmits the now-on-air information to the client terminal 2 at step SP147.

When receiving the now-on-air information from the radio broadcast information delivery server SV3, the client terminal 2 at step SP148 checks whether or not the received now-on-air information includes information corresponding to the keyword (Music title; "Many flowers in the world").

Positive result at step SP148 means that the desired music is still playing in a radio program currently being received, since the received now-on-air information includes information corresponding to the keyword (Music title; "Many flowers in the world"). In this case, the client terminal 2 returns to step SP146, and requests again now-on-air-information from the radio broadcast information delivery server SV3 after the polling time has passed.

Negative result at step SP148 means that the use's desired music finished playing in a radio program currently being received, since the received now-on-air information does not include information corresponding to the keyword (Music title; "Many flowers in the world"). In this case, the client terminal 2 proceeds to step SP149.

At step SP149, the client terminal 2 stops the time-machine recording of program's sound. The client terminal 2 then registers the program's sound data obtained by the time-machine recording with the folder "Many flowers in the world" as the user's desired content data, and proceeds to step SP150.

At step SP150, the client terminal 2 checks whether or not a stop command of keyword recording is input via the operation input section 200. When the client terminal 2 obtains negative result at step SP150, it returns to step SP142 to continue the keyword recording process. When the client terminal 2 obtains positive result at step SP150, it proceeds to step SP151 to end the keyword recording process.

In the configuration described above, if a user specifies a radio station and a keyword representing his/her desired music, the client terminal 2 of the third embodiment performs a preliminary recording of program's sound being broadcast from the specified radio station.

The client terminal 2 also receives now-on-air information from the radio broadcast information delivery server SV3 corresponding to the specified radio station, and checks whether or not the now-on-air information includes information corresponding to the keyword.

If the now-on-air information includes information corresponding to the keyword, the client terminal 2 determines that the desired music starts to play in a radio program being received. The client terminal 2 then pinpoints where the music starts to play in the preliminarily recorded program's sound data based on the music start time shown in the now-on-air information. The client terminal 2 subsequently starts time-machine recording.

After that, the client terminal 2 keeps receiving now-on-air information each time when the polling time passes. If the client terminal 2 receives now-on-air information which does not include information corresponding to the keyword (i.e., at the time when the music finishes), it stops the time-machine recording.

Accordingly, the client terminal 2 can record the program's sound in which the user's desired music (corresponding to the keyword) is playing.

According to the configuration described above, the client terminal 2 receives now-on-air information at a certain interval of time. While detecting the keyword in the received now-on-air information, the client terminal 2 records received broadcast signals. This allows the client terminal 2 to record the program's sound in which user's desired music is playing. Therefore, the client terminal 2 can not only record program's sound in a program unit, but also easily record user's desired part of program's sound.

In addition, the client terminal 2 according to the third embodiment pinpoints the music start position in the program's sound data based on the music start time shown in the now-on-air information, and makes a mark on the position. In this manner, the client terminal 2 determines the exact time when the music starts to play, and records program's sound when the music is playing. In this case, the client terminal 2 just makes the mark on the start position. Therefore the client terminal 2 can adjust the position in the future.

(4) Fourth Embodiment

The fourth embodiment's configuration of the system, client terminal and servers is the same as those of the first, second, and third embodiment. Accordingly, descriptions about them will be omitted.

However, in the fourth embodiment, the column "end time of music" is added to the on-air program table TB1 of the radio broadcast information delivery server SV3 as shown in FIG. 29. The radio broadcast information delivery server SV3 supplies now-on-air information including a music end time to the client terminal 2.

The client terminal 2 has a keyword recording function. In the keyword recording function, the client terminal 2 sets a start time and end time of time-machine recording based on a music start time and music end time shown in now-on-air information. The keyword recording process of the keyword recording function will be described hereinafter.

Figure 30:
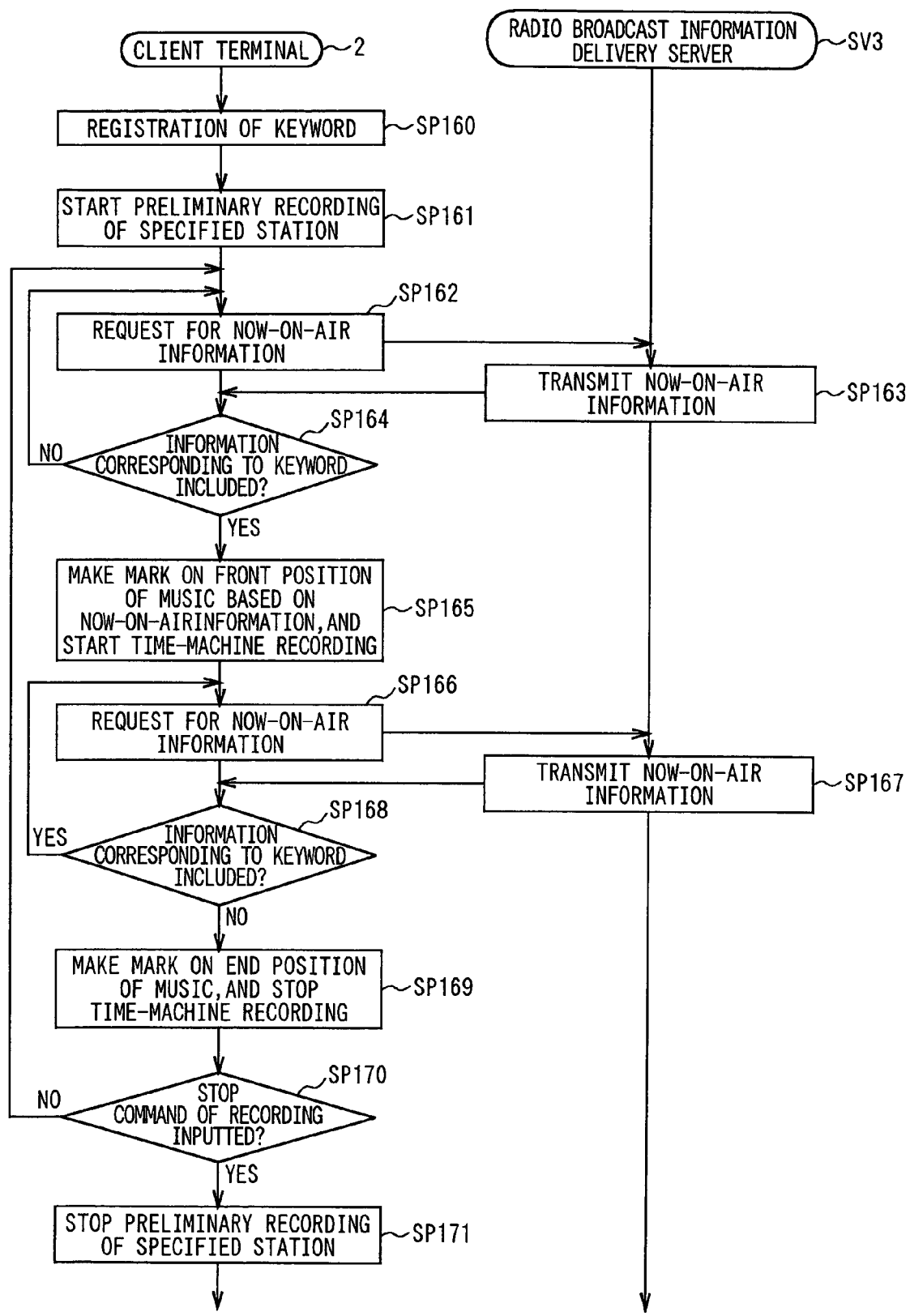
FIG. 30 is a sequence chart illustrating a key word recording process of the fourth embodiment.

The keyword recording process is a sequence process between the client terminal 2 and the radio broadcast information delivery server SV3 as show in FIG. 30. The CPU 203 of the client terminal 2 and the CPU 290 of the radio broadcast information delivery server SV3 performs the keyword recording process.

When accepting a start command of keyword recording via the operation input section 200, the client terminal 2 at step 160 displays massages on the display 206 to instruct a user to input a keyword of the desired music. When a keyword (Music title; "Many flowers in the world", for example) is input, the client terminal 2 stores the keyword (Music title; "Many flowers in the world") in the hard disk drive 211, and generates a folder (a folder of "Many flowers in the world") corresponding to the keyword on the hard disk drive 211. Then the client terminal 2 proceeds to step SP161.

At step SP161, the client terminal 2 displays messages on the display 206 to instruct a user to specify his/her desired radio station. When a user specifies his/her desired radio station, the client terminal 2 tunes the tuner 213 in to the frequency of the specified radio station, and starts preliminary recording of a radio program's sound being broadcast from the radio station. This preliminary recording is performed in the same way as the above-noted first, second and third embodiment. The client terminal 2 then proceeds to step SP162.

At step SP162, the client terminal 2 requests now-on-air information from the radio broadcast information delivery server SV3 corresponding to the specified radio station.

When receiving the request for now-on-air information from the client terminal 2, the radio broadcast information delivery server SV3 at step SP163 obtains now-on-air information from the on-air program table TB1 of the radio broadcast information database, and transmits the now-on-air information to the client terminal 2.

When receiving the now-on-air information from the radio broadcast information delivery server SV3, the client terminal 2 at step SP164 checks whether or not the received now-on-air information includes information corresponding to the keyword (Music title; "Many flowers in the world").

Negative result at step SP164 means that the use's desired music is not playing in a radio program currently being received, since the received now-on-air-information does not include information corresponding to the keyword (Music title; "Many flowers in the world"). In this case, the client terminal 2 returns to step SP162, and requests again now-on-air information from the radio broadcast information delivery server SV3 after the polling time has passed.

Positive result at step SP164 means that the desired music starts playing in a radio program currently being received, since the received now-on-air information includes information corresponding to the keyword (Music title; "Many flowers in the world"). In this case, the client terminal 2 proceeds to step SP165.

At step SP165, the client terminal 2 starts time-machine recording of program's sound, and proceeds to step SP166. In this case, the way to start the time-machine recording is the same as the one of the above-noted third embodiment.

At step SP166, the client terminal 2 requests again now-on-air information from the radio broadcast information delivery server SV3 after the polling time has passed.

When the radio broadcast information delivery server SV3 receives the request for now-on-air information from the client terminal 2, it obtains now-on-air information from the on-air program table TB1 of the radio broadcast information database, and transmits the now-on-air information to the client terminal 2 at step SP167.

When receiving the now-on-air information from the radio broadcast information delivery server SV3, the client terminal 2 at step SP168 checks whether or not the received now-on-air information includes information corresponding to the keyword (Music title; "Many flowers in the world").

Positive result at step SP168 means that the desired music is still playing in a radio program currently being received, since the received now-on-air information includes information corresponding to the keyword (Music title; "Many flowers in the world"). In this case, the client terminal 2 returns to step SP166, and requests again now-on-air-information from the radio broadcast information delivery server SV3 after the polling time has passed.

Negative result at step SP168 means that the use's desired music finished playing in a radio program currently being received, since the received now-on-air information does not include information corresponding to the keyword (Music title; "Many flowers in the world"). In this case, the client terminal 2 proceeds to step SP169.

At step SP169, the client terminal 2 stops the time-machine recording of program's sound.

Specifically, when stopping the time-machine recording, the client terminal 2 calculates the time difference between the music end time shown in the now-on-air information including the keyword and the time (i.e., the present time) when it receives the now-on-air information not including the keyword. For example, the time difference is 5 seconds, which means that the music played in the radio program finished playing 5 seconds ago (with respect to the present time).

The client terminal 2 then makes a mark on a certain part of the program's sound data obtained by the time-machine recording as a music end position based on the time difference, and stops the time-machine recording.

That is to say, the client terminal 2 calculates the time difference between the music end time shown in the now-on-air information and the present time, makes the mark of music end position on the part of program's sound data which was broadcast just the time difference period ago (with respect to the present time), and stops the time-machine recording. In this manner, when recording the program's sound in which the music is playing, the client terminal 2 can determine the exact time when the music finished playing.

After stopping the time-machine recording, the client terminal 2 registers the program's sound data obtained by the time-machine recording with the folder "Many flowers in the world" as the user's desired content data, and proceeds to step SP170.

At step SP170, the client terminal 2 checks whether or not a stop command of keyword recording is input via the operation input section 20. When the client terminal 2 obtains negative result at step SP170, it returns to step SP162 to continue the keyword recording process. When the client terminal 2 obtains positive result at step SP170, it proceeds to step SP171 to end the keyword recording process.

In the configuration described above, if a user specifies a radio station and a keyword representing his/her desired music, the client terminal 2 of the fourth embodiment performs a preliminary recording of program's sound being broadcast from the specified radio station.

The client terminal 2 also receives now-on-air information from the radio broadcast information delivery server SV3 corresponding to the specified radio station, and checks whether or not the now-on-air information includes information corresponding to the keyword.

If the now-on-air information includes information corresponding to the keyword, the client terminal 2 determines that the desired music starts to play in a radio program being received. The client terminal 2 then pinpoints where the music starts to play in the preliminarily recorded program's sound data based on the music start time shown in the now-on-air information. The client terminal 2 subsequently starts time-machine recording.

After that, the client terminal 2 keeps receiving now-on-air information each time when the polling time passes. When the client terminal 2 receives now-on-air information which does not include information corresponding to the keyword (i.e., at the time when the desired music finishes), the client terminal 2 pinpoints where the music finishes playing in the program's sound data obtained by the time-machine recording based on the music end time shown in the now-on-air information including the keyword, and stops the time-machine recording.

Therefore, the client terminal 2 can exactly determine the broadcast start time and broadcast end time of the use's desired music, when recording the program's sound in which the music is playing.

According to the configuration described above, the client terminal 2 receives now-on-air information at a certain interval of time. While detecting the keyword in the received now-on-air information, the client terminal 2 records received broadcast signals. This allows the client terminal 2 to record the program's sound in which user's desired music is playing. Therefore, the client terminal 2 can not only record program's sound in a program unit, but also easily record user's desired part of program's sound.

In addition, the client terminal 2 according to the fourth embodiment pinpoints the music start position and the music end position in the program's sound data based on the music start time and music end time shown in the now-on-air information, and makes marks on the positions. In this manner, the client terminal 2 determines the exact times when the music starts to play and when the music finishes playing, and records program's sound when the music is playing. In this case, the client terminal 2 just makes the marks on the start position and the end position. Therefore the client terminal 2 can adjust these positions in the future.

(5) Fifth Embodiment

Figure 31:
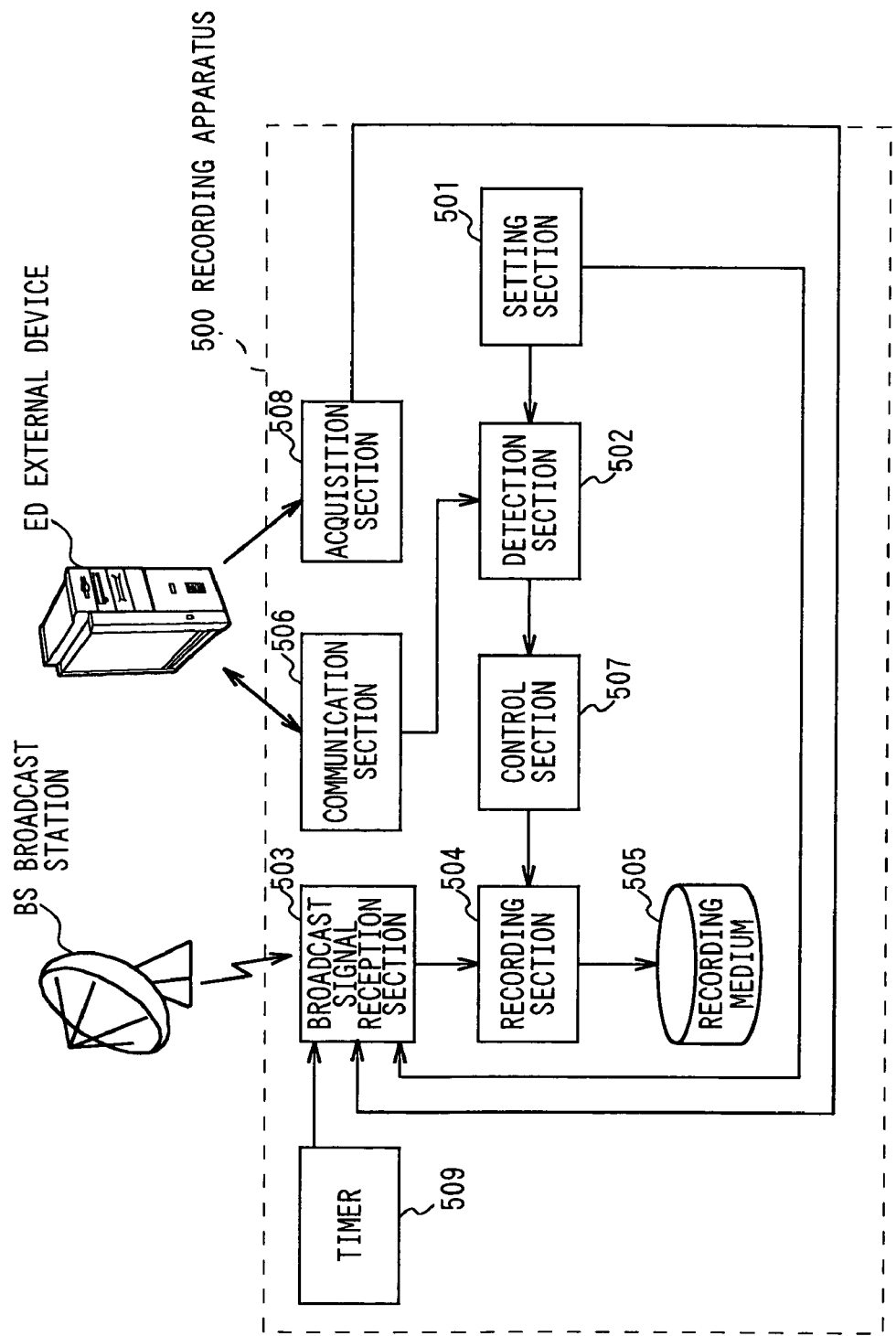
FIG. 31 illustrates a functional circuit block diagram showing a hardware configuration of the recording apparatus.

The fifth embodiment will be now described. FIG. 31 shows a hardware configuration of a recording apparatus 500 in the form of functional circuit blocks. The recording apparatus 500 sets a keyword at a setting section 501 according to user input and sends the keyword to a detection section 502.

In addition, the recording apparatus 500 receives a broadcast signal from a broadcast station BC at a broadcast signal reception section, and sends the received broadcast signal to a recording section 504. The recording section 504 converts the broadcast signal received by the broadcast signal reception section 503, into broadcast data, and preliminarily records the broadcast data in a recording medium 505.

In addition, the recording apparatus 500 periodically sends request information to an external device ED via a communication section 506, the request information requesting broadcast information indicating the contents of the broadcast signal being received by the broadcast signal reception section 503. At the same time, the recording apparatus 500 receives the broadcast information which is from the external device ED in response to the request information, at the communication section 506, and sends the received broadcast information to the detection section 502. The broadcast information is now-on-air information, for example.

The detection section 502 detects whether the broadcast information received via the communication section 506 includes the keyword received from the setting section 501, and sends this detection result to a control section 507. When the control section 507 recognizes based on the detection result obtained from the detection section 502 that the detection section 502 detects the keyword in the broadcast information, the control section 507 controls the recording section 504 so as to actually record the broadcast data in the recording medium 505 with a part of the broadcast data preliminarily recorded in the recording medium 505 as head data.

As described above, the recording apparatus 500 periodically obtains broadcast information indicating the contents of a broadcast signal being received, and when a keyword is detected from the broadcast information, the apparatus actually record the broadcast signal. Thereby, when the program's picture and program's sound of a program being received as a broadcast signal are user's desired program's pictures and program's sound, the recording apparatus 500 can record the program's pictures and program's sound.

In addition, an acquisition section 508 for acquiring program list data including broadcast station names, program titles, program start time and program end time can be provided in this recording apparatus 500, so that the acquisition section 508 sends the acquired program list data to the broadcast signal reception section 503. In this case, the recording apparatus 500 sets a keyword, a broadcast station name, and a program title at the setting section 501 according to user input, and sends the keyword to the detection section 502 as well as sending the broadcast station name and the program title to the broadcast signal reception section 503.

The broadcast signal reception section 503 searches the program list data received from the acquisition section 508, for the program start time and program end time of the corresponding program based on the broadcast station name and the program title obtained from the setting section 501. Then when the current time obtained by a timer 509 comes to the found program start time, the broadcast signal reception section 503 selects the broadcast station corresponding to the broadcast station name obtained from the setting section 501.

As described above, since user's undesired programs are not recorded by setting not only keywords but also user's desired programs, the recording apparatus 500 can reduce processing loads.

By the way, this recording apparatus 500 can receive a radio broadcast signal as a broadcast signal, convert this radio broadcast signal into audio data, and record this data. Alternatively, the recording apparatus 500 can receive a television broadcast signal as a broadcast signal, converts this television broadcast signal into video data, and record this data.

In a case of receiving a radio broadcast signal as a broadcast signal, the recording apparatus 500 corresponds to the client terminal 2 shown in FIG. 1 and FIG. 2 and the external device ED corresponds to the portal server 3 and the radio broadcast information delivery server SV3 shown in FIG. 1, for example. Further, the setting section 501 of the recording apparatus 500 corresponds to the operation input section 20 and the input processing section 21 of the client terminal 2 shown in FIG. 2 and the detection section 502, the recording section 504, the control section 507 and the timer 509 of the recording apparatus 500 correspond to the control section 23 of the client terminal 2, for example.

Furthermore, the communication section 506 and the acquisition section 508 of the recording apparatus 500 correspond to the communication control section 32 and the network interface 33 of the client terminal 2 and the recording medium 505 of the recording apparatus 500 corresponds to the storage medium 29 of the client terminal 2, for example.

(6) Other Embodiments

In the above-noted 1st through 4th embodiments, music titles are set as keywords. However, the present invention is not limited to this. The following are also applied as keywords: program titles shown in now-on-air information; presenter (DJ) shown in now-on-air information; artists shown in now-on-air information; genres shown in now-on-air information; and the like. If an artist is specified as a keyword, the client terminal 2 records the program's sound in which the artist's music is playing. In this manner, this system can meet various kinds of use's demands when performing keyword recording.

In the above-noted 1st through 4th embodiments, the client terminal 2 performs keyword recording based on now-on-air information (broadcast information) supplied from the radio broadcast information delivery server SV3 (external apparatus). However, the present invention is not limited to this. For example, the client terminal 2 may perform keyword recording based on other kinds of broadcast information, if the broadcast information shows contents of radio programs broadcast by radio stations.

In the above-noted 1st through 4th embodiments, the client terminal 2 performs keyword recording for radio program's sound. However, this invention is not limited to this. For example, the following is also possible; a server supplies broadcast information showing the contents of television programs, and then the client terminal 2 receives the broadcast information from the server, and records television program's pictures based on the broadcast information and keywords. In this case, the client terminal 2 can record program's picture using the same process as the above-noted keyword recording process, since the recording target has just changed from sound to picture and other things have not changed. In this manner, the client terminal 2 can not only record television program's picture in a program unit, but also easily record the user's desired part of television program's picture.

In the above-noted 3rd and 4th embodiments, the client terminal 2 makes marks on a music start position and music end position of program's sound data based on music start time (content broadcast start time) and music end time (content broadcast end time) shown in now-on-air information. However, this invention is not limited to this. The client terminal 2 may extract the part of program's sound data which is between the music start position and the music end position from the program's sound data, after pinpointing the music start position and music end position of the program's sound data based on the music start time and music end time shown in now-on-air information. In this case, the storage of the extracted program's sound data (music content data) requires a minimum amount of capacity.

In the above-noted 1st through 4th embodiments, music is content data broadcast on radio programs. The client terminal 2 specifies the broadcast end time of music based on the time when it receives now-on-air information and music end time shown in now-on-air information. However, this invention is not limited to this. If other kinds of information which can be utilized for specifying the broadcast end time exist, the client terminal 2 may use it.

For example, prescribed server supplies information about a plurality of pieces of music recorded on album CDs. The information includes music titles, artists, and playing time. The information is also referred to as "CD information". If the client terminal 2 receives CD information from the server, the client terminal 2 can specify the broadcast end time of the music broadcast on a radio program based on its playing time shown in the CD information. The client terminal 2 may pre-store the CD information in the hard disk drive 211 to specify the broadcast end time.

In the above-noted 1st through 4th embodiments, the client terminal 2 transmits a call sign to the portal server 3 to obtain the address of the radio broadcast information delivery server SV3 corresponding to the call sign from the portal server 3. Specifically, this radio broadcast information delivery sever 3 supplies the now-on-air information and on-air-list information relating to radio programs broadcast from a radio station corresponding to the call sign. However, this invention is not limited to this. For example, other server may be provided to supply the address of the radio broadcast information delivery server SV3 providing now-on-air information and on-air-list information. In this case, the client terminal 2 obtains the address corresponding to the call sign from the server.

In the above-noted 1st through 4th embodiments, the buffer portion which preliminarily records program's sound data (broadcast data) is disposed on the hard disk drive 211. However, this invention is not limited to this. The buffer may be disposed on the RAM 205. Since the access speed of the RAM 205 is generally faster than that of the hard disk drive 211, the use of the RAM 205 is suitable for the preliminary recording of program's sound data. This is because the preliminary recording requires writing and deleting processes many times.

In the above-noted 1st through 4th embodiments, the keyword recording function is applied to the client terminal 2 which can record radio program's sound on the hard disk drive 211. However, this invention is not limited to this. The keyword recording function may be applied to other kinds of devices, such as a portable terminal which can record radio program's sound on an internal memory.

In the above-noted embodiments, receivable broadcasts of the client terminal 2 are radio broadcasts broadcast from radio stations. However, the present invention is not limited to this. The client terminal 2 may receive Internet radio broadcasts, and obtain information (radio broadcast information) relating to the broadcasts. The client terminal 2 may also receive satellite radio broadcasts, and obtain information (radio broadcast, information) relating to the broadcasts. Alternatively, the client terminal 2 may receive television broadcasts broadcast from television broadcast stations, and obtain various kinds of broadcast information relating to television programs from servers on the network NT.

In the above-noted embodiments, the client terminal 2 is equipped with the hardware circuit blocks, the functional circuit blocks, and the program modules. However, the present invention is not limited to this. Other terminals such as cellular phones, personal computers may be equipped with the hardware circuit blocks, the functional circuit blocks, and the program modules. Such terminals equipped with the hardware circuit blocks, the functional circuit blocks, and the program modules are capable of performing the same processes as the client terminal 2 does.

In the above-noted 1st through 4th embodiments, the client terminal 2, which is equivalent to a recording apparatus and information processing apparatus, includes: the broadcast signal reception section 30 and tuner 31 of FIG. 2 or the antenna 212 and tuner 213 of FIG. 14 as a broadcast signal reception means; the operation input section 20 and input processing section 21 of FIG. 2 or the operation input section 200 and input processing section 201 of FIG. 14 as a setting means of FIG. 14; the storage medium 29 of FIG. 2 or the hard disk drive 211 of FIG. 14 as a recording means; the control section 23 of FIG. 2 or the CPU 203 of FIG. 14 as a recording means, a detection means and a control means; the communication control section 32 and network interface 33 of FIG. 2 or the communication processing section 214 and network interface 215 of FIG. 14 as a communication means and an acquisition means. However, the present invention is not limited to this. The client terminal 2 may have other configuration, provided that it has the same functions.

In the above-noted 5th embodiment, the recording apparatus 500 is composed of the broadcast signal reception section 503 as a broadcast signal reception means, the setting section 501 as a setting means, the recording section 504 as a recording means, the detection section 502 as a detection means, the control section 507 as a control means, the communication section 506 as a communication means, and the acquisition section 508 as an acquisition means. However, the present invention is not limited to this. The recording apparatus 500 may have other configuration, provided that it has the same functions.

INDUSTRIAL APPLICABILITY

The present invention can be utilized for a recording apparatus which records broadcast programs.

The invention claimed is:

1. A recording apparatus comprising: setting means for setting a keyword; broadcast signal reception means for receiving a broadcast signal broadcast from a broadcast station; recording means for temporarily recording a last predetermined amount of the broadcast signal received by said broadcast signal reception means as broadcast data in a buffer on a recording medium; communication means for repeatedly transmitting request information to an external apparatus every predetermined interval of time to request real-time broadcast information corresponding to contents of said broadcast signal currently being received, and receiving the real-time broadcast information which said external apparatus transmits in response to each transmission request information; detection means for detecting whether or not real-time broadcast information received by said communication means includes said keyword; and control means for controlling recording means to record broadcast data on recording medium as new recorded broadcast data in response to detection means detecting that real-time broadcast information includes keyword, such that a part of said broadcast data temporarily recorded in buffer is stored as a first portion of the new recorded broadcast data, wherein said recording means starts the recording of said broadcast data in said buffer when said setting means sets the keyword.

2. The recording apparatus according to claim 1, wherein if said detection means detects that said broadcast information received by said communication means does not include said keyword while recording said broadcast data as new recorded broadcast data, said control means stops the recording of said broadcast data as new recorded broadcast data.

3. The recording apparatus according to claim 1, further comprising:
a timer for outputting present time; and
acquisition means for acquiring program guide data from external apparatus, said program guide data including a broadcast station name, a program name, a program start time and a program end time, wherein
said setting means sets the broadcast station name and the program name in addition to said keyword; and
said broadcast signal reception means retrieves the program start time and program end time corresponding to said set program name from said program guide data based on said set broadcast station name and program name, and tunes in on the broadcast station corresponding to said set broadcast station name when the output of said timer corresponds to said program start time.

4. The recording apparatus according to claim 1, further comprising a timer for outputting present time, wherein
said control means specifies a beginning position of said first portion of the new recorded broadcast data based on a content broadcast start time included in said broadcast information and the present time output from said timer, when said detection means detects that said broadcast information includes said keyword.

5. The recording apparatus according to claim 4, wherein said control means stops the recording of said broadcast data as new recorded broadcast data when a content broadcast end time included in said broadcast information corresponds to the present time output from said timer.

6. A recording method implemented by a recording apparatus having a central processing unit (CPU), comprising: a setting step of setting a keyword; a broadcast signal reception step of receiving a broadcast signal broadcast from a broadcast station; a first recording step of temporarily recording a last predetermined amount of the broadcast signal received by said broadcast signal reception step as broadcast data in a buffer on a recording medium; a communication step of repeatedly transmitting request information to an external apparatus every predetermined interval of time to request real-time broadcast information corresponding to contents of said broadcast signal currently being received, and receiving the real-time broadcast information which said external apparatus transmits in response to each transmission of said request information; a detection step of detecting, using the CPU whether or not said real-time broadcast information received by said communication step includes said keyword; and a second recording step of recording said broadcast data on said recording medium as new recorded broadcast data in response to said detection step detecting that said real-time broadcast information includes said keyword, such that a part of said broadcast data temporarily recorded in said buffer is stored as a first portion of the new recorded broadcast data, wherein said recording means starts the recording of said broadcast data in said buffer when said setting means sets the keyword.

7. The recording method according to claim 6, wherein if said detection step detects that said broadcast information received by said communication step does not include said keyword while recording said broadcast data as new recorded broadcast data, said recording step stops the actual recording of said broadcast data as new recorded broadcast data.

8. The recording method according to claim 6, further comprising:
a time acquisition step of acquiring present time from a timer; and
an acquisition step of acquiring program guide data from external apparatus, said program guide data including a broadcast station name, a program name, a program start time and a program end time, wherein
said setting step sets the broadcast station name and the program name in addition to said keyword; and
said broadcast signal reception step retrieves the program start time and program end time corresponding to said set program name from said program guide data based on said set broadcast station name and program name, and tunes in on the broadcast station corresponding to said set broadcast station name when the present time acquired from said timer corresponds to said program start time.

9. The recording method according to claim 6, further comprising a time acquisition step of acquiring present time from a timer, wherein
said second recording step specifies a beginning position of said first portion of the new recorded broadcast data based on a content broadcast start time included in said broadcast information and the present time acquired from said timer, when said detection step detects that said broadcast information includes said keyword.

10. The recording method according to claim 9, wherein said second recording step stops the recording of said broadcast data as new recorded broadcast data when a content broadcast end time included in said broadcast information corresponds to the present time acquired from said timer.

11. A non-transitory computer readable storage medium having stored thereon a recording program for causing information processing apparatus to execute a method comprising: a setting step of setting a keyword; a broadcast signal reception step of receiving a broadcast signal broadcast from a broadcast station; a first recording step of temporarily recording a last predetermined amount of the broadcast signal received by said broadcast signal reception step as broadcast data in a buffer on a recording medium; a communication step of repeatedly transmitting request information to an external apparatus every predetermined interval of time to request real-time broadcast information corresponding to contents of said broadcast signal currently being received, and receiving the real-time broadcast information which said external apparatus transmits in response to each transmission of said request information; a detection step of detecting whether or not said real-time broadcast information received by said communication step includes said keyword; and a second recording step of recording said broadcast data on said recording medium as new recorded broadcast data in response to said detection step detecting that said real-time broadcast information includes said keyword, such that a part of said broadcast data temporarily recorded in said buffer is stored as a first portion of the new recorded broadcast data, wherein said recording means starts the recording of said broadcast data in said buffer when said setting means sets the keyword.

12. A recording apparatus comprising: a setting unit configured to obtain a keyword; a broadcast signal reception unit configured to receive a broadcast signal broadcast from a broadcast station, the broadcast signal including content; a recording unit configured to temporarily record a predetermined amount of the broadcast signal beginning at a starting point in the content and received by said broadcast signal reception unit as temporary broadcast data in a buffer on a recording medium; a communication unit configured to repeatedly request, at predetermined intervals and from an external apparatus, real-time broadcast information identifying characteristics of the content received by said broadcast signal reception unit, and to receive new real-time broadcast information in response to each request; a detection unit configured to determine whether or not each new real-time broadcast information received by said communication unit includes said keyword; and a control unit configured to, in response to said detection unit detecting that said real-time broadcast information includes said keyword, move the temporary broadcast data from said buffer to the recording medium as a first part of a new recorded broadcast data, and control said recording unit to record said broadcast data on said recording medium as a second part of the new recorded broadcast data, wherein said recording means starts the recording of said broadcast data in said buffer when said setting means sets the keyword.

* * * * *